(12) United States Patent
Gander et al.

(10) Patent No.: US 10,021,227 B2
(45) Date of Patent: Jul. 10, 2018

(54) MOBILE DEVICE SHADE

(71) Applicant: Next Spark LLC, Denver, CO (US)

(72) Inventors: Elizabeth Anne Gander, Golden, CO (US); Christopher McNulty, Guilford, CT (US)

(73) Assignee: Next Spark LLC, Denver, CO (US)

( * ) Notice: Subject to any disclaimer, the term of this patent is extended or adjusted under 35 U.S.C. 154(b) by 0 days.

(21) Appl. No.: 15/458,144

(22) Filed: Mar. 14, 2017

(65) Prior Publication Data

US 2017/0279944 A1 Sep. 28, 2017

Related U.S. Application Data

(63) Continuation-in-part of application No. 14/752,212, filed on Jun. 26, 2015, now Pat. No. 9,596,332.

(60) Provisional application No. 62/018,076, filed on Jun. 27, 2014, provisional application No. 62/061,313, filed on Oct. 8, 2014, provisional application No. 62/442,256, filed on Jan. 4, 2017.

(51) Int. Cl.
| | |
|---|---|
| *H04M 1/00* | (2006.01) |
| *H04M 1/04* | (2006.01) |
| *A45F 5/00* | (2006.01) |
| *H04M 1/02* | (2006.01) |

(52) U.S. Cl.
CPC ............... *H04M 1/04* (2013.01); *A45F 5/00* (2013.01); *H04M 1/026* (2013.01); *H04M 1/0249* (2013.01)

(58) Field of Classification Search
CPC ....... A45F 5/00; H04M 1/0249; H04M 1/026; H04M 1/04

USPC .. 455/575.1, 90.3, 575.6, 158.4, 573, 556.1; 348/838; 359/601, 613, 609; 136/244, 136/291; 343/702, 872, 834, 818
See application file for complete search history.

(56) References Cited

U.S. PATENT DOCUMENTS

| | | |
|---|---|---|
| 5,416,495 A | 5/1995 | Davis et al. |
| 5,717,566 A | 2/1998 | Tao |
| 7,505,256 B2 | 3/2009 | Boudreau |
| 7,634,300 B2 | 12/2009 | Bliss |
| 8,075,145 B2 | 12/2011 | Engblom et al. |
| 8,353,598 B2 | 1/2013 | Estevez et al. |
| 8,451,180 B2 | 5/2013 | Bonwit et al. |
| 8,511,626 B1 | 8/2013 | Trinh et al. |
| 8,587,711 B2 | 11/2013 | Anderson |
| 8,628,197 B2 | 1/2014 | Estevez et al. |
| 8,727,546 B2 | 5/2014 | Trinh et al. |
| 2003/0000976 A1* | 1/2003 | Malhotra ............... A45F 5/00 224/197 |
| 2003/0231399 A1* | 12/2003 | Leitao .................. G02B 27/04 359/614 |
| 2006/0279916 A1 | 12/2006 | Boudreau |
| 2008/0072950 A1 | 3/2008 | Lin et al. |
| 2008/0268916 A1 | 10/2008 | Lin et al. |
| 2009/0268300 A1 | 10/2009 | Dai et al. |
| 2010/0254014 A1 | 10/2010 | Trinh et al. |

(Continued)

*Primary Examiner* — Tan H Trinh
(74) *Attorney, Agent, or Firm* — Onello & Mello, LLP

(57) ABSTRACT

A mobile device shade apparatus includes a case defining a pocket and at least one panel configured to travel in and out of the pocket to transition between a stowed state and a deployed state, wherein in the deployed state that at least one panel extends from and is rotatable with respect to an edge of the case. The apparatus also includes a coupler configured to couple the case to a mobile device, such as a cell phone or tablet, as examples.

24 Claims, 62 Drawing Sheets

(56) References Cited

U.S. PATENT DOCUMENTS

| | | | |
|---|---|---|---|
| 2011/0203955 A1* | 8/2011 | Fasula | A45C 3/02 |
| | | | 206/320 |
| 2011/0216415 A1 | 9/2011 | Engblom et al. | |
| 2011/0228459 A1 | 9/2011 | Richardson et al. | |
| 2012/0267061 A1 | 10/2012 | Fan | |
| 2013/0148204 A1* | 6/2013 | Allen | G02F 1/133502 |
| | | | 359/601 |
| 2013/0201064 A1 | 8/2013 | Trinh et al. | |
| 2013/0222668 A1 | 8/2013 | Anderson | |
| 2013/0229715 A1* | 9/2013 | Allen | G02B 27/04 |
| | | | 359/613 |
| 2013/0265643 A1 | 10/2013 | Armstrong | |
| 2013/0265644 A1 | 10/2013 | Armstrong | |
| 2014/0349719 A1* | 11/2014 | Chun | H04M 1/04 |
| | | | 455/575.1 |
| 2014/0375901 A1* | 12/2014 | Stockett | H04N 5/64 |
| | | | 348/838 |
| 2015/0345209 A1 | 12/2015 | Hornung | |
| 2016/0020810 A1 | 1/2016 | Platt | |
| 2016/0088752 A1* | 3/2016 | Zaccaria | A45C 7/0036 |
| | | | 348/376 |
| 2016/0173670 A1* | 6/2016 | Langhein | H04M 1/04 |
| | | | 455/575.1 |
| 2016/0227663 A1* | 8/2016 | Holmes | G06F 1/1603 |
| 2016/0269068 A1 | 9/2016 | Tymus | |
| 2016/0324324 A1* | 11/2016 | Wilkerson | |
| | | Altonen | E04H 15/40 |

* cited by examiner

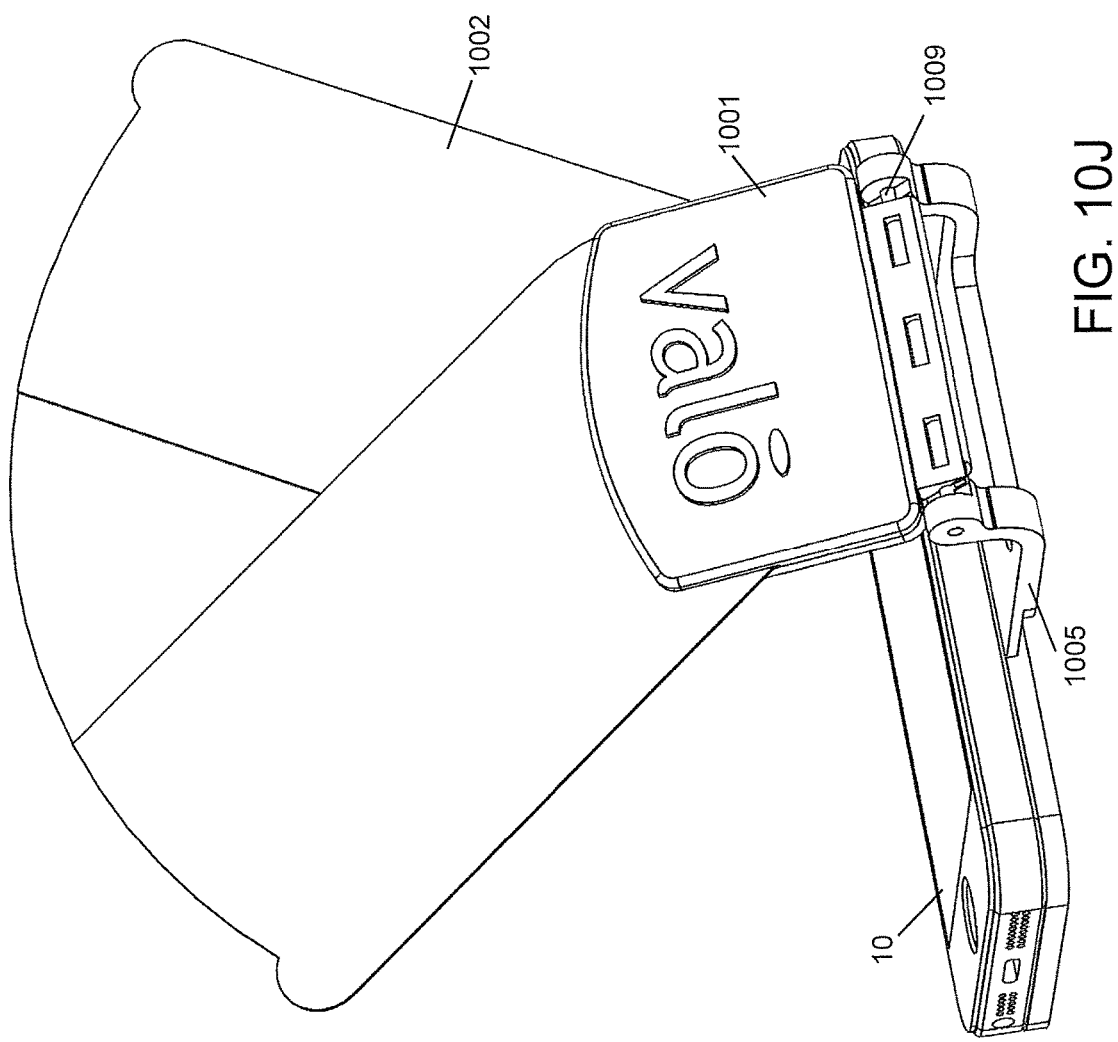

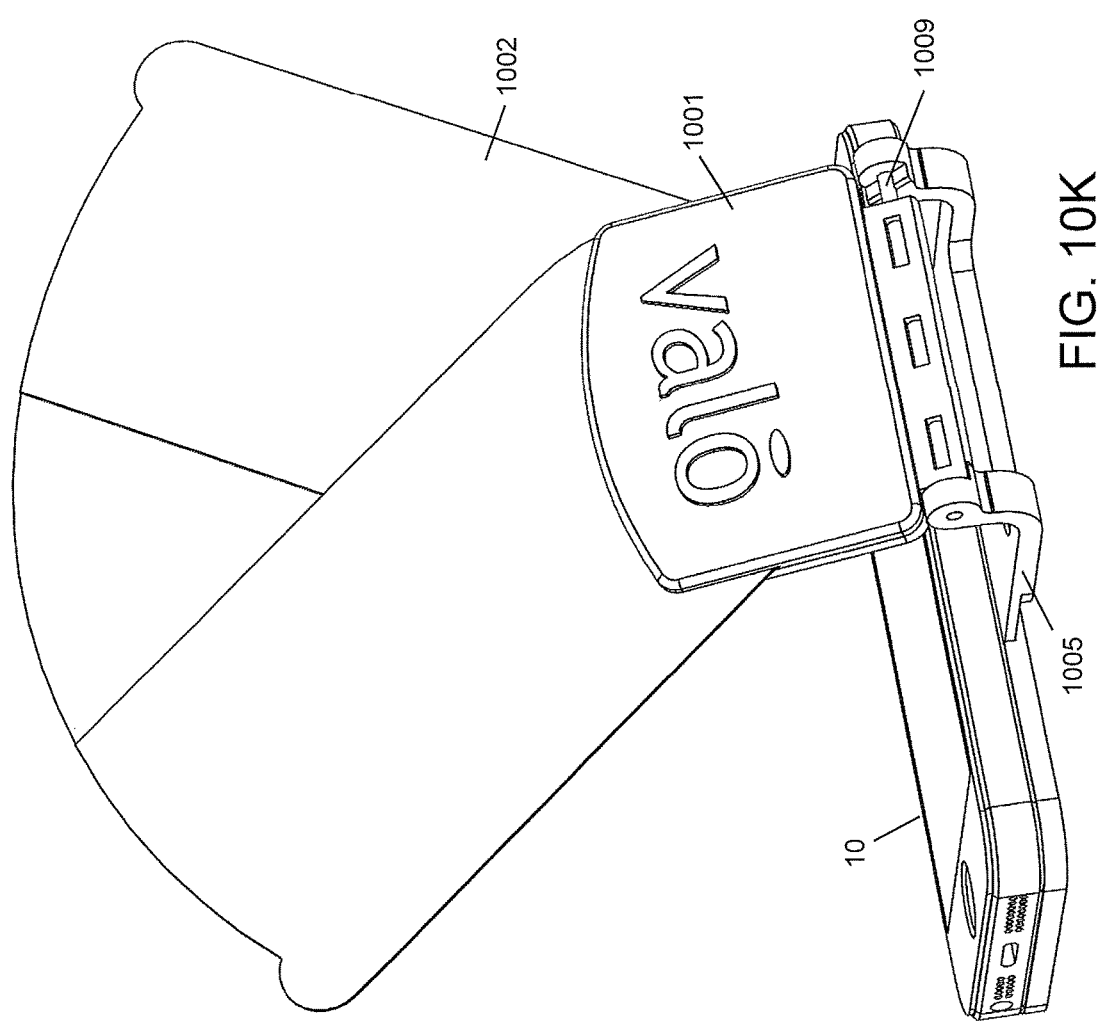

FIG. 12A
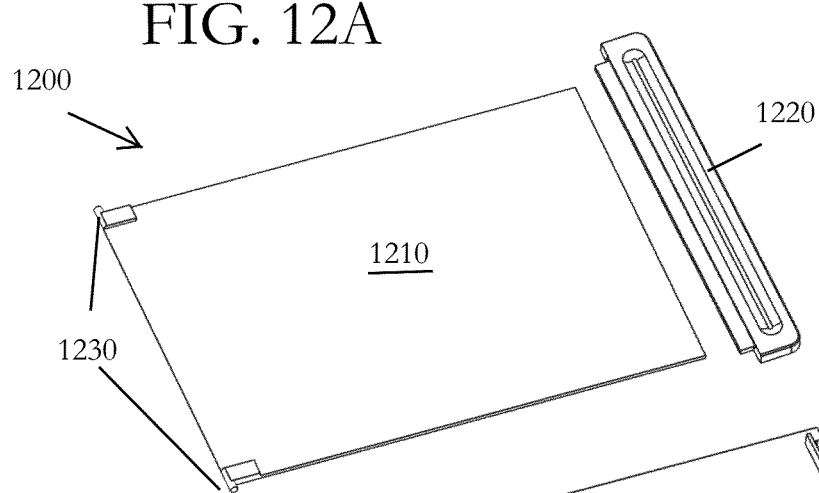
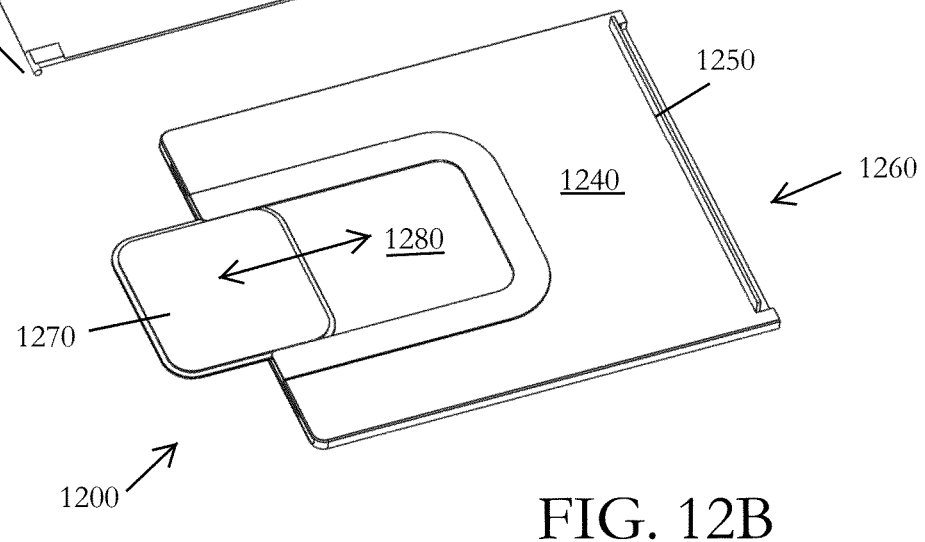
FIG. 12B

MOBILE DEVICE SHADE

RELATED APPLICATIONS

This application is a continuation-in-part application of U.S. Non-provisional patent application Ser. No. 14/752,212 filed on Jun. 26, 2015, which claimed the benefit of U.S. Provisional Patent Application No. 62/018,076 filed on Jun. 27, 2014 and U.S. Provisional Patent Application No. 62/061,313 filed on Oct. 8, 2014, and this application also claims the benefit of U.S. Provisional Patent Application No. 62/442,256 filed Jan. 4, 2017, the contents of each of which are incorporated herein by reference in their entirety.

FIELD OF INTEREST

The present inventive concepts relate to the field of handheld computer devices, and more particularly to the field of handheld computer devices having displays, including, but not limited to, smartphones, tablets, personal computers, emerging devices, such as smart watches, and devices not yet invented and/or otherwise known to those of ordinary skill in the art.

BACKGROUND

A mobile electronic device (e.g., smartphone) screen, such as an optical display or related device element, becomes very difficult to see and/or read in bright light. One solution is to try to use a hand as shade, making it difficult if not impossible to both hold and operate the device. Another solution is to move the device to a shaded area, which is not always practical, possible, or effective. This can be frequently problematic for people who may work outside, are active outdoors, walk from place to place, spend time in open air locations, and want to use their electronic devices at these locations.

SUMMARY

Ambient light such as sunshine can prevent users from effectively using an electronic device. A shade or shade assembly for a mobile device reduces glare when the electronic device screen is difficult to see. The shade, which can be a mechanical shade, improves glare on demand, thereby solving the problem of outdoor screen glare.

In accordance with one aspect of the present disclosure, provided is a mechanically operated shade (or visor) for mobile electronic devices that can be used to control screen glare. The shade can be attachable to, form part of, or form part of a case for maintaining the mobile electronic device, and can be retractable through a user-operated mechanism.

In various embodiments, the configuration and/or orientation of the shade relative to the display screen can be user manipulatable.

In various embodiments, the shade can be adjusted and/or reoriented to provide coverage from one or more sides of the device and can be manipulated so that the degree and angle of shade can be suited to varying light conditions.

In various embodiments, the shade can provide portrait and landscape orientations, so the device screen can be seen from different angles in bright light.

In various embodiments, the shade can include a solar energy storing element or component, where energy captured from the sun during use can be returned to the electronic device with which it is being used.

In various embodiments, the shade can provide ease of use, with access and retraction in a matter of seconds from the electronic device case or body.

In various embodiments, the shade can provide privacy, when a user does not want others to see sensitive information on the device screen.

In various embodiments, the shade can provide protection from the elements, such as precipitation.

In various embodiments, the shade can provide extension of battery life, since shade protection reduces need for screen brightness and associated power.

In various embodiments, the shade can have customized colors, logos, etc. based on preferences of customers.

In various embodiments, the inventive concepts provide the capability to "mix and match" components, for example, solar and hinge panel styles on the same shade. Also inherent is the concept that different panel types may be used singularly or in combination on solutions across existing and future device types. The present invention is not inherently limited to a particular electronic mobile device type.

According to one aspect of the inventive concepts, provided is an ambient light blocking or privacy apparatus for a mobile electronic device. The apparatus comprises a shade having a deployed state and a stowed state smaller than the deployed state, the deployed state arranged to shade a display of a mobile electronic device; and a containment mechanism configured to stow the shade in the stowed state.

In some embodiments, the apparatus can comprise a state transition mechanism configured for the user to facilitate the transition of the shade from the stowed state in the stowed compartment into the deployed state and back again, in response to user actuation.

In various embodiments, the containment mechanism can be or form part of a case configured to maintain the mobile electronic device.

In various embodiments, the case can be a removable case.

In various embodiments, the case can form part of a housing of the mobile electronic device.

In various embodiments, the shade can be retractable.

In various embodiments, the shade can comprise a plurality of panels.

In various embodiments, the plurality of panels can be configured to overlap to achieve the stowed state.

In various embodiments, the panels can be configured to fold relative to each other.

In various embodiments, the panels can be configured to slide over each other.

In various embodiments, the shade can comprise one or more snap-in panels configured to snap in to an edge of the case.

In various embodiments, the panels can be configured to be manipulated and/or rotated by the user to accommodate different angles of incident light.

In various embodiments, the shade can be configured for different orientations by the user to accommodate different angles of incident light.

In various embodiments, the shade can be constructed and arranged in the form of a fan.

In various embodiments, the shade can be constructed and arranged in the form of an umbrella.

In various embodiments, the umbrella can be biased to curve over the display of the mobile electronic device in the deployed state.

In various embodiments, the shade can be biased to curve over the display of the mobile electronic device in the deployed state.

In various embodiments, the shade can shade can be constructed and arranged in the form of one or more hoops.

In various embodiments, the shade can comprise a solar energy collection element.

In various embodiments, the solar energy collection element can comprise a solar energy collection film or material.

In various embodiments, the solar energy collection element can comprise a solar energy cell or cells.

In various embodiments, the shade can be water resistant or waterproof.

In various embodiments, the shade can be opaque.

In various embodiments, the shade can be semi-opaque.

In various embodiments, the apparatus can include a state transition mechanism configured to facilitate the transition of the shade from the stowed state into the deployed state and back again, in response to user actuation.

In various embodiments, the shade, and/or portions of the shade, can include, but are not limited to, materials such as plastic, silicon, metal, and magnetic fittings.

In various embodiments, the shade can be constructed and arranged in the form of a collapsible rubber boot.

In various embodiments, the mobile electronic device is at least one of a smart phone, a tablet, a personal computer, an emerging mobile electronic device, or a mobile electronic device known to those of ordinary skill in the art.

In accordance with another aspect of the invention, provided is a mobile device shade apparatus, comprising a shade assembly comprising a set of panels; a base configured to couple to electronic mobile device having a display screen; and a hinge joining the base and the shade assembly and configured to enable rotation of the shade assembly away from the display screen.

In various embodiments, the set of panels comprises a plurality of overlapping panels.

In various embodiments, the set of panels is at least two panels.

In various embodiments, the set of panels is at least three panels.

In various embodiments, the base is configured to rotate with respect to the mobile device between a portrait and landscape orientations.

In various embodiments, the shade assembly is configured to rotate with respect to the mobile device between a portrait and landscape orientations.

In various embodiments, the hinge is configured with one or more stop positions, wherein each stop position defines a preset angle of rotation of the shade assembly with respect to the display screen.

In various embodiments, the mobile device can be at least one of a smart phone, tablet, electronic book reader, or personal computer, an emerging mobile electronic device, or a mobile electronic device known to those of ordinary skill in the art.

In various embodiments, the shade assembly has a deployed state and a stowed state, wherein the stowed state is smaller than the deployed state, the deployed state arranged to shade the display screen.

In accordance with another aspect of the inventive concepts, provided is an ambient light blocking or privacy apparatus for a mobile electronic device, comprising a base at which the mobile electronic device is removably positioned, the base including a first base portion and a second base portion; and a plurality of panels the provide shade to a display of the mobile electronic device, wherein the shade assembly has a deployed state and a stowed state, wherein the stowed state is smaller than the deployed state, the deployed state arranged to shade the display of the mobile electronic device.

In various embodiments, the apparatus further comprises a hinge extending along of a first axis that permits the panels to move at an angle relative to the display.

In various embodiments, the second base portion includes a pivot post extending along a second axis orthogonal to the first axis, the first base portion positioned about the pivot post, and is rotatable relative to the second base portion.

In various embodiments, the apparatus further comprises a containment mechanism configured to stow the shade in the stowed state.

In accordance with another aspect of the inventive concept, provided is a mobile device shade apparatus, comprising a base configured to couple to a mobile device, a case configured to couple to the base, and at least one panel coupled to the case and configured to transition between a stowed state and a deployed state. In the deployed state that at least one panel extends from an edge of the case.

In various embodiments, the case includes a base receiver configured to removably would to the base.

In various embodiments, the case is configured to couple to the base in a plurality of different orientations.

In various embodiments, the case is configured to couple to the base in two different orientations.

In various embodiments, the at least two orientations are 180 degrees apart.

In various embodiments, the case is configured to couple to the base in four different orientations.

In various embodiments, the four orientations are 90 degrees apart.

In various embodiments, the base is square-shaped.

In various embodiments, the base is circular.

In various embodiments, the case is configured to contain at least a majority of the at least one panel in the stowed state.

In various embodiments, the at least one panel includes a grip that abut the top edge of the case and is configured to enable transition of the at least one panel back and forth between the stowed and deployed states.

In various embodiments, the at least one panel includes a bottom edge having a pair of outwardly and laterally extending pivot pins and the case defines a pair of corresponding channels within which the pivot pins travel.

In various embodiments, the case comprises one or more stops defining terminal ends of the pair of channels at a top edge of the case.

In various embodiments, the top edge includes a panel guide configured to enable rotation of the at least one panel with respect to the case.

In various embodiments, the panel guide defines a recess along at least a portion of the top edge of the case.

In various embodiments, the recess is framed by a lip and, optionally, one or more sidewalls.

In various embodiments, the lip limits rotation of the at least one panel with respect to the case.

In various embodiments, a range of the rotation of the at least one panel is from about 0 degrees up to about 90 degrees with respect to the case.

In various embodiments, the mobile device can be a mobile phone or a tablet.

In accordance with another aspect of the inventive concept, provided is a mobile device shade apparatus, comprising a case, at least one panel and a coupling mechanism. The case defines a pocket to receive the at least one panel. The at least one panel is configured to travel in and out of the pocket to transition between a stowed state and a deployed state, wherein in the deployed state the at least one panel extends from and is rotatable with respect to an edge of the case. The coupler is configured to couple the case to a mobile device.

In various embodiments, the coupling mechanism includes a base and a base receiver forming part of or attached to the case and configured to receive the base.

In various embodiments, the case is configured to couple to the base in a plurality of different orientations.

In various embodiments, the case is configured to couple to the base in two different orientations that are 180 degrees apart.

In various embodiments, the case is configured to couple to the base in two or more different orientations that are 90 degrees apart.

In various embodiments, the base is shaped as a polygon.

In various embodiments, the base is shaped as a square.

In various embodiments, the base is circular.

In various embodiments, the case is configured to contain at least a majority of the at least one panel in the stowed state.

In various embodiments, the at least one panel includes a grip that abuts a top edge of the case and remains exposed when the at least one panel is in the stowed state.

In various embodiments, the at least one panel includes a bottom edge having a pair of outwardly and laterally extending pivot pins and the case defines a pair of corresponding channels within which the pivot pins travel.

In various embodiments, the case comprises one or more stops defining terminal ends of the pair of channels at a top edge of the case.

In various embodiments, the case includes a top edge comprising a panel guide configured to enable rotation of the at least one panel with respect to the case.

In various embodiments, the panel guide defines a recess along at least a portion of the top edge of the case, the recess configured to receive the panel when the panel is rotated.

In various embodiments, the recess is partially framed by a lip configured to limit rotation of the at least one panel with respect to the case.

In various embodiments, the lip is configured to limit rotation of the at least one panel with respect to the case to not more than about 90 degrees.

In various embodiments, the at least one panel is a single panel.

In various embodiments, the mobile device is a mobile phone or a tablet.

In accordance with another aspect of the inventive concept, provided is a mobile device shade apparatus. The apparatus comprises a panel, a case, and a coupling mechanism. The panel includes a top edge having a grip and a bottom edge having a pair of outwardly and laterally extending pivot pins. The case defines a pocket to receive the panel and has a pair of internal channels within which the pivot pins of the panel travel to transition the panel from a stowed state within the case to a deployed state at least partially extending from the case. The coupling mechanism couples the case to a mobile device in a plurality of different orientations. The coupling mechanism includes a base and a base receiver forming part of or attached to the case and configured to receive the base.

In various embodiments, the mobile device is a mobile phone or a tablet.

In accordance with another aspect of the inventive concepts, provided is an electronic device shade, as shown and/or described.

In accordance with another aspect of the inventive concepts, provided is an electronic mobile device with display screen and shade, as shown and/or described.

In accordance with another aspect of the inventive concepts, provided is a case having a shade for use with an electronic mobile device, as shown and/or described.

In accordance with another aspect of the inventive concepts, provided is a kit comprising an electronic mobile device and a shade, as shown and/or described.

In accordance with another aspect of the inventive concepts, provided is a method of shading a display screen of an electronic mobile device, as shown and/or described.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 10G-2 shows a partial view of the shade of FIG. 10F where the base is disposed to one side of the rod.

FIG. 10J provides another perspective view of the mobile shade device of FIG. 10I.

FIG. 10K provides another perspective view of the mobile shade device of FIG. 10H.

FIG. 12A provides a perspective view of a panel comprising a portion of a twelfth embodiment of a mobile device shade, in accordance with aspects of the inventive concepts.

FIG. 12B provides a perspective view of a case forming another portion of the mobile shade, which can receive the panel of FIG. 12A.

DETAILED DESCRIPTION OF PREFERRED EMBODIMENTS

Figure 1A:
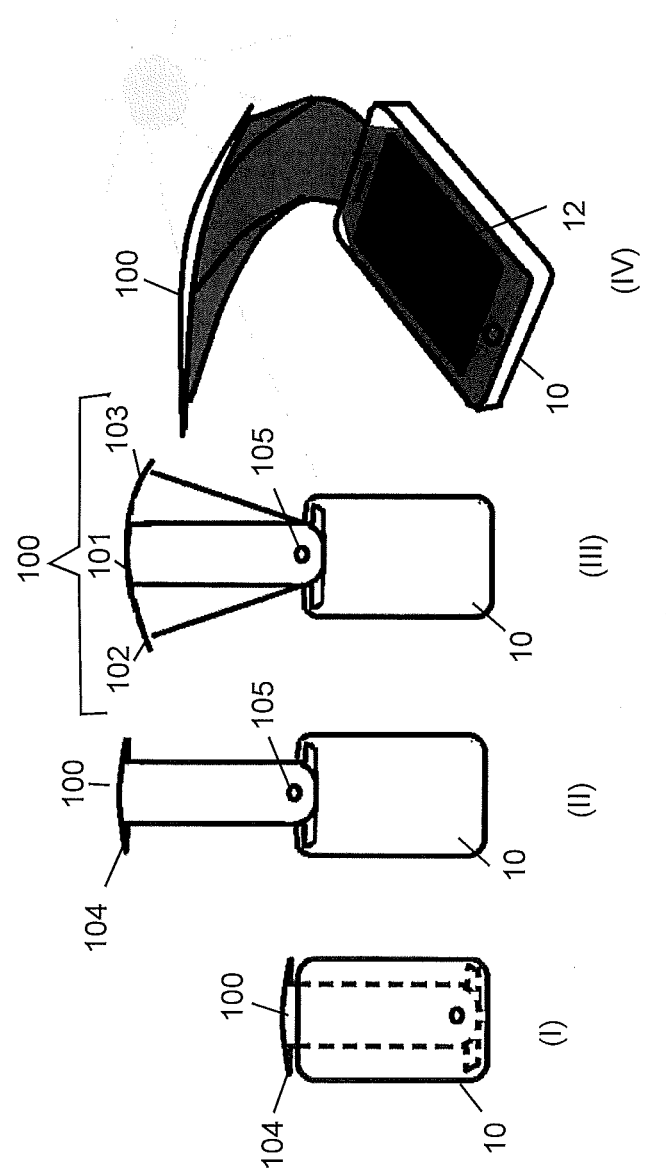
FIGS. 1A(I)-(IV) are an illustration of a first embodiment of a mobile device shade in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein, but are to include deviations in shapes that result, for example, from manufacturing.

Various embodiments of shades in accordance with the inventive concepts are shown and describe, where the shade can form part of a case within which an electronic mobile device is maintained or a housing that forms part of the electronic mobile device. These are collectively referred to as "case" herein, in a non-limiting manner. For example, the shade can be part of a mobile phone case that holds a mobile phone or can be part of the housing of the mobile phone. Although a mobile phone is described, other electronic devices can equally apply including but not limited to a smart phone, tablet, personal computer, and so on.

Figure 1B:
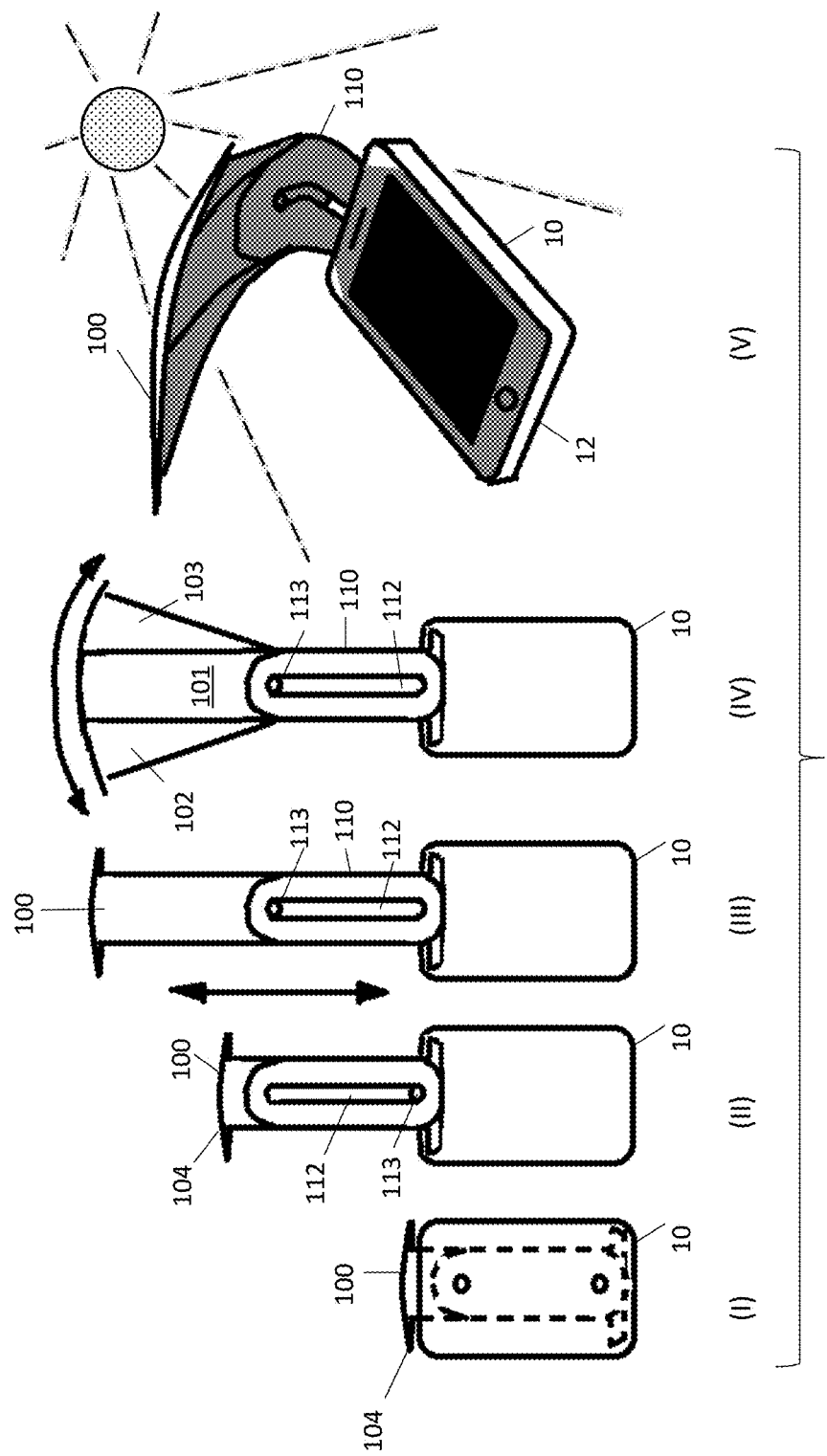
FIGS. 1B(I)-(V) are an illustration of a specific feature of the first embodiment of a mobile device shade in accordance with aspects of the inventive concepts.
Figure 1C:
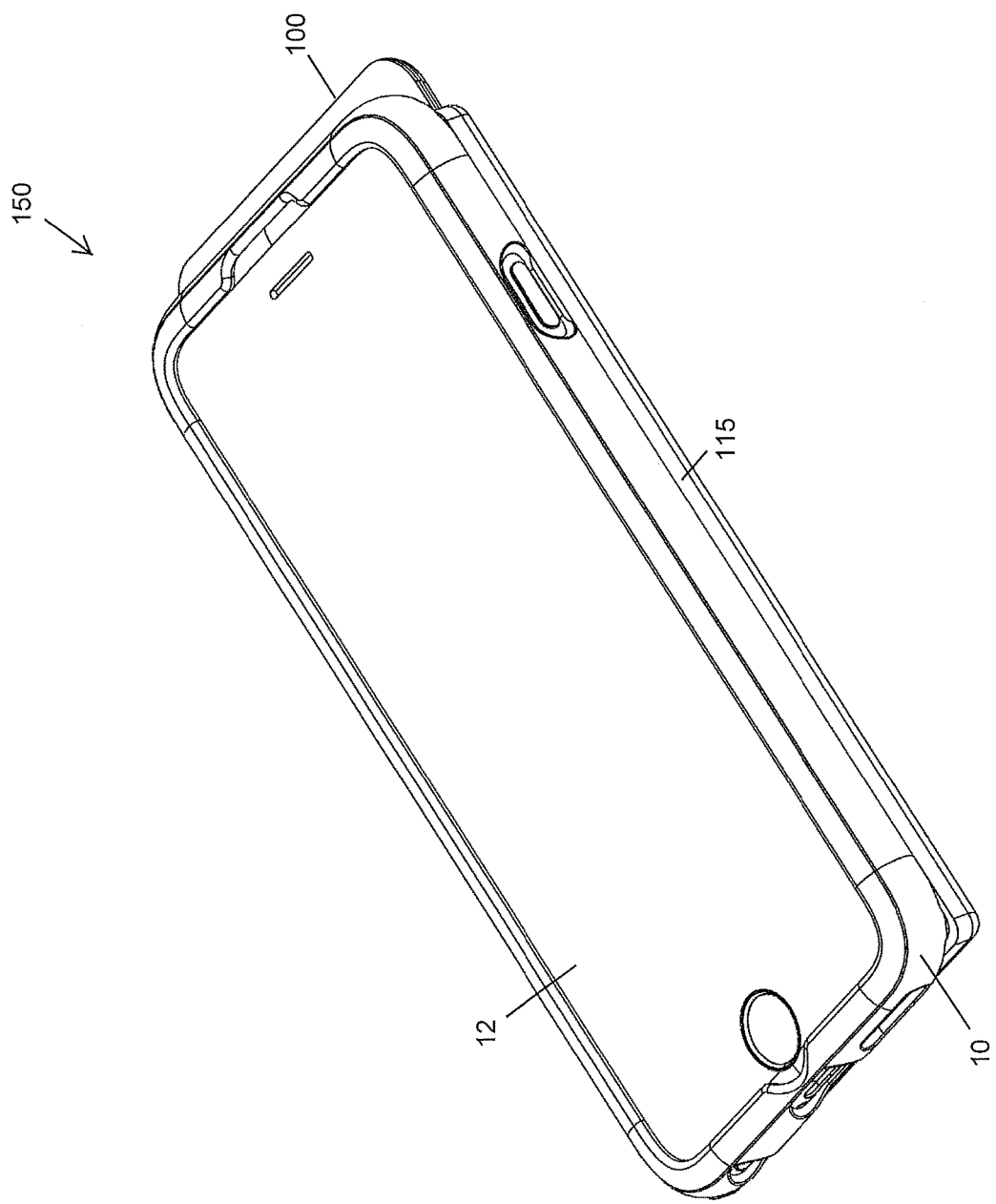
FIGS. 1C-1F are an illustration of another specific feature of the first embodiment of a mobile device shade in accordance with aspects of the inventive concepts.

FIG. 1A is an illustration of a first embodiment of a mobile device shade 100 in accordance with aspects of the inventive concepts. FIG. 1B is an illustration of a variation of the first embodiment of a mobile device shade 100 in accordance with aspects of the inventive concepts.

In FIG. 1A, the shade 100 takes an "umbrella" configuration. With the umbrella embodiment, the shade 100, which can comprise center 101, left 102, and right 103 sections or panels, can be housed or stowed behind the back side of an electronic device case 10, or housing, or to a surface of the device itself. As shown in steps (I)-(III), the left 102 and right 103 panels fold over the center section, such that the unused folded shade 100 can have overall length and width of the center panel 101. In various embodiments, the dimensions of the folded shade 100 can be less than the length and width of the mobile device, or the case 10 housing the mobile device.

The shade 100 can include a state transition mechanism for facilitating the transition of the shade 100 from a stowed state into a deployed state and back again, in response to user actuation. For example, the shade 100 can include a grip 104 at its top, which can be used to pull and deploy the shade. The grip 104, also referred to as a pull, can also be used to push the shade 100 back into its stowed location. In other embodiments, the shade 100 could include a push device to push the shade up and out of its stowed location. Referring to FIG. 1A, in this embodiment the pull takes the form of a grip, which has grooved plastic that extends above the top of a back side of the case 10, so the shade 100 can be accessed and deployed by pulling up on the grooved plastic. Once the shade 100 is accessed, the user can fully extend and adjust the shade 100 for use.

In this embodiment, the shade 100 is biased to curve over the device display 12, so that the shade 10 is not straight, or linear, in its deployed state. The curve configuration can be user manipulated or the shade 100 can have a memory shape, depending on materials used to form the shade 100, for example, materials that permit modification to the shape of the shade 100. In other embodiments, however, the shade 100 could be straight. Also in this embodiment, the shade 100 is attached at a pivot 105, which allows the user to reorient the shade 100 from side-to-side for the most effective use.

In various embodiments, as described above, the shade 100 is made of a flexible, bendable material. The material may be substantially opaque, to be an effective shade or filter of sunlight, or other bright light. The shade 100 can also be made of a waterproof or water resistant material to provide protection against the elements, e.g., precipitation.

FIG. 1B provides a variation of the umbrella embodiment of FIG. 1A. In this embodiment, the shade 100 is attached to or includes an extender 110 that is stowed with the shade 100 at containment mechanism, for example, inside the case 10. Preferably, the extender 110 can be partially deployed or fully deployed, at the user's discretion, for example, shown at steps (I)-(IV). The extender 110 may include a groove or slide 112. The shade 100 may include a guide element 113 positioned in the groove or slide 112, permitting the shade 100 to move in a direction of extension of the extender 110. The extender 110 may be formed of one or more materials that provide flexibility, so that the extender 110 may bend, permitting the shade 100 to be positioned over at least part of the device display 12.

FIGS. 1C-1F are an illustration of another specific feature of the first embodiment of a mobile device shade 150 in accordance with aspects of the inventive concepts. The shade 150 includes a base 115 on which the case 10 or housing of the mobile device can be positioned. A set of shade panels 101, 102, 103 (collectively, 100) in a closed position can be positioned between the base 115 and a bottom surface of the case 10 or housing of the mobile device.

Figure 1D:
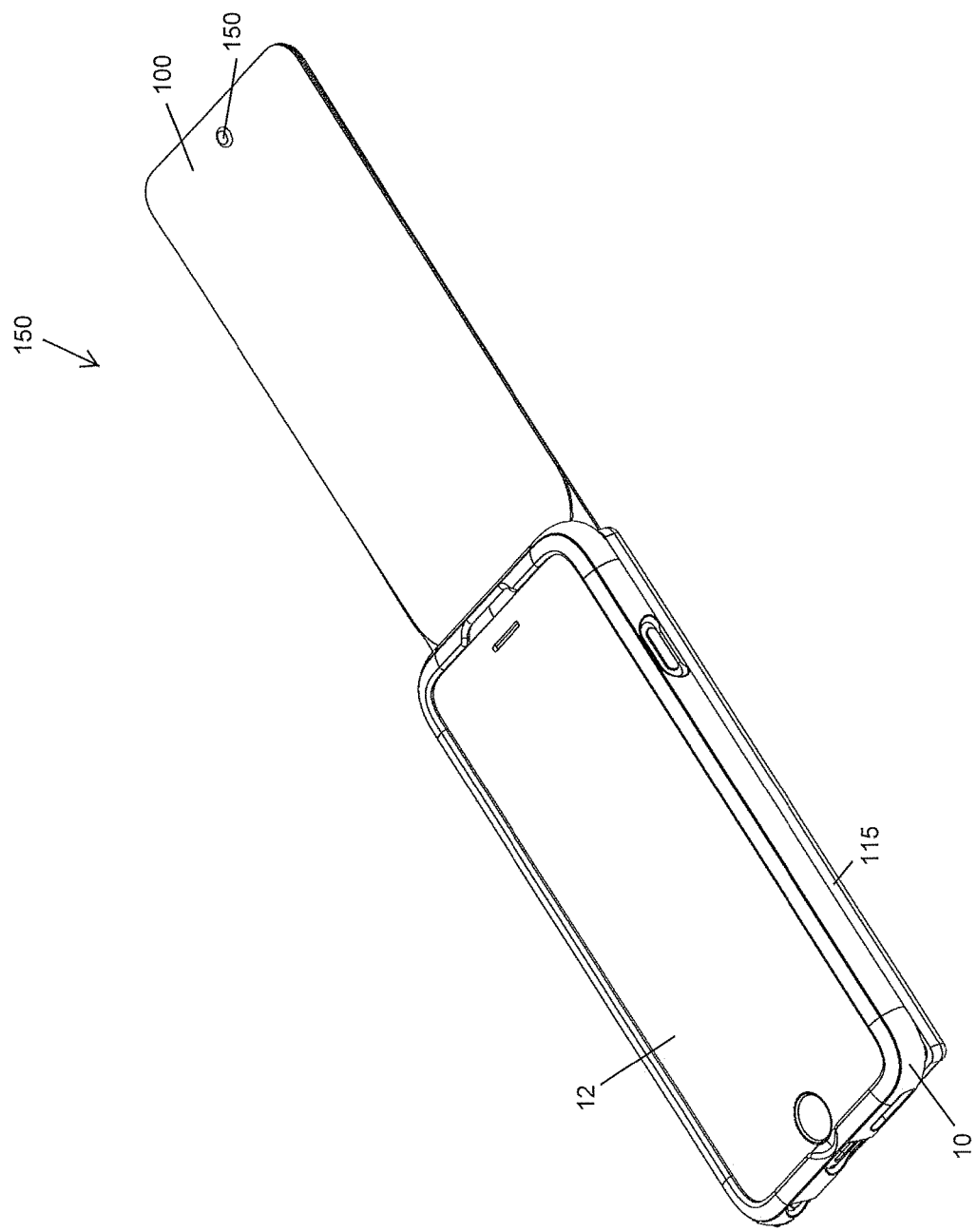
Figure 1E:
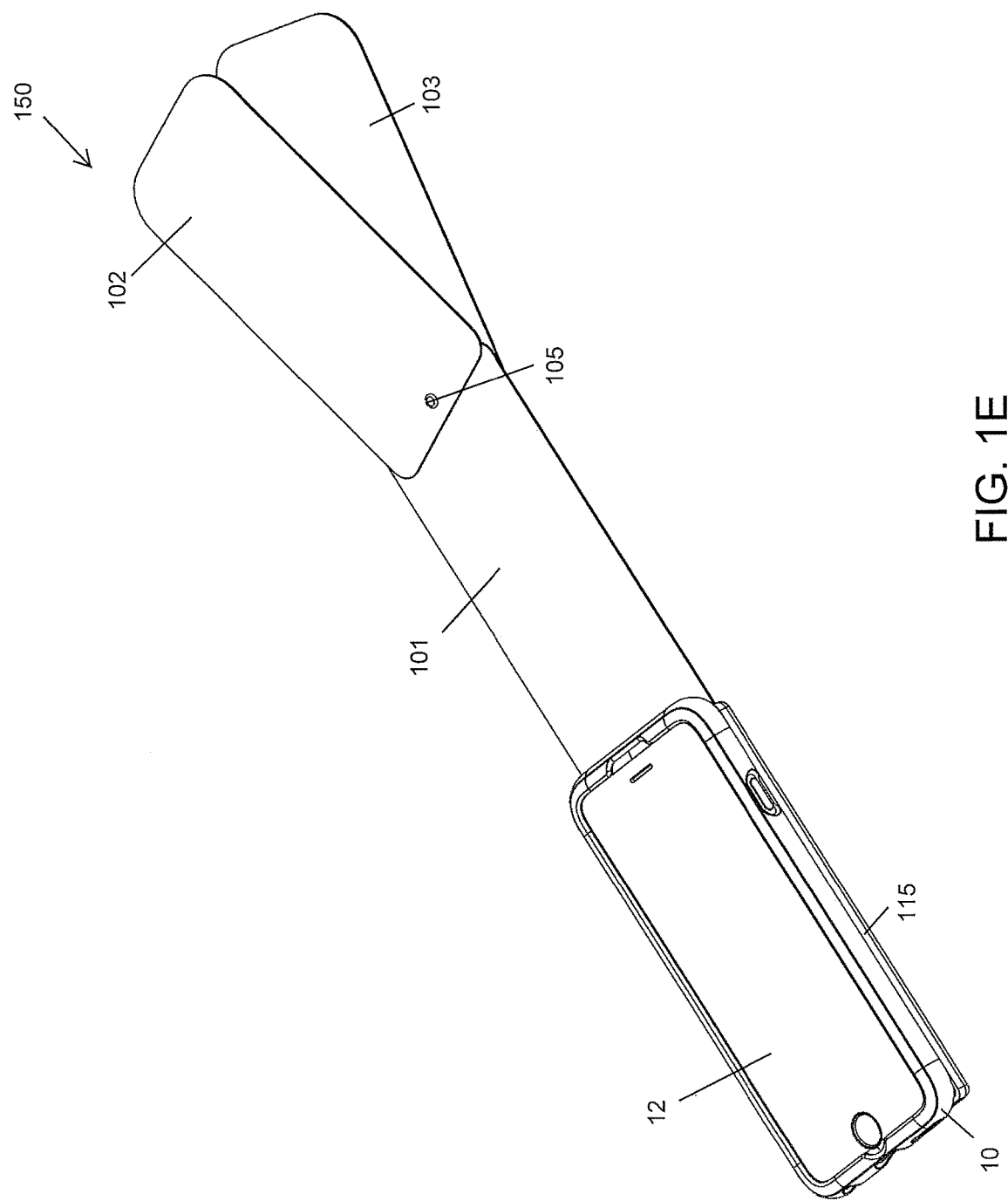
Figure 1F:
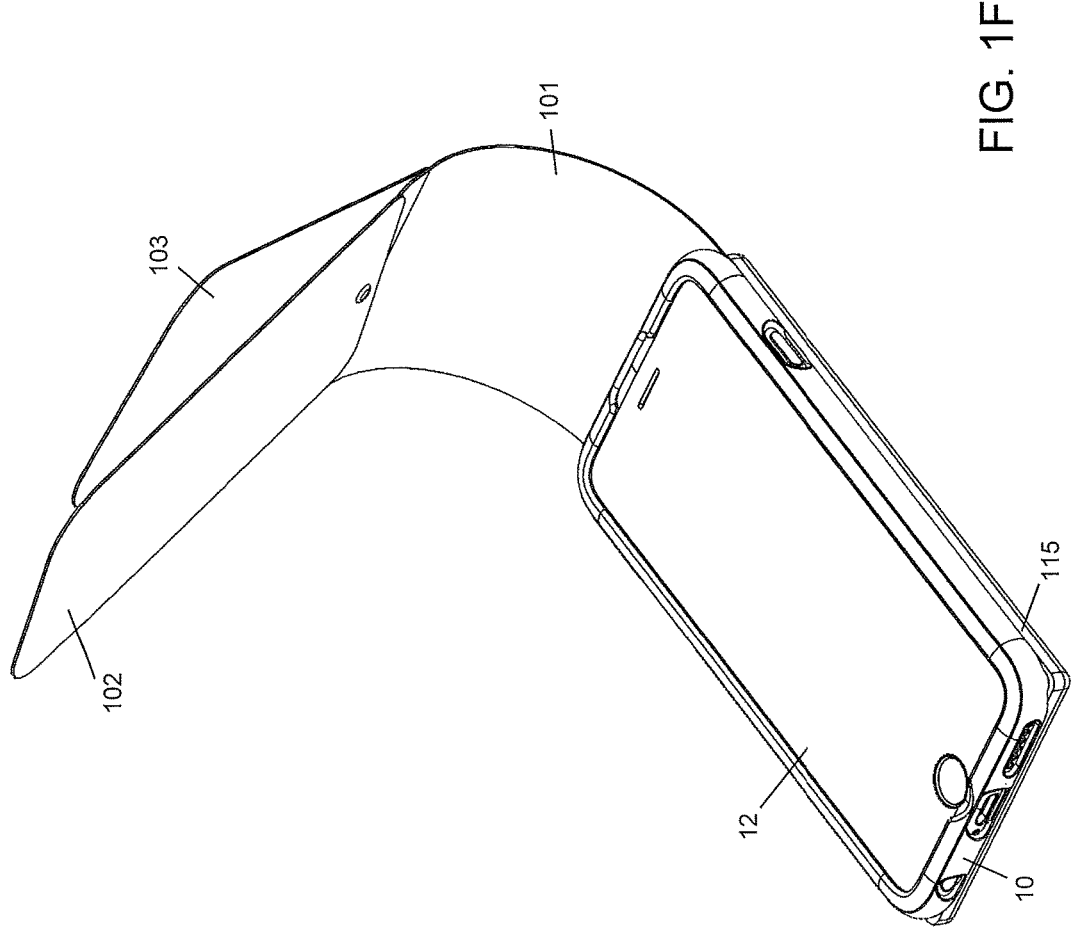

As shown in FIG. 1D, the shade panels 100 can be pulled by a user to extend in a direction of extension of the mobile device, then spread apart similar to cards in a card deck. The In particular, sections 102 and 103 can be attached at a pivot point 105 at section 101, and can fan out relative to each other from the pivot point 603 as shown in FIG. 1E. At least the center shade panel 101 is made of a flexible, bendable material, permitting the shade panels 100 to be positioned over at least part of the device display 12.

Figure 2:
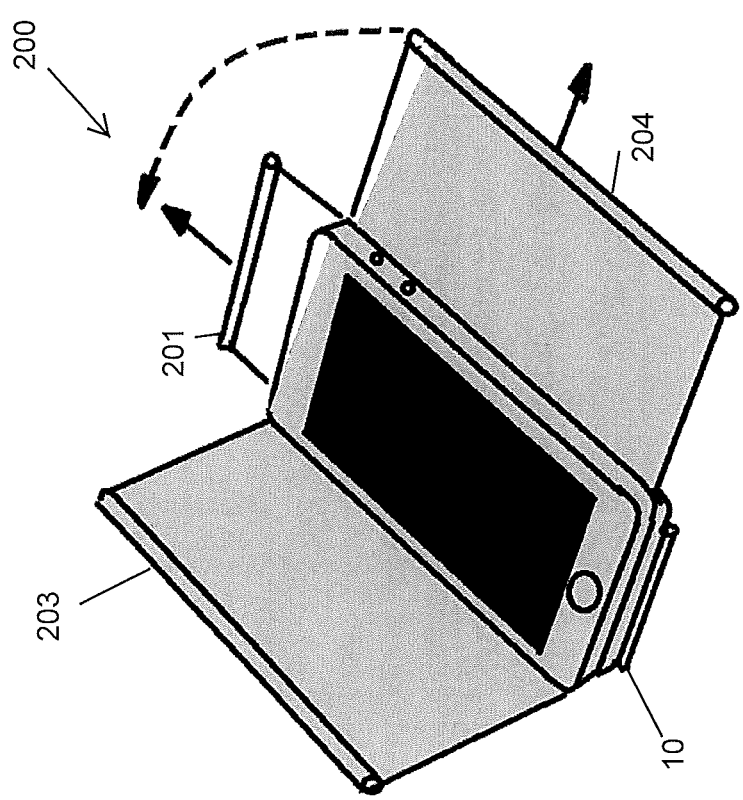
FIG. 2 is an illustration of a second embodiment of a mobile device shade in accordance with aspects of the inventive concepts.

FIG. 2 is an illustration of a second embodiment of a mobile device shade 200 in accordance with aspects of the inventive concepts. In this embodiment, the shade 200 can have a slide mechanism. In some embodiments, as shown in FIG. 2, the shade 200 is composed of one or more of center top 201, center back, left 203, and right 204 section panels, some or all of which can be housed behind the back side of a device case 10 in a stacked type formation. In some embodiments, the shade 200 may comprise only one panel, two panels, three panels or four panels, as examples. For example, in some embodiments, the shade 200 could include only one side panel and the top panel. In other embodiments, the shade 200 can comprise more than four panels. The panels are coupled to each other to move relative to each other. For example, two adjacent panels may have a hinge or bendable material so that that one or both panels can rotate about a common axis extending along the hinge or bendable material.

In this embodiment, an outside edge of the top panel has a ridge 201 or grip that the user can grasp and pull to access and deploy the panels desired for use. The other panels are shown with similar ridges. Once accessed, the hinged panels can be angled to user preference for degree and angle of shade. Therefore, the hinges preferably offer some resistance or have preset lock-in setting so that they maintain the user-desired positioning.

Figure 3:
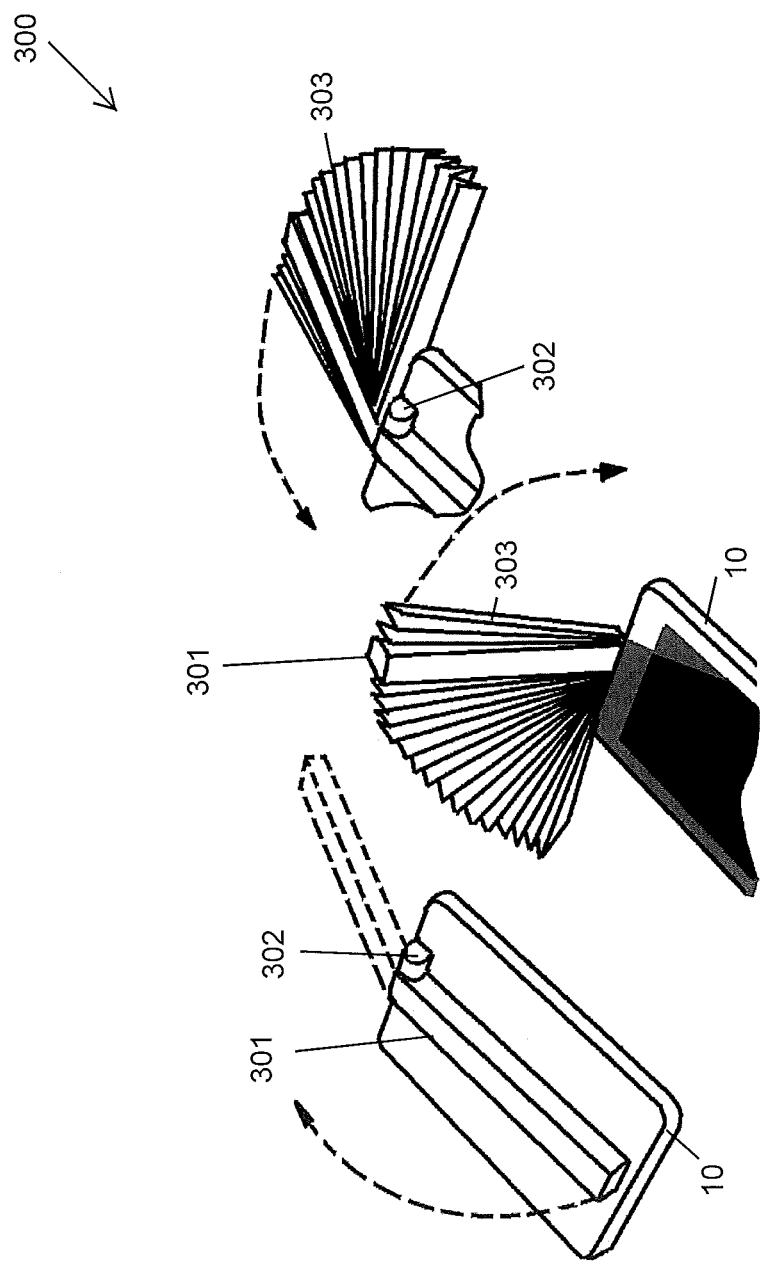
FIG. 3 is an illustration of a third embodiment of a mobile device shade in accordance with aspects of the inventive concepts.

FIG. 3 is an illustration of a third embodiment of a mobile device shade 300 in accordance with aspects of the inventive concepts. In this embodiment, the shade 300 takes the shape of a fan. The shade 300 can be formed of one or more sections 303 of folded material or formed from a plurality of joined vertical sections that collectively form a fan. The fan shade 300 can include a spine 301, which can be centrally disposed, where the width of the spine 301 can be the same as or slightly larger than the individual sections of the fan.

The fan shade 300 is stowed in the spine 301 that runs down the center of the vertical back side of the device case. In other embodiments, the spine 301 and fan shade 300 can be stowed off-center on or in at containment mechanism at the back side of the case 10, or at a side of the case 10. In this embodiment, the spine includes a hinge 302 at the narrow top edge so that upon access, it can be pulled upward and fanned outward to the desired degree of coverage and angulation.

Figure 4:
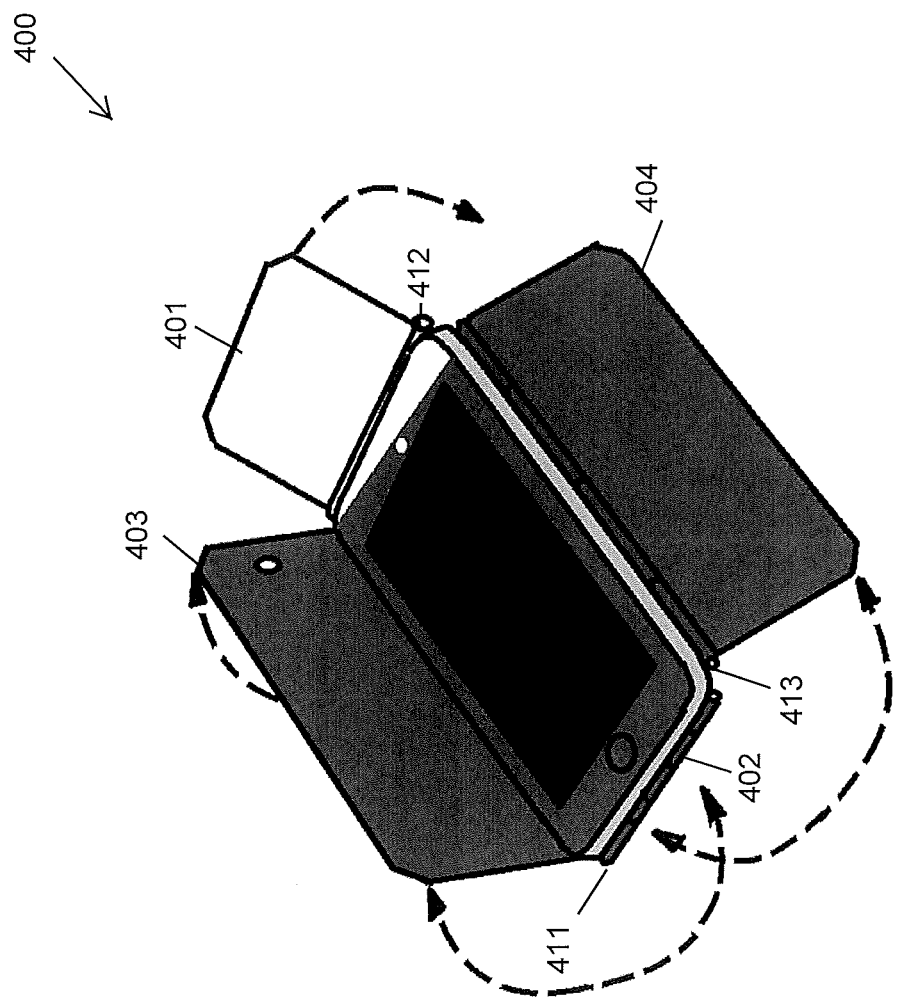
FIG. 4 is an illustration of a fourth embodiment of a mobile device shade in accordance with aspects of the inventive concepts.

FIG. 4 is an illustration of a fourth embodiment of a mobile device shade 400 in accordance with aspects of the inventive concepts. This is a hinge embodiment, where the shade 400 comprises center top 401, center back 402, left 403, and right 404 section panels, which are hinged at the back rear edges of each side of the device case. In some embodiments, the shade 400 may comprise only one panel, two panels, three panels or four panels, as examples. For example, in some embodiments, the shade 400 could include only one side panel and the top panel. In other embodiments, the shade can comprise more than four panels.

The panels 401-404 can be configured to snap closed in a stacked formation on the back side of the case when not in use. To access each panel, the user simply pulls each panel outward according to preference for degree and angle of shade. The hinges, for example, hinges 411-413, can have several lock-in-place settings or sufficient built-in resistance to allow each panel 401-404 to stay in the position desired.

Figure 5:
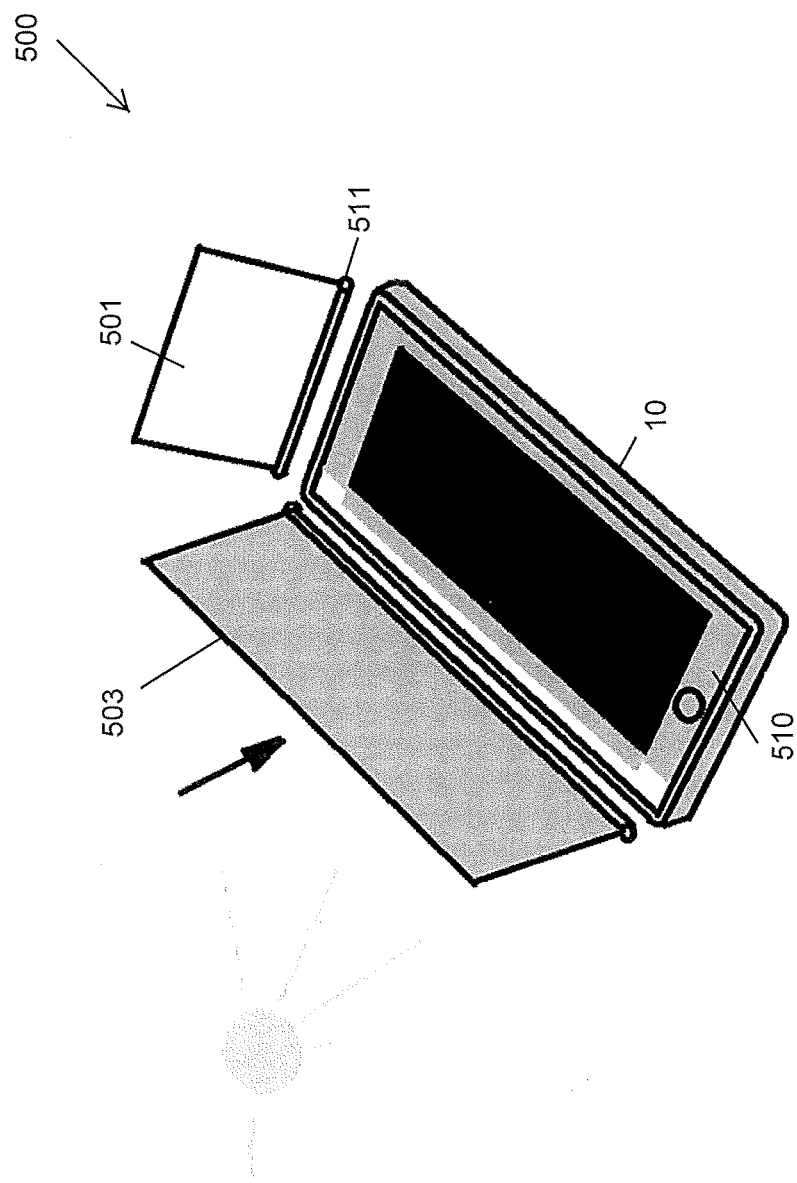
FIG. 5 is an illustration of a fifth embodiment of a mobile device shade in accordance with aspects of the inventive concepts.

FIG. 5 is an illustration of a fifth embodiment of a mobile device shade 500 in accordance with aspects of the inventive concepts. This is a snap-in panel embodiment, where the shade 500 can comprise top 501 and/or side 503 detachable panels. In other embodiments, the shade 500 can include one or more of center top, center back, left, and right section detachable panels, which can be stowed in a built in pocket, or containment mechanism, at the back side of the device case 10. Each panel may have a protrusion 511 or other element configured for insertion in a groove 510 in the case 10. Each edge of the top of the case can have a groove 510, where the panels can be turned perpendicular to the device case 10, inserted, for example, slid in, and snapped into place against the case 10. Once in place, each panel can be hinged by rotating about an axis along which the groove 510 extends, so that the respective panel can be adjusted for user preference for degree and angle of shade.

Figure 6:
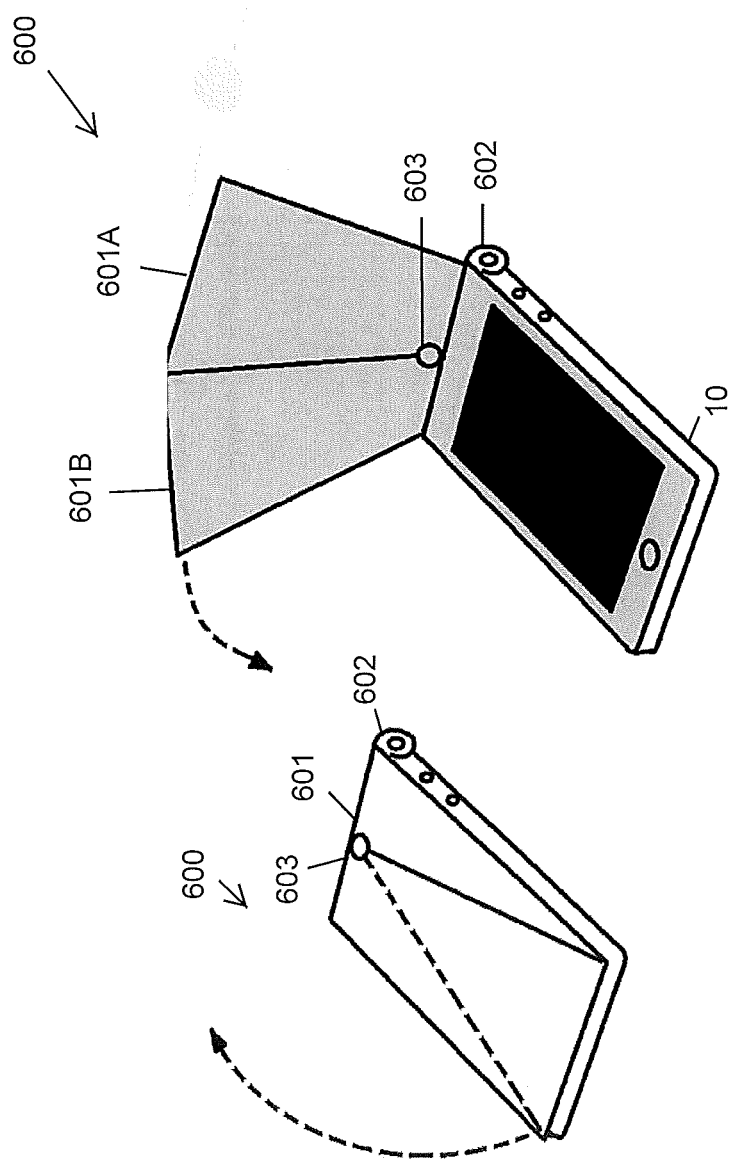
FIG. 6 is an illustration of a sixth embodiment of a mobile device shade in accordance with aspects of the inventive concepts.

FIG. 6 is an illustration of a sixth embodiment of a mobile device shade 600 in accordance with aspects of the inventive concepts. This is a "playing cards" style embodiment, where the shade is composed of two or more generally triangular sections 601A, 601B (generally, 601) that are folded to the back side of the device case in a stacked formation. The triangular sections 601 can be attached at a pivot point 603, and can fan out relative to each other from the pivot point 603. The section stack 601 can be accessed at a grooved edge on the widest edge of the device case 10, then pulled upward and outward (shown by arrows) on a hinge 602 to form a shade at the top edge of the device case 10. The user can therefore adjust the shade 600 as desired.

Figure 7:
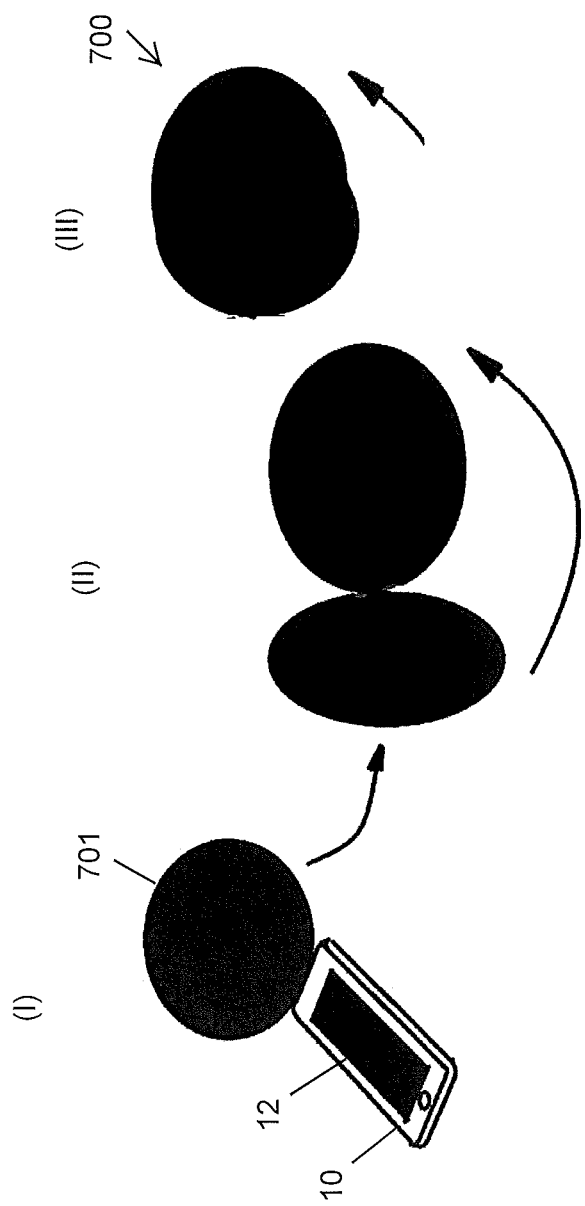
FIG. 7 is an illustration of a seventh embodiment of a mobile device shade in accordance with aspects of the inventive concepts.

FIG. 7 is an illustration of a seventh embodiment of a mobile device shade 700 in accordance with aspects of the inventive concepts. This is a hoop embodiment, where the shade 700 is composed of a circular shaped plastic hoop 701, which can be attached to the top edge of the back side of the device case 10, or another location of the case 10, or mobile device itself in a manner that shades the display 12 from the sun or other light source. The hoop 701 can be formed of plastic, fabric, or other well-known materials. When not in use, the hoop 701 folds such that the layers can be snapped or otherwise adhered to the back of the case 10. At step (I), the hoop 701 can be attached to the mobile device, or its case 10, with an attachment device such as Velcro™, snap, zipper, and so on. At step II, the hoop 701 can be folded in half, and at step III can be stored at a pocket or other storage area at the mobile device.

Figure 8A:
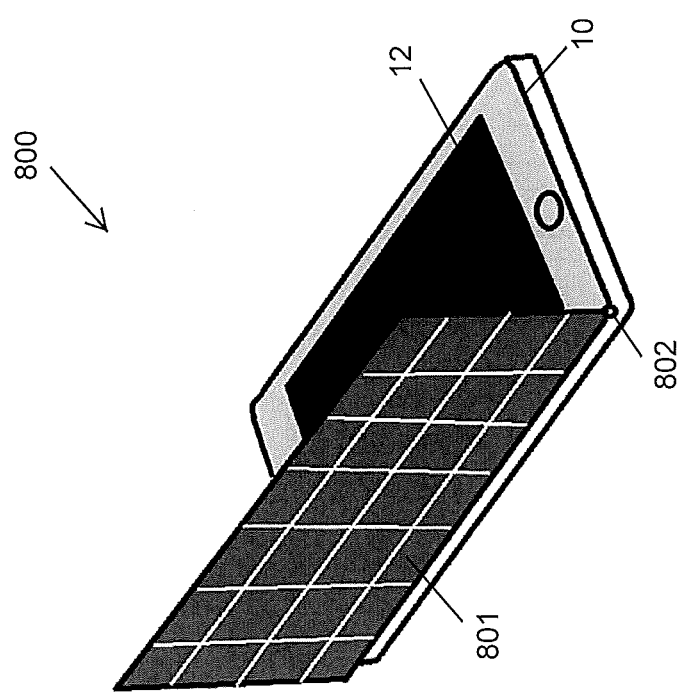
FIG. 8A is an illustration of an eighth embodiment of a mobile device shade in accordance with aspects of the inventive concepts.

FIG. 8A is an illustration of an eighth embodiment of a mobile device shade 800 in accordance with aspects of the inventive concepts. This is a solar embodiment, where the shade 800 is composed of one or more hinged panels 801 that can be engineered to collect solar energy. As in the hinge embodiments described above, the solar panel(s) 801 can be moved, for example, rotate about a hinge 802 according to user preference. That is, in various embodiments, the shade 800 or, more specifically, one or more shade panels 801 can include a solar energy absorbing material or device(s). The solar concept is not limited hinged shade embodiments. For example, the shade panels 801 can be part of one or more previously described embodiments illustrated with respect to FIGS. 1-7, for example, attached to the case 10 or mobile device itself by a mechanism such as snaps, Velcro™, or the like, by a hinge 802, a fan configuration, and so on.

Figure 8B:
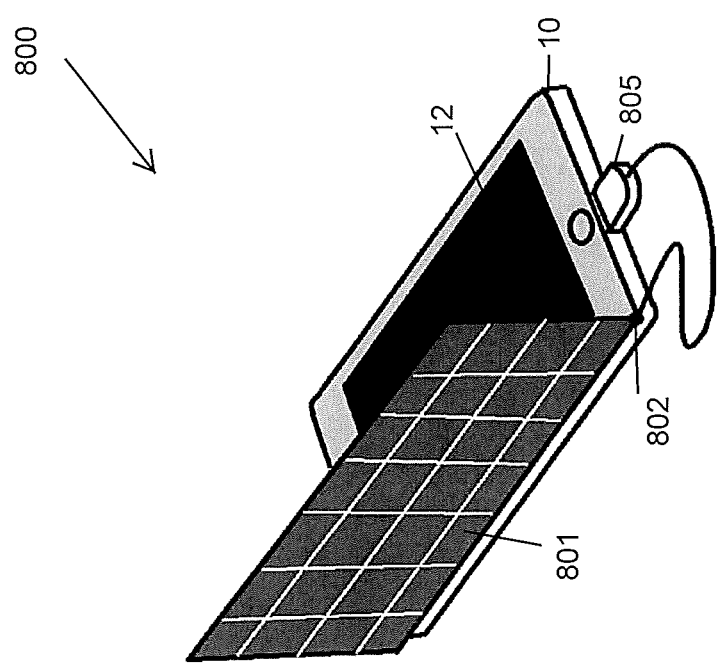
FIG. 8B is an illustration of a variation of the eighth embodiment of a mobile device shade in accordance with aspects of the inventive concepts.

FIG. 8B is an illustration of a variation of the eighth embodiment of a mobile device shade 800 in accordance with aspects of the inventive concepts. In this solar embodiment, the shade and solar energy collection features can be as described above with respect to FIG. 8A. However, in this embodiment, the solar energy captured by the solar panels 801 can be returned to the device 12 through a pig tail device 805, or other device, that connects to the device power source, for example, via a USB adaptor.

Figure 9:
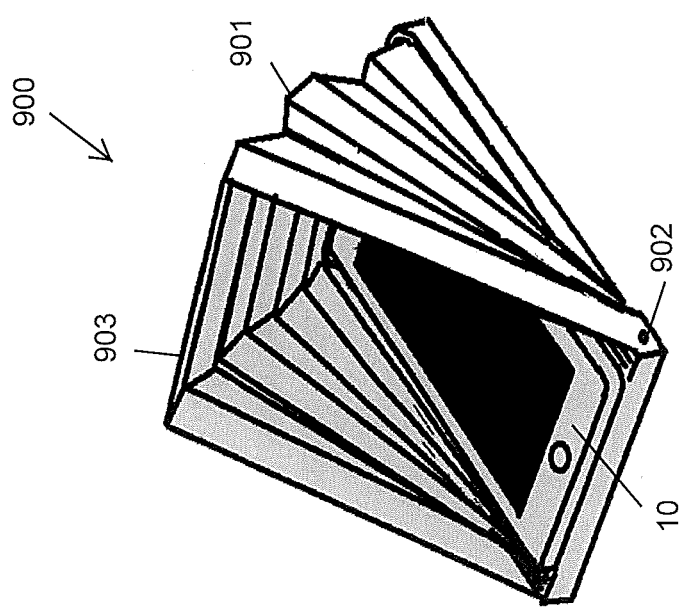
FIG. 9 is an illustration of a ninth embodiment of a mobile device shade in accordance with aspects of the inventive concepts.

FIG. 9 is an illustration of a ninth embodiment of a mobile device shade 900 in accordance with aspects of the inventive concepts. The shade 900, also referred to as a boot, is composed of collapsible rubber or the like. The shade 900 is constructed in a manner that permits the shade to be in a stowed state or an open state. In the stowed state, the shade forms a plurality of tight folds, or telescoping layers 901, around the device case 10. The layers 901 can each have an end that join at a common region 902, which can serve as a hinge for expanding the folds in the open state as shown in FIG. 9, or collapsing the folds 901 in the stowed state. When the user pulls the edge of the outer edge 903 of the shade, it expands to the open state to provide coverage on three sides of the electronic device.

FIGS. 10A-10F, 10G-1, 10G-2, 10H-10N provide various views of a tenth embodiment of a mobile device shade 1000 in accordance with aspects of the inventive concepts. In this embodiment, the shade 1000 includes 3 panels 1002A, B, C (generally, 1002) that extend from a top portion 1001, also referred to as a panel support, and that are layered to overlap, which can be referred to as a shade assembly. Also in this embodiment, in a stowed state, the 3 panels 1002 may overlap and, in combination with a panel support 1004 that can form part of the shade assembly, take a substantially rectangular form, in some embodiments. Although, as will be seen in the figures, in some embodiments a distal edge of each panel 1002, away from a proximal edge of a hinge 1006, can be curved to create a shade with a curved top edge (or distal end) when opened and deployed. This form can approximate the size of the front of the mobile electronic device 10, also referred to as a mobile device, e.g., mobile phone. Although a mobile electronic device 10 is referred to herein, reference can also be made to a mobile device case in addition to, or instead of, the mobile electronic device. In various embodiments, the distal edges can take other forms, including other straight or non-straight forms. In some embodiments, the shade assembly 1000 can be integrated with the device 10. In other embodiments, the shade assembly 1000 can be part of a case at least partially surround the device 10. In yet some other embodiments, the shade assembly 1000 is attached to the device 10 and/or case.

In various embodiments, the inside of the panels 1002 can have a flat finish to provide maximum contrast, reduce glare, and improve visibility, such as a flat black finish. This can be true of the other embodiments described herein as well. The exterior of the panels 1002 can offer creative flexibility for finish and design, e.g., for branding and/or personalization, as shown.

Figure 10A:
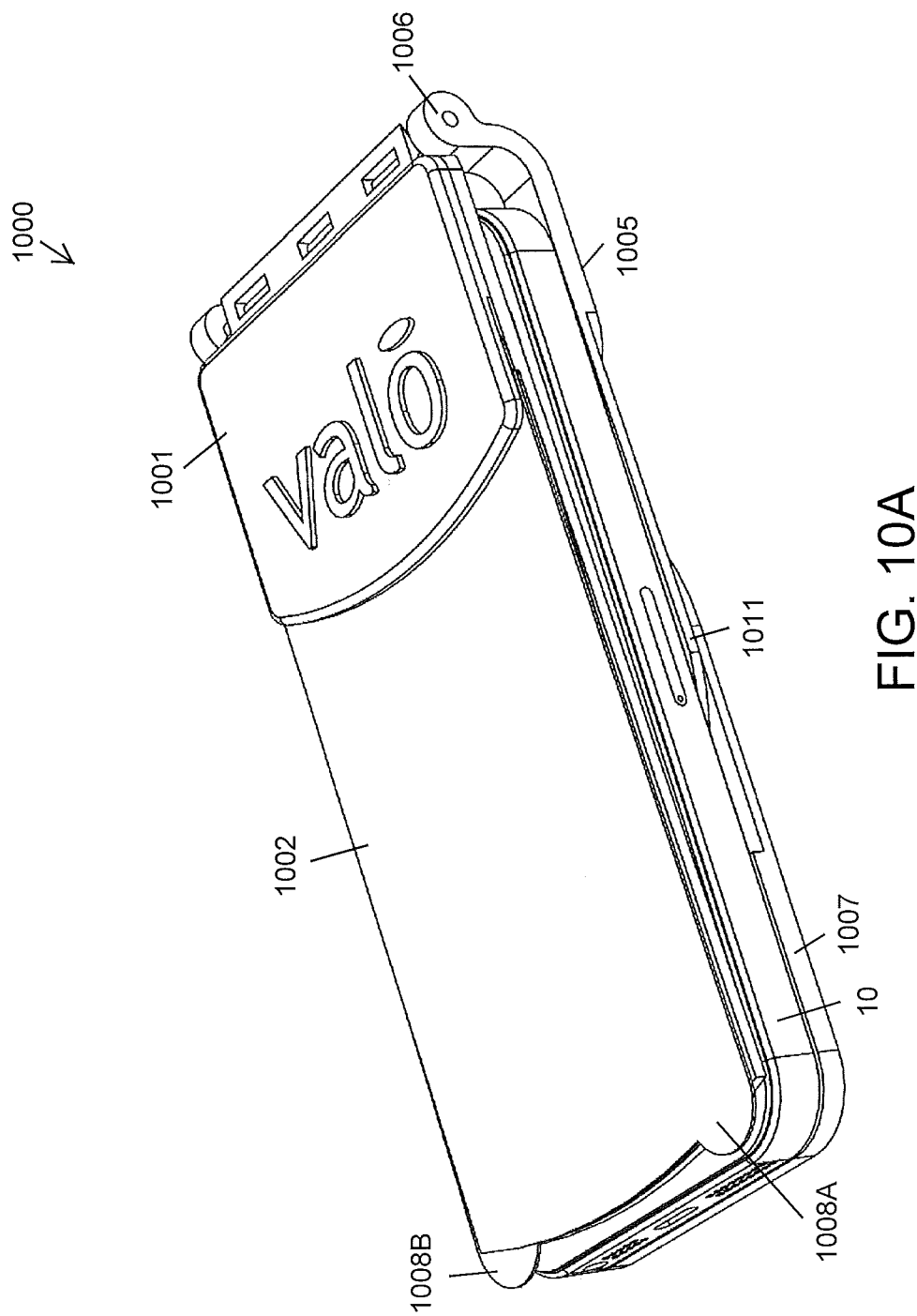
FIG. 10A provides a perspective view of a tenth embodiment of a mobile device shade attached to a mobile phone, in accordance with aspects of the inventive concepts.
Figure 10B:
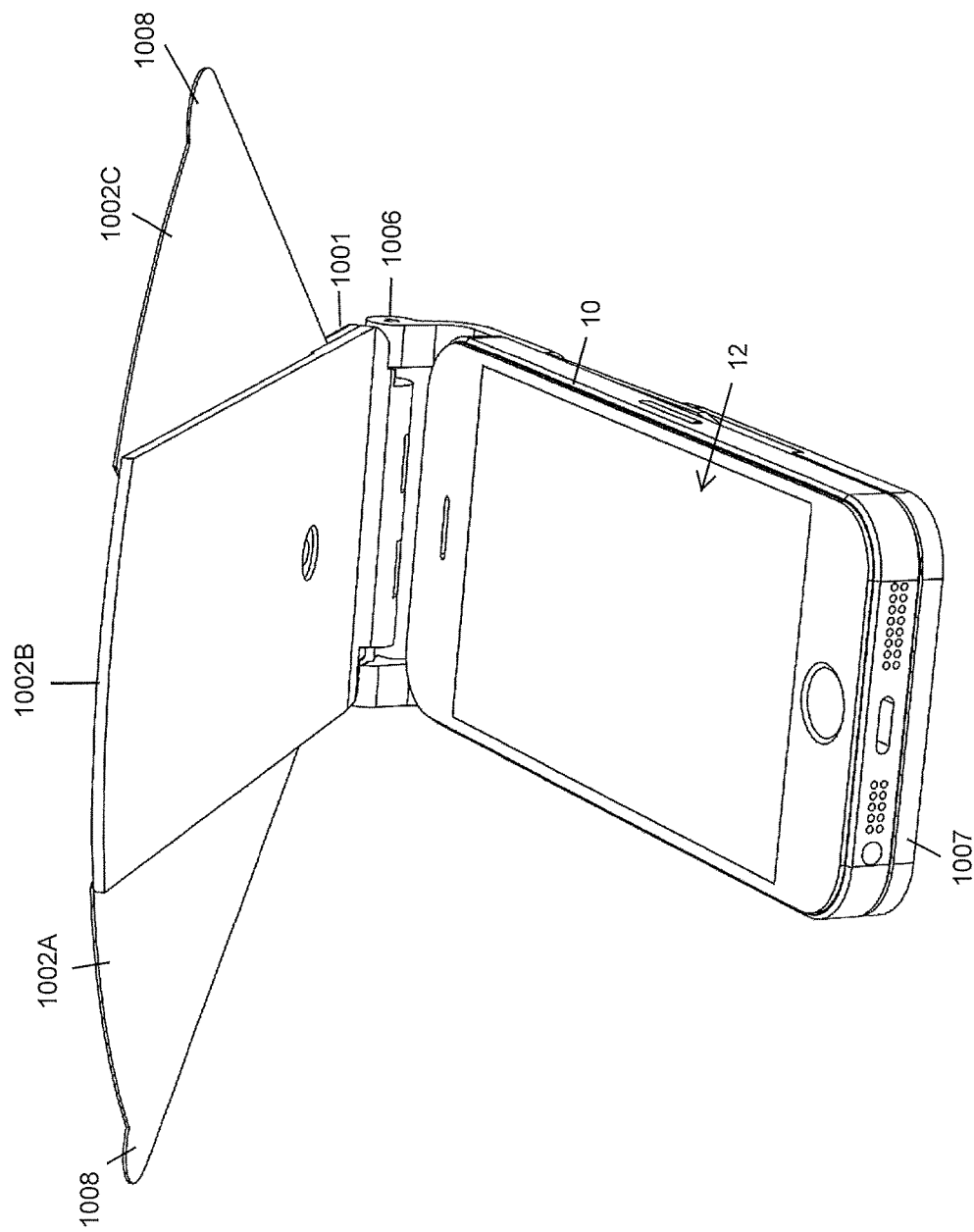
FIG. 10B provides a perspective view of the mobile device shade of FIG. 10A in a deployed state.

In various embodiments, one or more of the panels 1002 can have protrusions or tabs 1008 that facilitate opening and/or closing of the shade panels from an undeployed state to a deployed (fanned) state, e.g., as in FIGS. 10A and 10B. For example, left and right panels 1002A, C can each have a tab 1008A, 1008B as shown. Other mechanisms for enabling finger engagement can be provided in other embodiments, which may or may not include such tabs or protrusions. As examples, these other mechanisms could include one or more of depressions, lips, ridges, hooks, or textures, integral with or coupled to one or more of the panels 1002, which could optionally be used in combination with tabs in some embodiments.

In this embodiment, the three panels 1002 are layered so that the two top-most panels are right and left panels and the bottom (or distal) panel is a center panel, which is closest to the display screen 12. In other embodiments, the arrangement or layering of the panels 1002 could be reversed so that the center panel is on top. And in yet other embodiments, the center panel 1002B could be layered between the left 1002A and right side 1002C panels. Returning to the present embodiment, the one or both of the side panels 1002A, C can be spread to the right and left, respectively, and extend from the center panel 1002B to collectively form an expanded (or fanned) shade. FIGS. 10B-F show the 3 panels 1002A-C opened, i.e., spread apart similar to cards in a card deck, although the shade 1000 is yet to be rotated away from the mobile device for display screen use in this figure.

In the embodiments shown, when the user opens shade 1000 at the top hinge 1006, such as by rotating the shade panels 1002 about the rod 1009 (see FIG. 10F) forming at least part of the hinge 1006 to be away from the display screen 12 of the mobile device, the layered panels 1002 can be maintained at one of several fixed angles at stop positions built in to the hinge 1006. A "stop position" is a hinge mechanism 1006 that maintains the shade assembly 1000 in a predetermined rotational orientation relative to the mobile device or case 10. This can be accomplished by various types of mechanisms that increase resistance at each stop position. It can be achieved using various types of hinge devices, such as seats, gears, tongue-and-groove mechanism, as well as by other means known in the art. As shown in the example of FIG. 10F, the hinge 1006 can include slots corresponding to preset stop positions, wherein a proximal end of the shade assembly 1000 that connects to the hinge 1006 or that includes a portion of the hinge 1006 slides into a slot to lock the shade at the corresponding stop position angle. A hinge 1006 can have more than one stop position setting.

The shade assembly panels 1002 can be deployed, or locked, a desired position relative to the mobile device 10. For example, FIGS. 10D and E show the shade assembly panels 1002 deployed at a 45 degree position relative to the display screen 12 of the mobile device 10, which could be set in the hinge 1006 as a stop position. The hinge 1006 could be implemented in configurations that permit other or different stop positions, such as at 90 degrees, or other angles, relative to the display screen surface or face of the mobile device. Beyond any stop positions at angles related to the display 12, the hinge 1006, and more specifically, the rod 1009 extending from holes in either side of a base 1005 through an outer edge of the top portion 1001, can be made to enable rotation of the shade 1000 at virtually any angle to a user-selected position or angle, 0 degrees to 360 degrees with respect to the display screen 12. In some embodiments, the base 1005 and top portion 1001 can be configured such that the top portion has some lateral freedom of movement on rod 1009, as indicated by the double arrow in FIGS. 10G-1 and 10G-2.

Figure 10C:
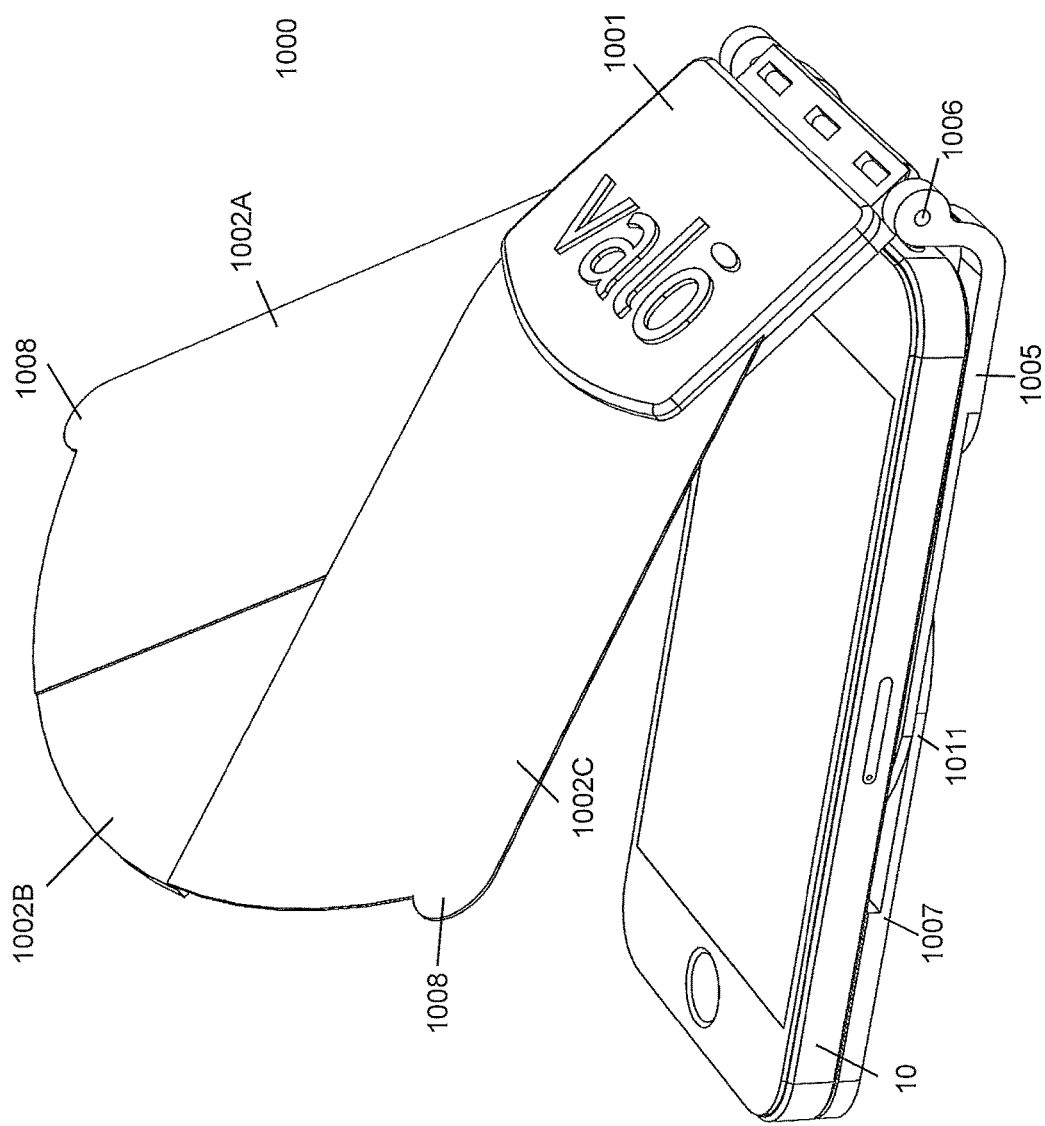
FIG. 10C provides another perspective view of the mobile shade device of FIG. 10A in the deployed state.
Figure 10D:
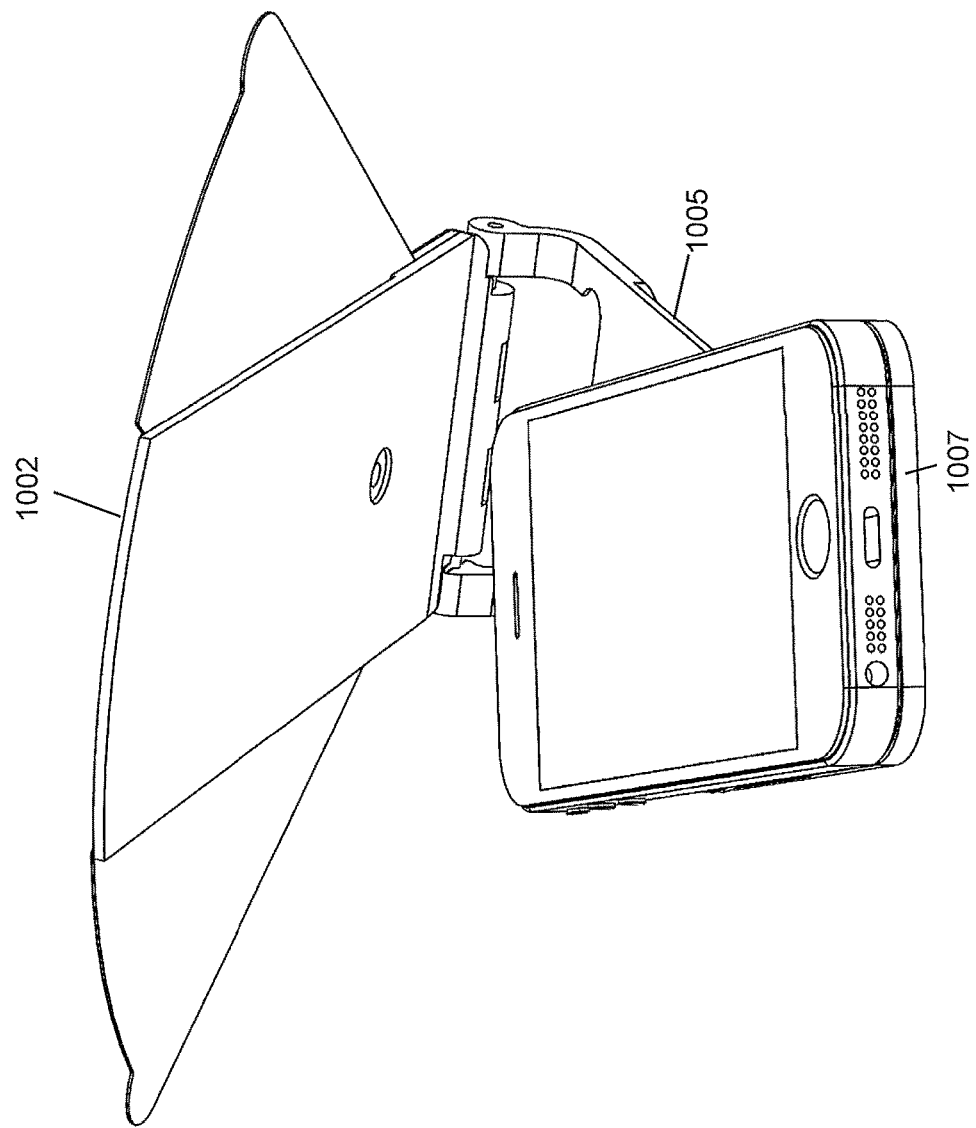
FIG. 10D provides another perspective view of the mobile shade device of FIG. 10A in the deployed state, with the shade partially rotated with respect to the mobile device.
Figure 10E:
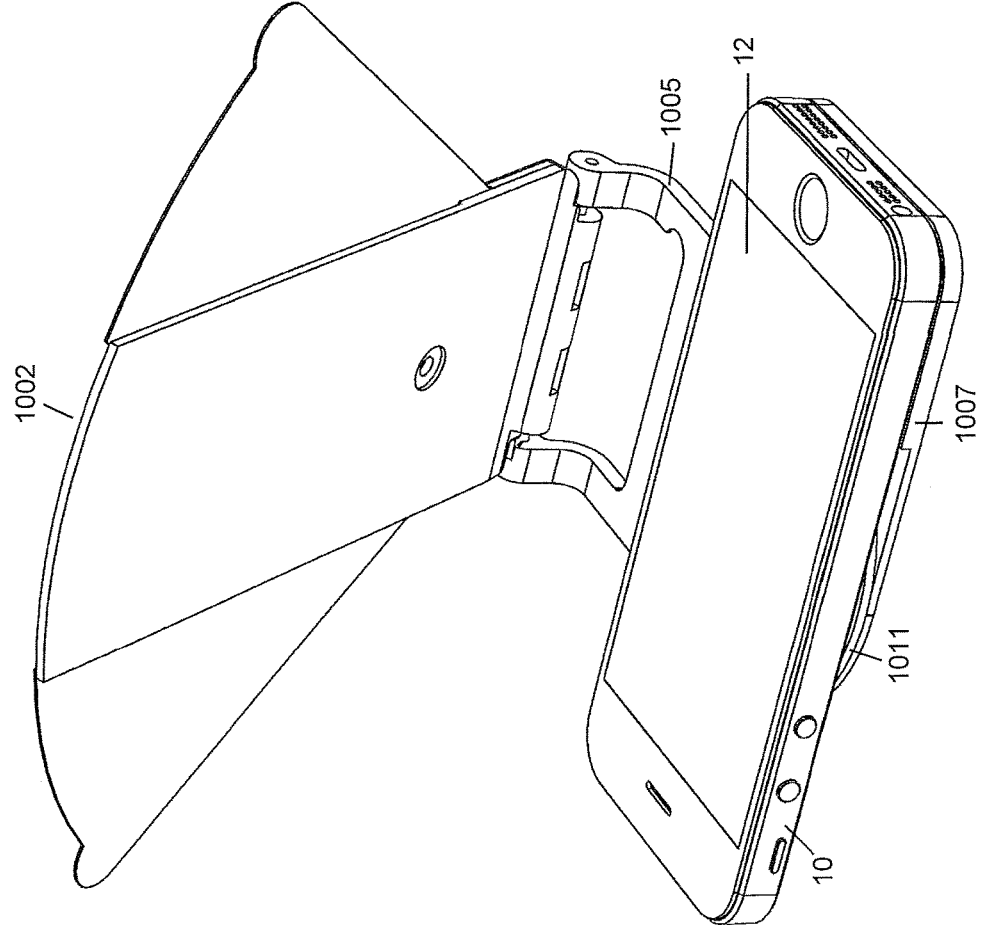
FIG. 10E provides another perspective view of the mobile shade device of FIG. 10A in the deployed state, with the shade rotated with respect to the mobile device.
Figure 10F:
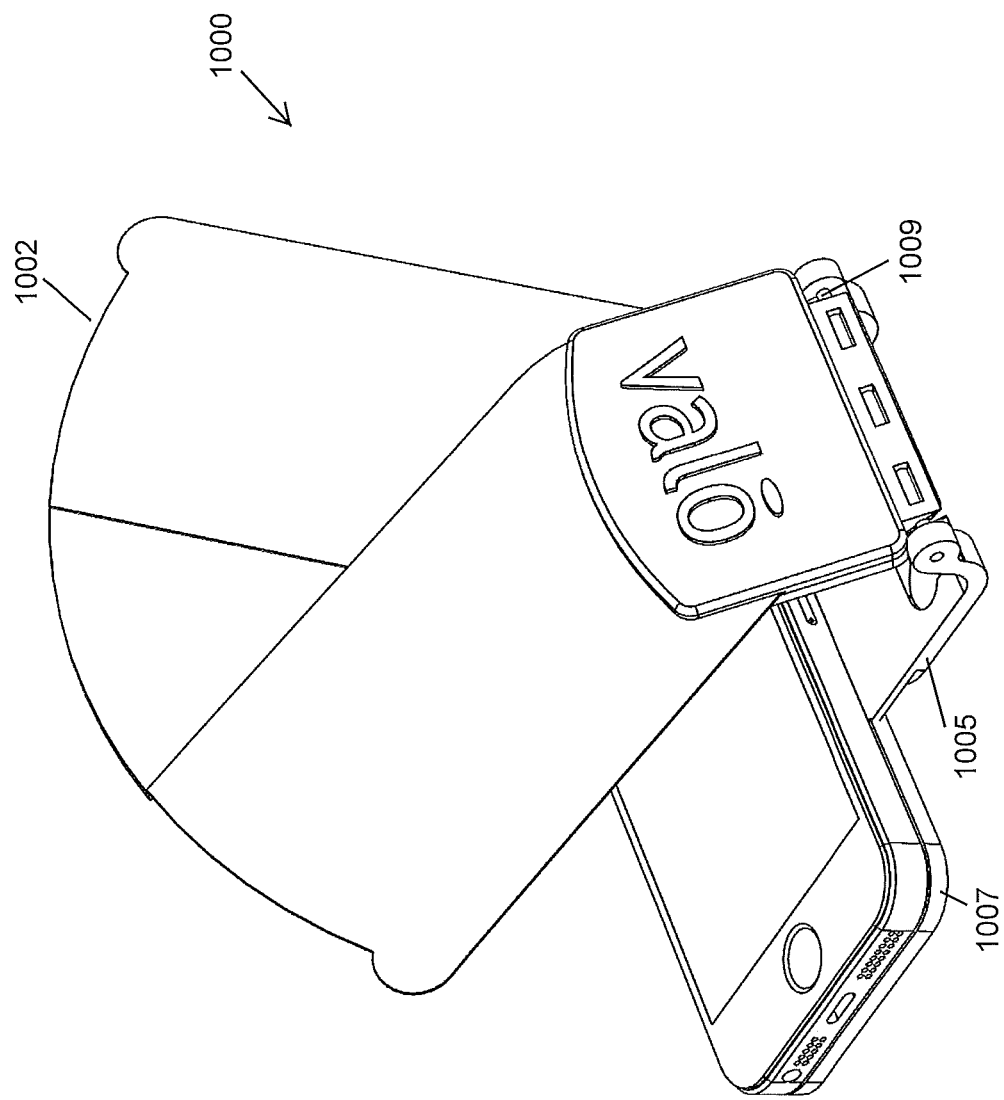
FIG. 10F provides another perspective view of the mobile shade device of FIG. 10E in the deployed state, with the shade rotated with respect to the mobile device.
Figures 1, 10G:
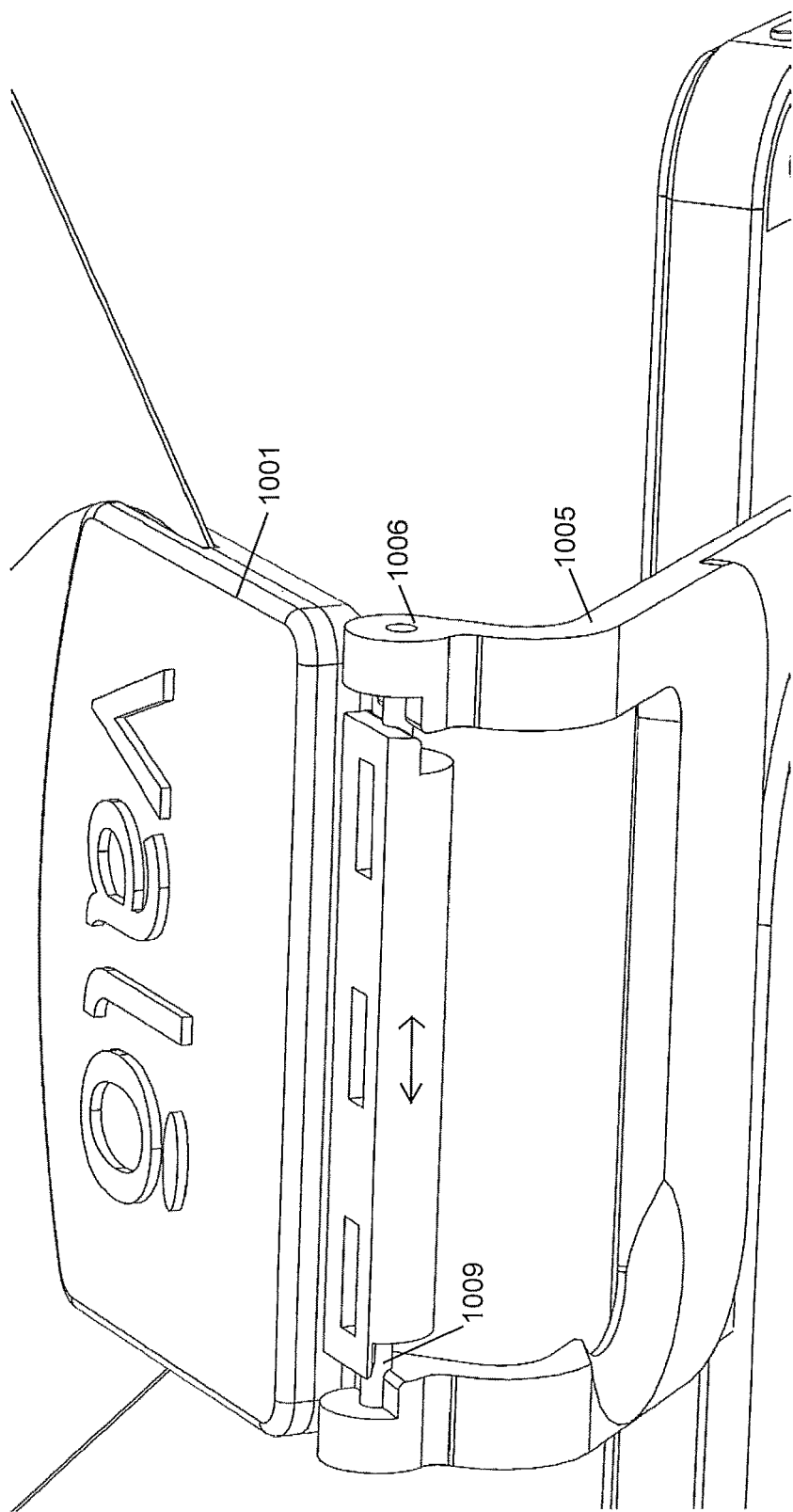
FIG. 10G-1 shows a partial view of the shade of FIG. 10F where a base is centrally disposed on a rod.
Figures 2, 10G:
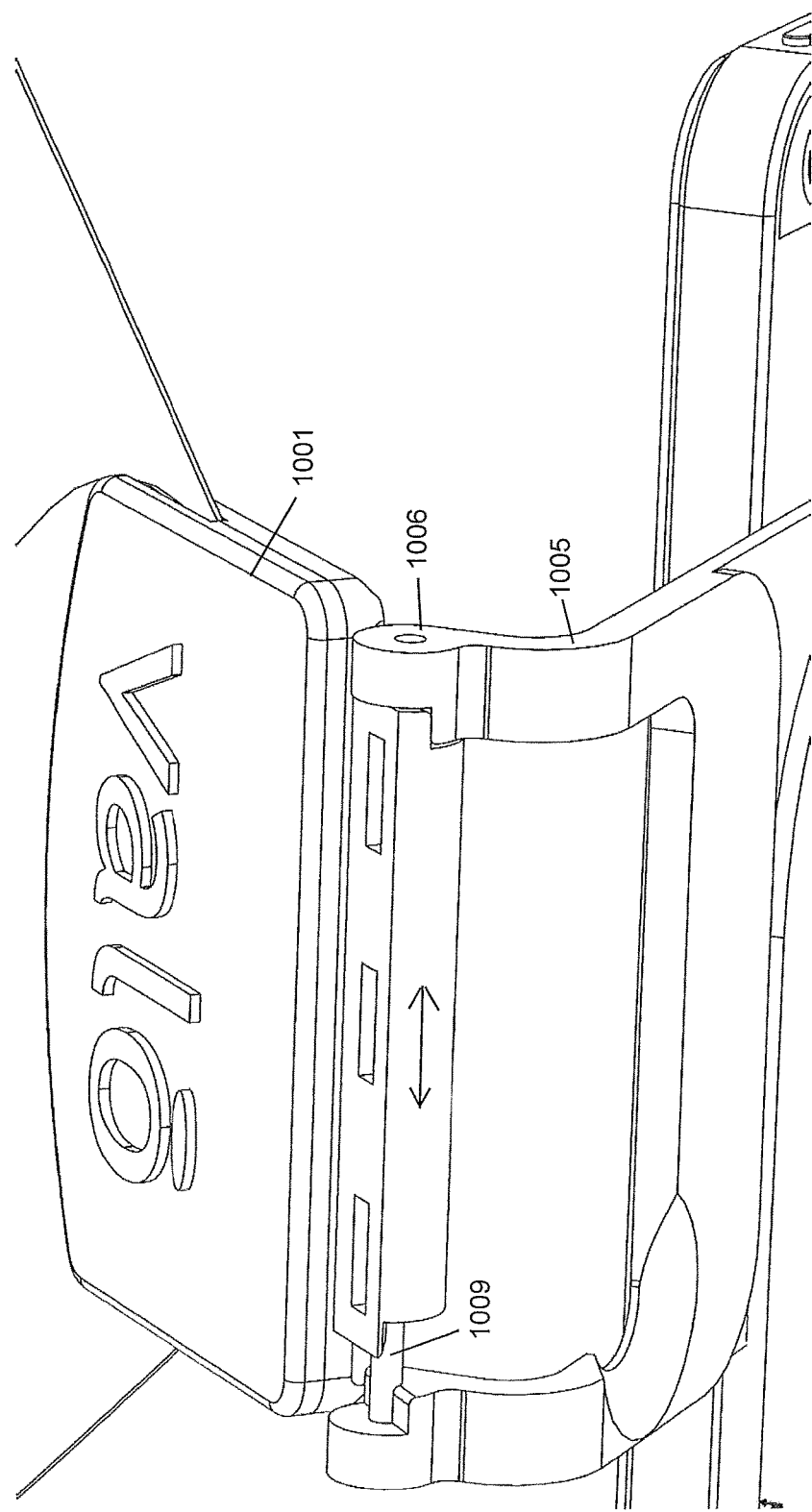
Figure 10H:
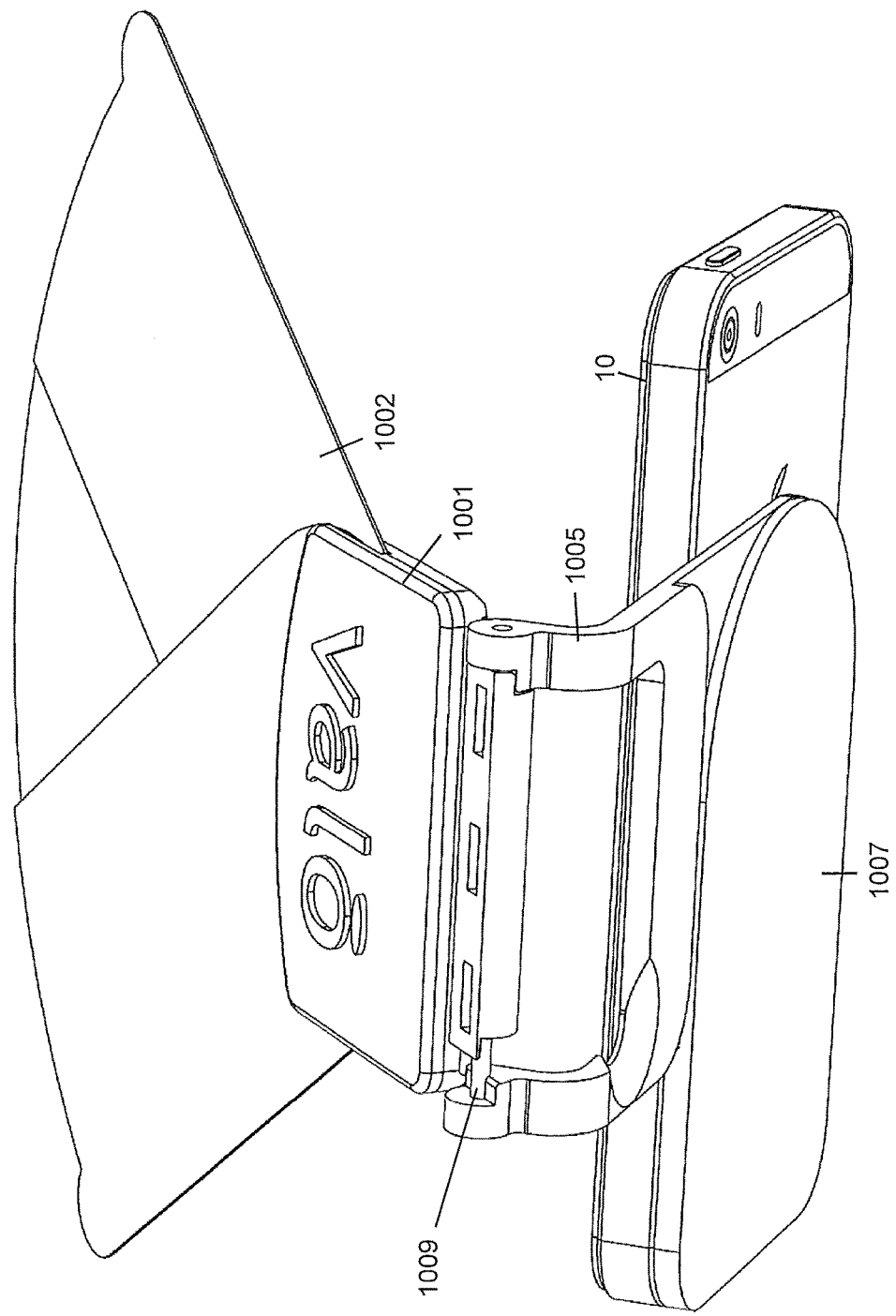
FIG. 10H provides full perspective view of the mobile shade device of FIG. 10G-2.
Figure 10I:
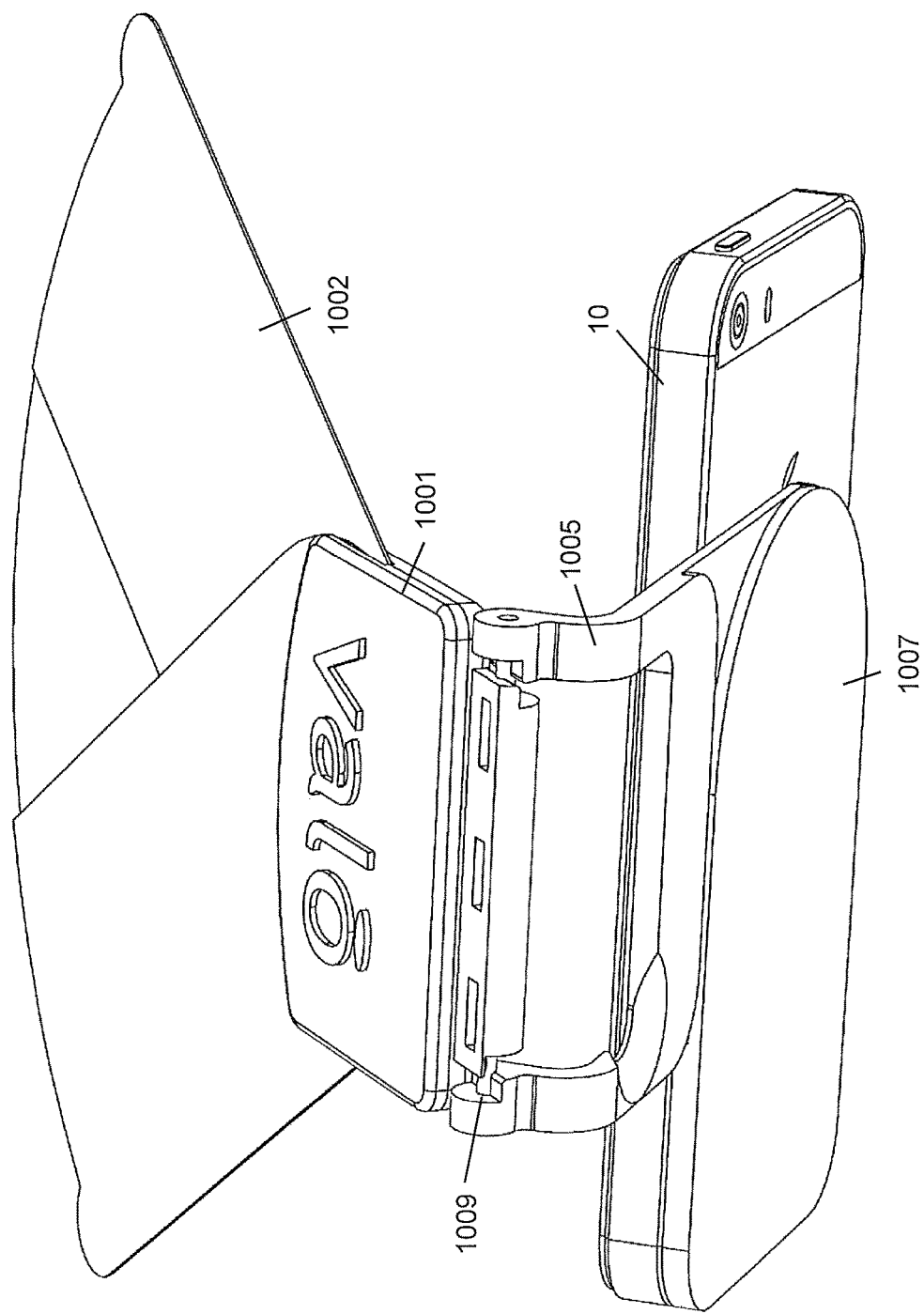
FIG. 10I provides full perspective view of the mobile shade device of FIG. 10G-1.
Figure 10L:
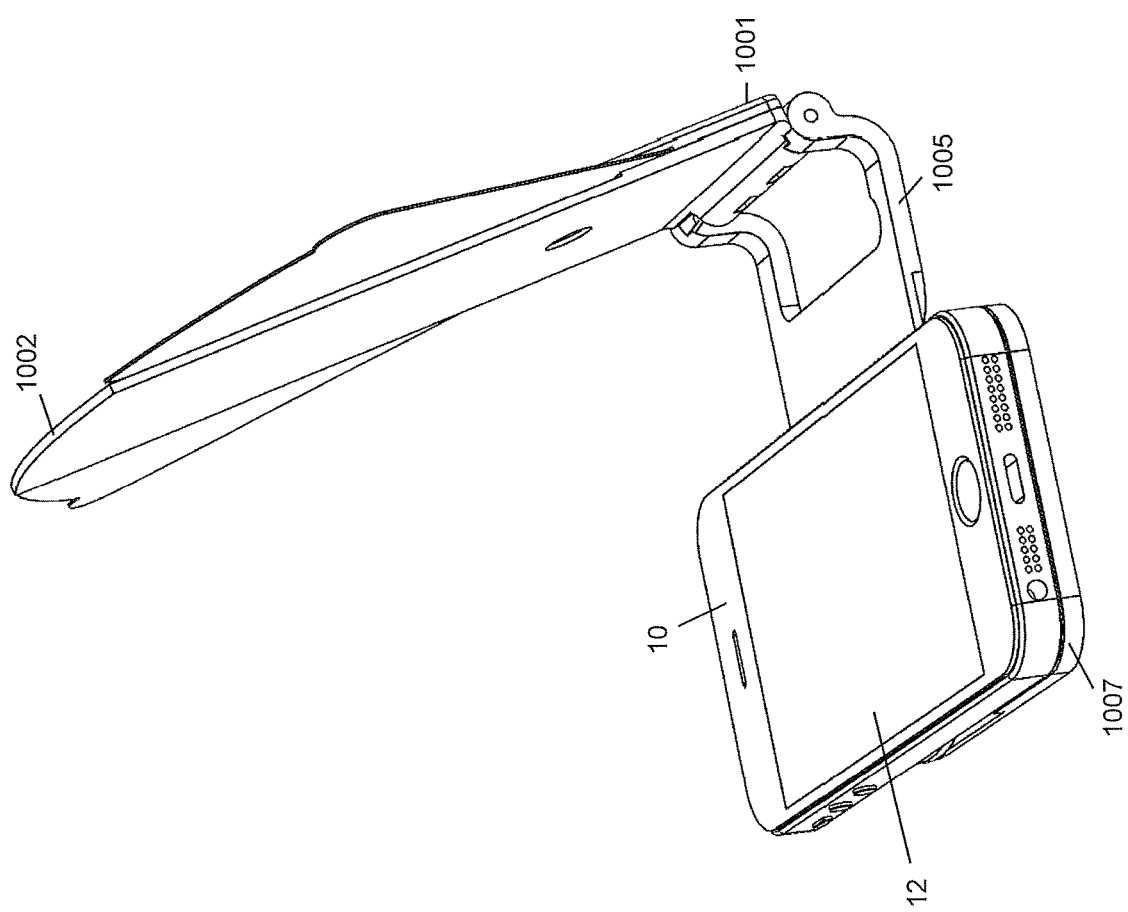
FIG. 10L provides another perspective view of the mobile shade device of FIG. 10I.
Figure 10M:
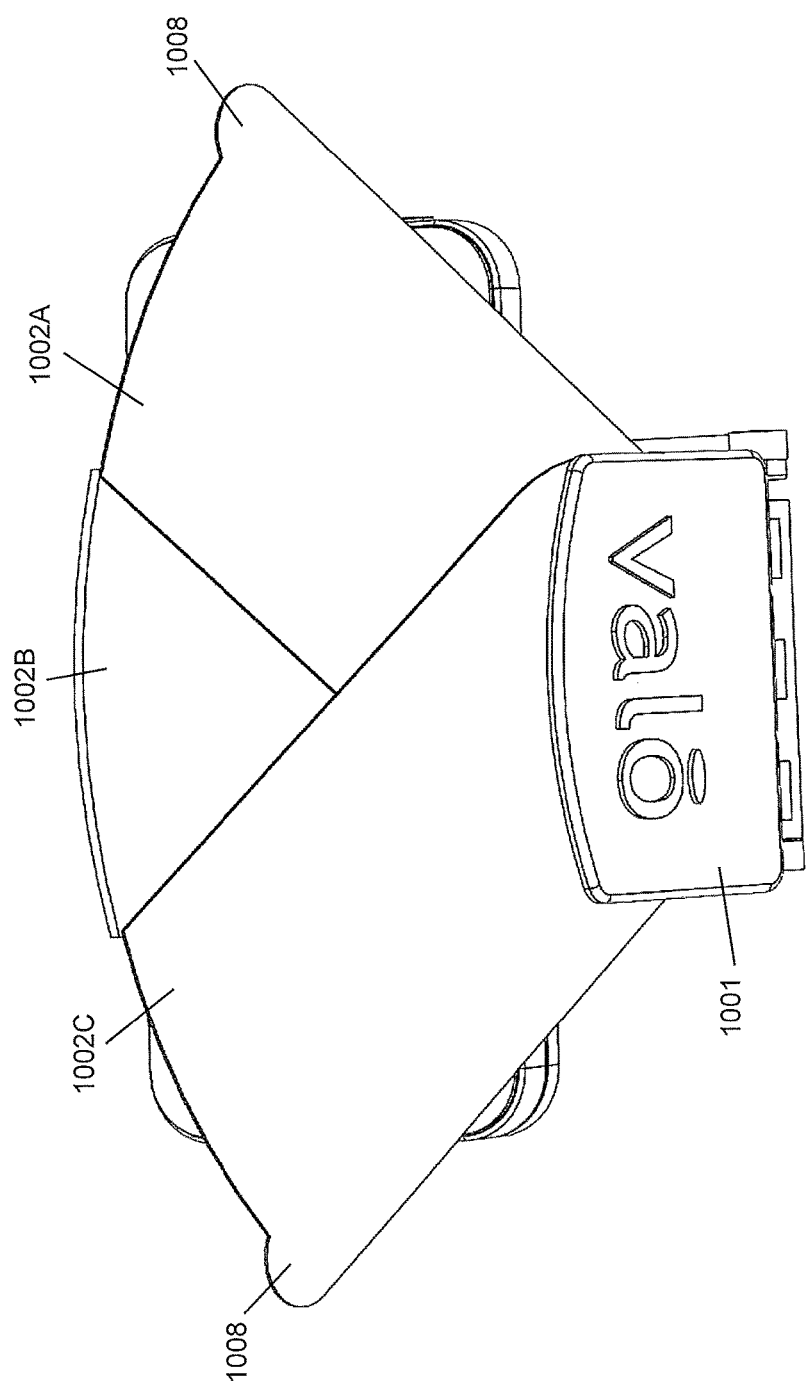
FIG. 10M provides another perspective view of the mobile shade device of FIG. 10H.

Also, as shown in FIGS. 10C-F and FIG. 10N, the base 1005 having can be movably attached to a pivot post 1011 (see FIG. 10N) extending from the extendable portion 1007 to form another pivot point. In FIGS. 10A-C, the base 1005 and extendable portion 1007 each extend along the same direction of extension as the mobile device 10, so that the hinge 1006 of the base 1005 is proximal a top or head region of the mobile device 10. However, as shown in FIG. 10D, the base 1005 can pivot or swivel about the pivot post 1011 relative to the stationary extendable portion 1007, for example, in a clockwise direction about the periphery of the mobile device 10. In FIG. 10D, the base 1005 is about 45 degrees relative to the direction of extension of the mobile device 10 and extendable portion 1007. In FIG. 10E, the base 1005 is 90 degrees relative to the direction of extension of the mobile device 10 and extendable portion 1007. Accordingly, shows the shade assembly 1000 in a layered configuration can rotate 180 degrees, or more, relative to the display screen 12 of the mobile device 10. Therefore, the hinge 1006 preferably provides sufficient resistance to maintain the shade assembly 1000 in various user-selected positions within a range of positions. In particular, the hinge 1006, or more specifically, the rod 1009, extends along of a first axis that permits that panels 1002 to move at an angle relative to the display 12. The pivot post 1011 can extend along a second axis orthogonal to the first axis, so that the panels 1002, and base 1005, can be rotatable to the extendable portion 1007.

A user can deploy the shade assembly 1000 without opening the panels 1002A-C. Here, the shade assembly 1000 is rotated away from the display screen of the mobile device without opening, i.e., fanning out or separating from each other the panels 1002A-C. In such instances, opening any or all the shade panels 1002 may not be required, e.g., if no glare is present, so the shade assembly 1000 can be easily rotated out of the way. In various embodiments, the shade assembly 1000 could be biased on a closed, undeployed position. Or there may be sufficient resistance in the hinge 1006 that the shade assembly 1000 need not be biased to maintain itself in the closed position. The closed shade protects the display screen 12. So when not in use, the shade panels 1002 can still serve as a protective cover for the display screen 12.

In some embodiments, the top portion 1001 is coupled to the panels 1002 of the shade assembly 1000 via the hinge 1006. Therefore, in this embodiment, the shade apparatus 1000 is a separate component configured to attach to the mobile device. It could be configured to attach to the mobile device, for example, clip to the device, couple to the device via a magnet, or other coupling mechanism, when the mobile device is not in a case or when it is in a case. In some embodiments, therefore, the hinged shade 1000 and base mechanism 1005 can form a clip arrangement that keeps the shade 1000 on the mobile device. In other embodiments, the shade apparatus 1000 can be built into a mobile device case 10, as an example, or attachable to a mobile device case. Therefore, in various embodiments, the base 1005 can be a mobile device case 10 that fully or substantially encases a body of the mobile device. The shade assembly 1000 can be removably or permanently attached to the base 1005, whether the base 1005 takes to form of a mobile device case or not (e.g., as shown herein).

In this embodiment, the mobile device shade 1000 can be removably coupled to the mobile device 10 in a variety of orientations—to accommodate different glare angles or different display orientations, e.g., portrait or landscape. The mobile device shade hinge 1006 and panels 1002 can be rotated or otherwise migrated from the top of the mobile device 10 to a side of the mobile device, while remaining coupled to the mobile device. In other embodiments, the base mechanism 1005 can move with the panels 1002 of the shade assembly 1000.

In embodiments where the base 1005 is integrated with or otherwise part of a mobile device case, the attachment of the hinge 1006 and shade assembly 1000 to the mobile device case can include a pivot element such as rod 1009 that enables the panels 1002 of the shade assembly 1000 to pivot relative to the base 1005 and/or mobile device 10 to achieve the various orientations mentioned (see for example FIG. 10B).

Also as described above, another, second pivot point may be formed between the base 1005 and the extendable portion 1007 of the base. At the second pivot point, a user can angle the shade further to the right or left of the mobile device 10 to provide desired coverage against various angles of overhead light, as an example. The pivot could further be configured to allow the user to position the shade in a "landscape" orientation over the mobile device 10, or at intermediate orientations between portrait and landscape. The shade panel 1002 can also be rotated backward and held to the rear of the device 10, e.g., out of the way, according to user preference.

Figure 10N:
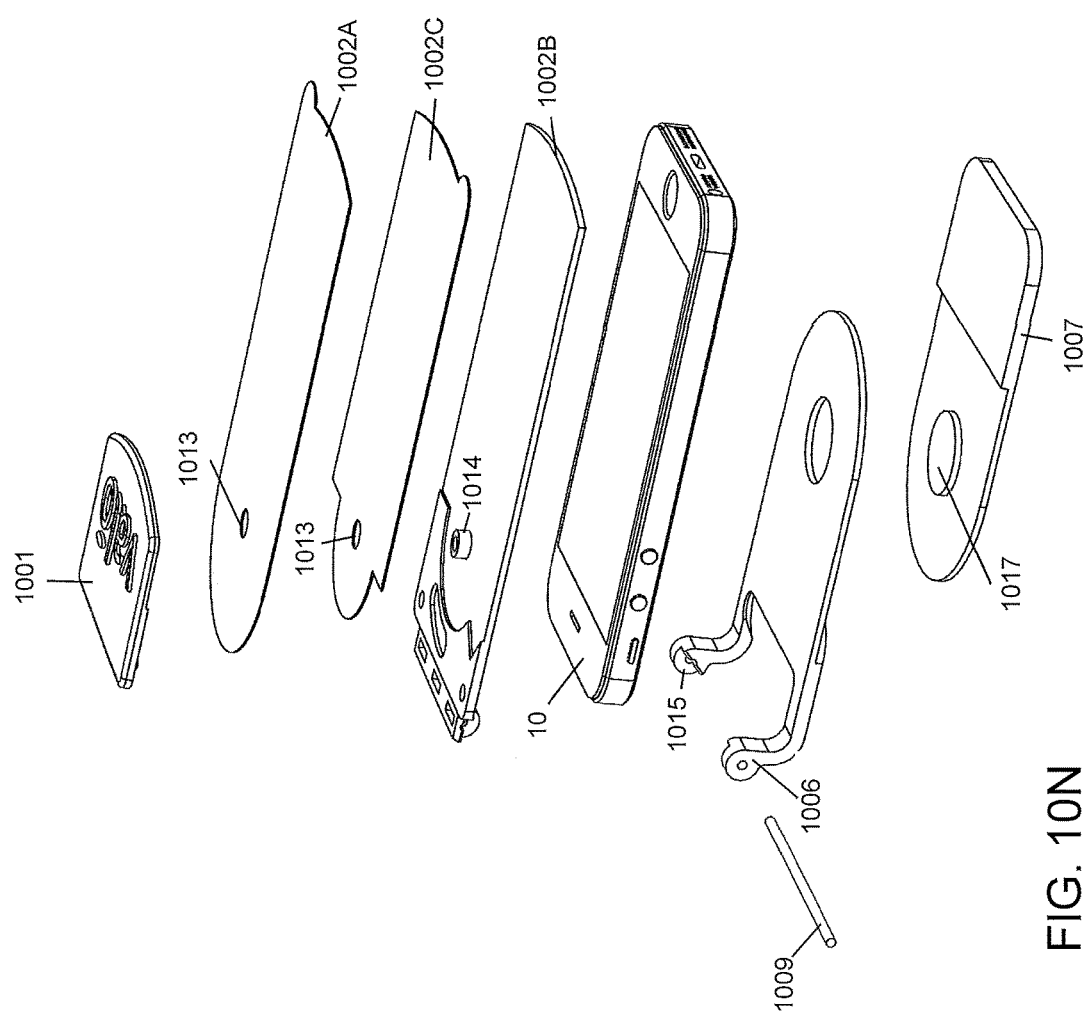
FIG. 10N provides an exploded view of the mobile shade assembly of FIG. 10A.

FIG. 10N shows an exploded view of the mobile shade apparatus 1000 of the tenth embodiment. In this embodiment, the apparatus 1000 includes the 3 panels 1002A-C, the hinge 1006, and the base 1005, as discussed above. A panel support, or top portion 1001, can couple the panels 1002 together. In this embodiment, the panel support 1001 couples the right 1002C and left 1002A panels to the center panel 1002B with a structure, for example, a pin (not shown) extending the bottom of the panel support 1001 through holes 1013 in panels 1002A, C to a receiving protrusion 1014 in the center panel 1002B, that enables rotation of the right 1002C and left 1002A panels with respect to the center panel 1002B to fan open the shade panels, e.g., in the same plane, parallel planes, or substantially parallel planes.

In particular, each of the intermediate panels, here the right and left panels 1002A, C, respectively, includes or defines an opening 1013 (or hole) so that the post of the panel support 1001 can pass through the opening 1013 and be maintained within the well 1014 of the distal panel. Additionally, a proximal edge of each of the right 1002C and left 1002A panels can be curved and the panel support and distal panel (here the center panel) can each include a depression having a corresponding curve profile so that when assembled the intermediate panels are maintained within the depressions while still being rotatable around the post of the panel support 1001. The curvature of the intermediate panels and depressions enable a smooth, clean, controlled, and well bounded rotation of the right 1002C and left 1002A panels.

Additionally, one or more stabilizing mechanisms (not shown) may be provided between the panel support 1001 and the distal (here center) panel 1002B to create a secure mating and fit between the two. In this embodiment, the panel support 1001 includes one or posts that do not interfere with the rotatable intermediate panels 1002A, C and that mate with one or more wells, recesses, or depressions of the distal panel 1002B.

Also shown in FIG. 10N is the hinge 1006, which is formed between the base 1005 and the distal panel 1002B, which is the bottom, center panel in this embodiment. Each of the base 1005 and distal panel comprise portions of a rod channel 1015, through which a rod 1009 is disposed when the portions of the channel from the base 1005 and distal panel are properly aligned. With the rod 1009 in place in the channel 1015, the shade panels 1002 can rotate with respect to the base 1005. In other embodiments, different types of hinges and/or hinge components can be used, so long as they are structured and arranged to achieve the desired rotational movement. Such hinges may enable other types of movement as well.

The base 1005 and extended portion 1007 include the second pivot point, wherein the base 1005 can be movable relative to the extended portion 1007. For example, the extended portion 1007 can include a pivot post 1017 extendible through a corresponding post opening in the base 1005 such that, when coupled together, the base 1005 can rotate with respect to the extended portion 1007.

Figure 11A:
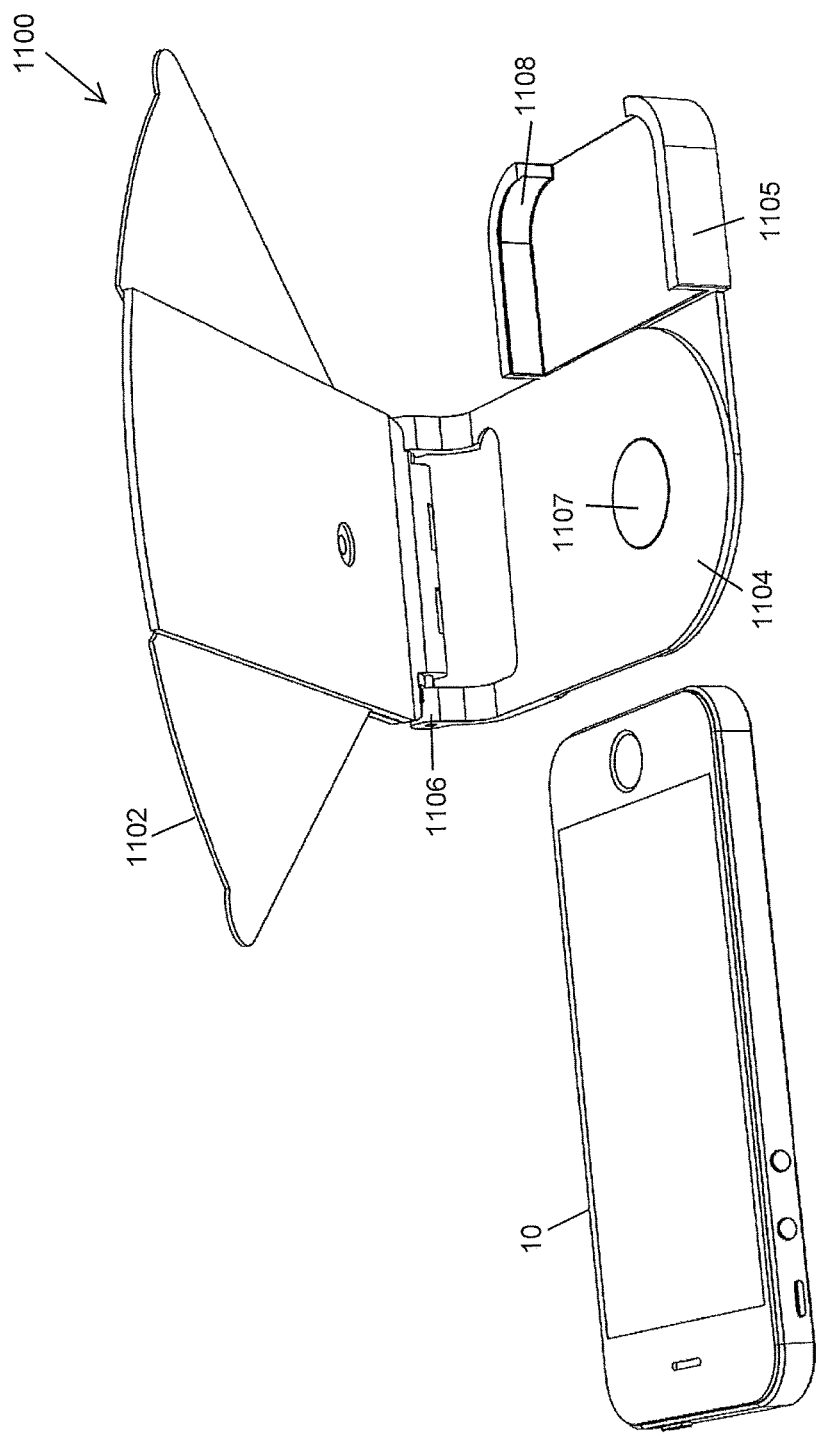
FIG. 11A is an illustration of an eleventh embodiment of a mobile device shade separate from a mobile device.
Figure 11B:
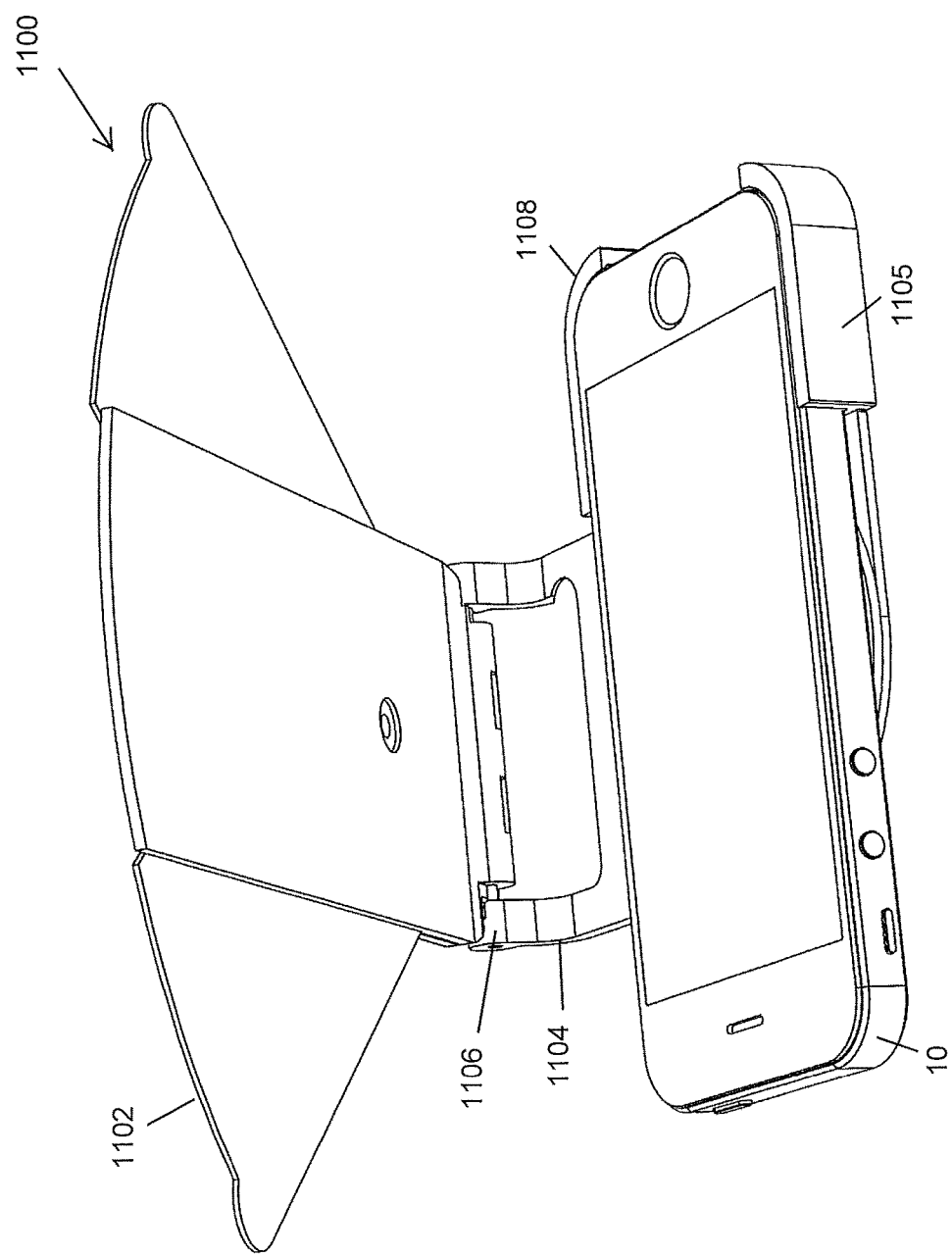
FIG. 11B is an illustration of the mobile device inserted in the mobile device shade of FIG. 11A.

FIG. 11A is an illustration of an eleventh embodiment of a mobile device shade 1100 separate from a mobile device 10. FIG. 11B is an illustration of the mobile device 10 inserted in the mobile device shade 1100 of FIG. 11A.

The shade 1100 includes a base 1105 comprising a first portion 1104 and a second portion 1108. The first portion 1104 can be movable relative to the second portion 1108. For example, the second portion 1108 can include a pivot post 1107 about which the first portion 1104 can rotate. Also the shade 1100 can include a plurality of shade panels 1102 constructed and arranged in accordance with embodiments described herein. A hinge 1106 can be positioned between the base 1105 and the panels 1102 so that that panels 1102 can move relative to the base 1105, for example, rotate at least partially about an axle along which the hinge 1106 extends. In particular, the hinge 1106 can extend along of a first axis that permits that panels 1102 to move at an angle relative to the mobile device 10. The pivot post 1107 can extend along a second axis orthogonal to the first axis, so that the panels 1102, and first portion 1104, can be rotatable to the second portion 1108 and the device 10.

As described in other embodiments herein, a shade can be integrated with a mobile device case or the mobile device itself. In the embodiments illustrated in FIGS. 11A and 11B, provided is the capability to remove the shade 1100 entirely from the case 10, or otherwise separate the shade 1100 from the mobile device when not in use or otherwise desired. This can be accomplished in any number of ways.

In one embodiment, the shade 1100 is attached to an abbreviated case-like structure which in turn can slide on and off, or otherwise be removed from an ordinary phone case. In another embodiment, the shade 1100 can include a clip or related device for removably coupling the detachable shade 1100 to the case 10 and/or mobile device. In another embodiment, the shade 1100 can include a flexible covering that replaces some or all of the base 1105, for example, the first portion 1104 and/or second portion 1108, and stretches over the case 10. Other related attachments can equally apply for removably coupling the shade 1100 to the case 10 and/or mobile device. Here, the shade 1100 can be in its entirety stored in a purse, pocket, bag, or other small storage location.

FIGS. 12A-12F provide various views of a twelfth embodiment of a mobile device shade 1200 in accordance with aspects of the inventive concept. The mobile device shade 1200 includes at least one panel 1210 that can be stowed within a case 1240 and extended from the case 1240 to provide shade to a smartphone, tablet, or other mobile device. In some embodiments, the panel 1210 can be configured to attach and detach from the case 1240, e.g., be detachable. In other embodiments, the panel 1210 can be permanently attached to the case 1240, even though it may be movable with respect to the case 1240. In various embodiments, the shade can be configured so that the panel 1210 can slide in and out of the case 1240, whether the panel is detachable or not. In a preferred form, the shade works with any mobile device case. For example, the case 1240 can form a pocket within which the panel 1210 be stowed when not in use.

For example, the mobile device shade can provide privacy and/or shade from light when deployed. Therefore, the at least one panel 1210 can have a stowed state and a deployed state. In the deployed state, the at least one panel 1210 can take the form of a generally two-dimensional member, which can be opaque or semi-opaque. The at least one panel 1210 can include a tab or grip 1220 that remains at least partially accessible from the case 1240 when the at least one pane 1210 is in its stowed state. Pulling the grip 1220 can deploy the at least one panel 1210, wherein the at least one panel may slide in and out of the case through user push/pull action on the grip 1220. In various embodiments, the at least one panel 1210 may be hinged to rotate with respect to the case, such as when transitioning to the deployed state. In various embodiments, the panel can rotate over and onto a display of the mobile device as a cover.

Additionally, the mobile device shade 1200 can include a coupling mechanism that is configured to couple the shade to the mobile device. The coupling mechanism can include a base 1270 that couples to the case to the mobile device. The coupling mechanism can also include a base receiver 1280, e.g., forming part of or attached to the case 1240. The base 1270 can be configured to couple to the base receiver 1280. The base 1270 can include a coupler 1290 that couples to the mobile device 1300, e.g., a smartphone or a tablet. As examples, the coupling mechanism or coupler 1290 can include at least one of a magnet, a suction cup, Velcro, an adhesive, or an adhesive surface. In some embodiments, the coupler 1290 is configured to couple the base 1270 to a surface of the mobile device, such as a rear surface (or back side) of a smartphone or a tablet. In preferred embodiments, the case removably couples to the base 1270, but in other embodiments the case 1240 could permanently or semi-permanently couple to the base 1270. Therefore, in various embodiments, the coupling mechanism can include the base 1270, the base receiver 1280, and the coupler 1290, in various embodiments.

In various embodiments, the case 1240 couples to the base 1270 such that the at least one panel 1210 extends from the case at a peripheral edge of the mobile device 1300 and/or a display thereof. In various embodiments, the case can be selectively coupled to the base at one of a plurality of different orientations with respect to the mobile device, such that the at least one panel can be arranged to extend from the case at one of a plurality of different peripheral edges of the mobile device or the display thereof. In some embodiments, the at least one panel 1210 is a single panel configured to slide in and out of the case 1240 via a panel guide 1260.

Figure 12C:
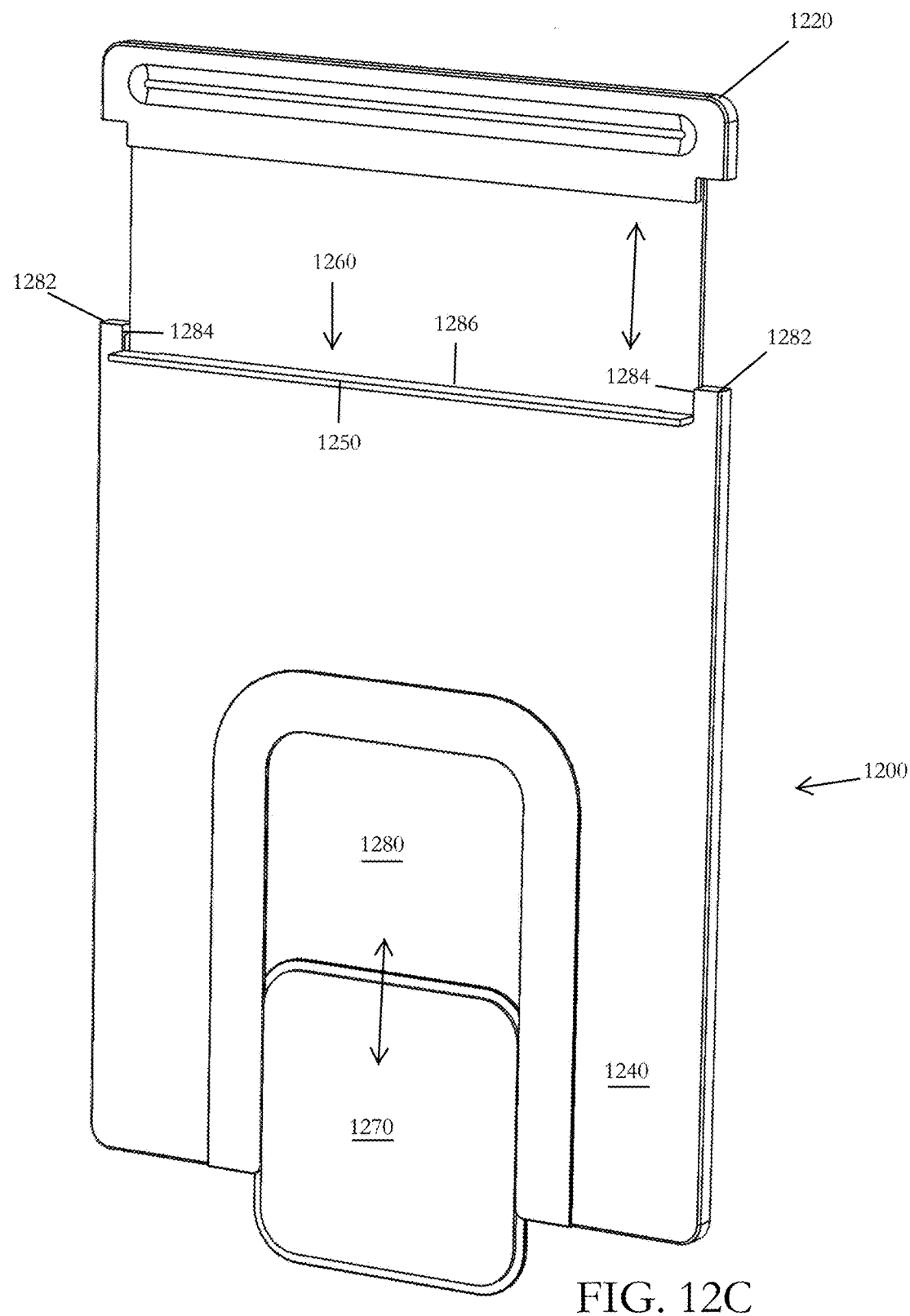
FIG. 12C shows a perspective view of the mobile device shade combining the panel of FIG. 12A and the case of FIG. 12B.

FIG. 12A is an unassembled view of a portion of a mobile device shade 1200. This figure shows a panel 1210 with a grip 1220, in an unassembled form. In assembled form, the grip 1220 is attached to or formed at a top edge of the panel 1210 (see, e.g., FIG. 12C). In some embodiments, the panel 1210 and the grip 1220 can be formed of a single piece of material, such as a single piece of molded plastic, resin, metal, or the like. At a bottom edge of the panel 1210, opposite the top edge, is a pair of laterally and outwardly extending pivot pins 1230. As will be discussed, the pivot pins 1230 enable the panel to rotate about an axis that passes through the pivot pins 1230. In some embodiments, the pivot pins 1230 travel within the case 1240 and allow said rotation near a terminal end of a travel path that ends near the top edge of the case. The travel path can take the form of a pair of channels formed within the case that accommodate travel of the pivot pins 1230 within the case, e.g., from a bottom edge of the case to the top edge of the case.

FIG. 12B shows a view of the case and base of the mobile device shade 1200. In this embodiment, the case is a detachable case 1240. That is, the base 1270 can be coupled, attached, and/or secured to the mobile device and the case 1240 can be removably coupled, attached, and/or secured to the base 1270. Here, as an example, the base 1270 is shown in the shape of a square having at least one lateral protrusion extending from a peripheral edge of the base. In this example, the protrusion is shown as an unbroken protrusion formed around an entire circumference of the base. In other embodiments, the protrusion could be in the form of one or more protrusion segments, which can be considered to take the form of a set of lateral protrusions extending from different portions of the peripheral edges of the base.

The case 1240 is shown as a generally planar structure that supports and/or houses at least one movable panel 1210 that can be deployed as a shade. In this example, the case 1240 includes two parallel planar walls having a spaced relationship that cooperate to form a compartment or pocket for stowing the panel 1210. The parallel planar walls may also be referred to as front and back sides of the case 1240. In this embodiment, a top edge of the case 1240 is open and is configured to have at least a partially abutting relationship with the panel grip when the panel is in the stowed state. The other edges of the case are at least partially closed to connect the two parallel planar walls to create pocket therebetween.

In FIG. 12B, a front side of the case 1240 is shown. The front side is the side closest to a surface of the mobile device when the case 1240 is coupled to the base 1270. At the front side, a base receiver 1280 is shown. In this embodiment, the base receiver 1280 is a portion of the case that includes at least one channel, slot, depression, mechanism, or groove configured to receive the lateral protrusions extending from the peripheral edge of the base. Here, as an example, the base receiver 1280 is a U-shaped structure defining at least one channel, slot, or groove. In this embodiment, the base 1270 and the base receiver 1280 are configured so that the base 1270 can slide in and out of the base receiver 1280, thereby removably coupling the case 1240 to the base 1270. The lateral protrusions of the base 1270 can be configured as a tongue portion of a tongue and groove relationship with the base receiver 1280 of the case 1240.

Also in this embodiment, since the base 1270 has a generally square shape, the case 1240 can be slid onto the base in four different orientations, thereby enabling the deployed panel to be used to shade any one of the four sides of the display of the mobile device. As an example, the case 1240 can be coupled to the base to orient the deployed panel at one of the top, bottom, left, and/or right edges of the mobile device or display thereof. In other embodiments, the base 1270 could take other shapes, enabling more or less orientations of the case with respect to the base. As one example, if the base had the shape of a hexagon or an octagon, the case could be coupled to the base in any one of six or eight different orientations, respectively. Other shapes could be used in other embodiments.

The base 1270 includes a coupling mechanism or coupler 1290, e.g., at least one adhesive or adhesive surface, magnet, suction cup, Velcro, or strap, that has the ability to adhere or otherwise couple the base to a surface of a mobile device, e.g., a rear surface of a smartphone or tablet.

FIG. 12C is an assembled view of the mobile device shade 1200. The panel 1210 is shown in assembled form, with the grip 1220 included at the top edge of the panel 1210. The panel 1210 is shown partially deployed between a stowed state, within the detachable case, and a deployed state. At the top edge of the case 1240 is formed a panel guide 1260, defining an opening or recess partially formed along the top edge, and a lip 1250 formed below the recess. In this embodiment, the lip 1250 is formed at a lower boundary of the recess. The panel guide 1260 can include sidewalls 1284 formed between the case 1240 and the lip 1250 that frame side lengths of the recess, e.g., while the lip frames a bottom length of the recess.

Furthermore, the base 1270, here in the form of a square, is shown partially inserted (or coupled) in to the grooved opening of the base receiver 1280. As referenced above, the base does not have to be in the shape of a square, others shapes that have opposite parallel edges substantially the width of the opening, channel, or slot of the base receiver could be used in other embodiments.

Figure 12D:
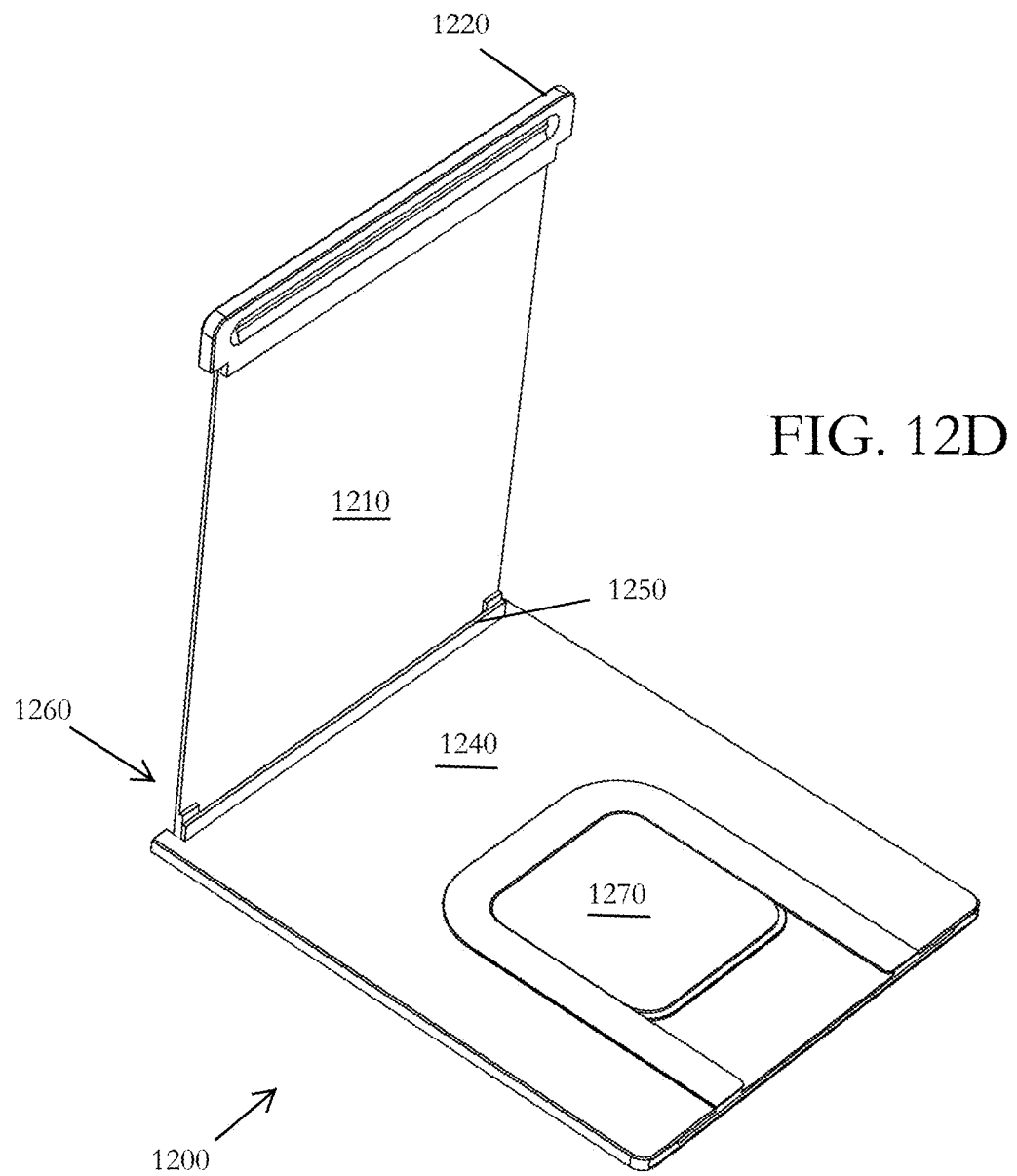
FIG. 12D shows a perspective view of the mobile device shade with the panel in a deployed and rotate position.

FIG. 12D is a perspective view of the mobile device shade 1200 with the panel 1210 in the deployed state. In this state, the pivot pins 1230 at the bottom edge of the panel have reached their terminal points, or stops 1282, with respect to the top of the case. The panel and case form a hinge that enables the panel to rotate with respect to the case. The panel rotates into the panel guide formed at the top edge of the case. In this embodiment, the panel guide 1260 includes the lip 1250 extending from the case that at least partially restricts the rotation of the panel with respect to the case. In some embodiments, the lip 1250 can prevent the panel 1210 from rotating more than about 90 degrees with respect to the case. In other embodiments, the lip 1250 can impose a different angular constraint on the rotation of the panel with respect to the case, e.g., up to about 45 degrees with respect to the case.

In FIG. 12D, the panel 1210 is rotated at a right angle with respect to the base 1270. Thus, when the mobile device shade 1200 is coupled to a mobile device 1300, the panel 1210 would similarly be rotatable to an angle of about 90 degrees with respect to the mobile device and a display thereof. In the substantially vertical position shown, the panel can be used for creating a light and/or a privacy shade for the mobile device, without substantially interfering with use of the mobile device.

Figure 12E:
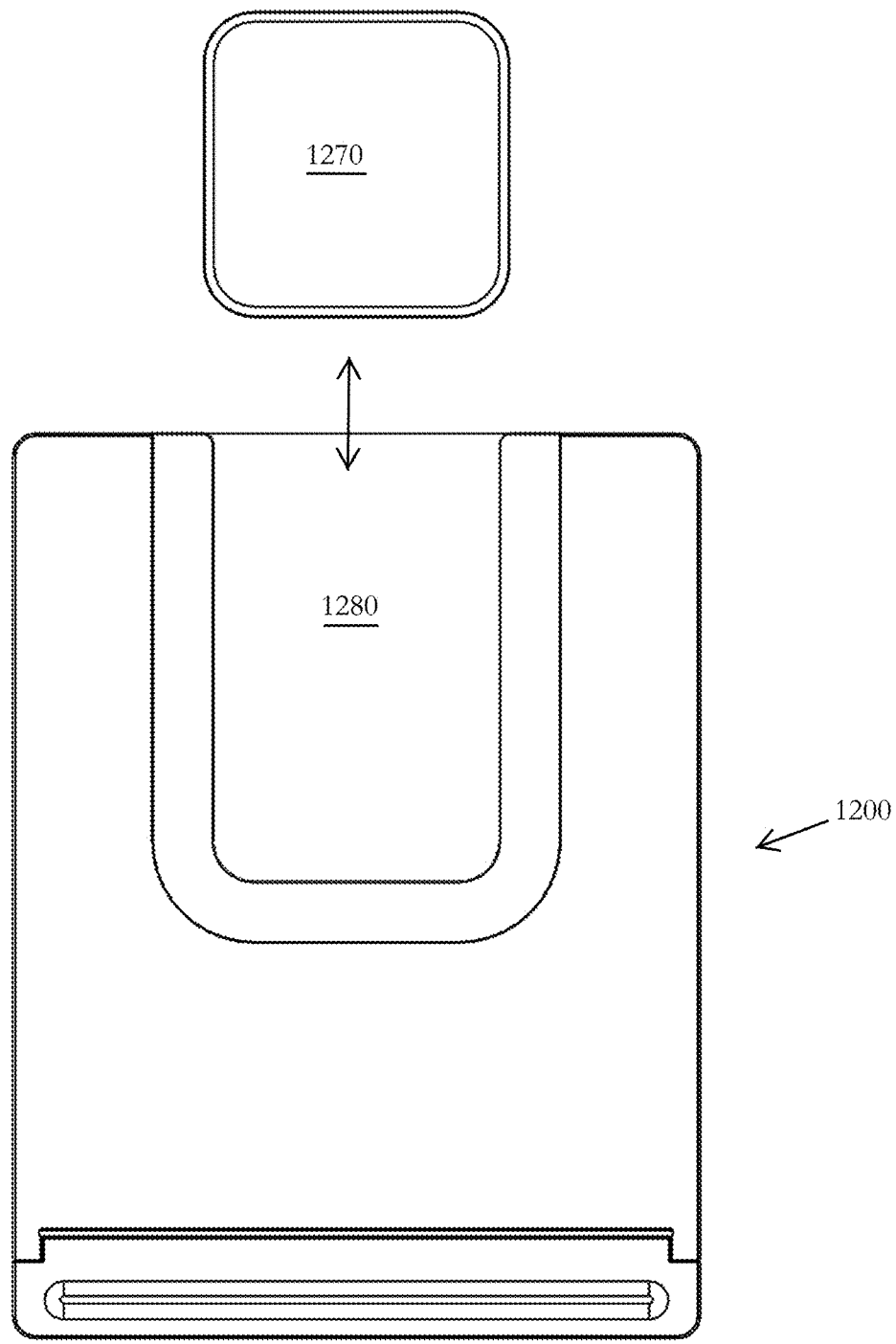
FIG. 12E shows a front view of the mobile device shade of FIG. 12C.

FIG. 12E is an unassembled view of the detachable case 1240 and base 1270. The base 1270 is shown in a square form, in this embodiment. The base can include coupler 1290, etc., as discussed above, that allows the base to be coupled to a mobile device. The detachable case 1270 includes the base receiver 1280, here in the form of the U-shaped groove having an opening on at least one side to receive the base, and thereby couples the detachable case to the base and mobile device. The panel 1210 is shown in the stowed state with the grip 1220 abutted against the top edge of the case.

Figure 12F:
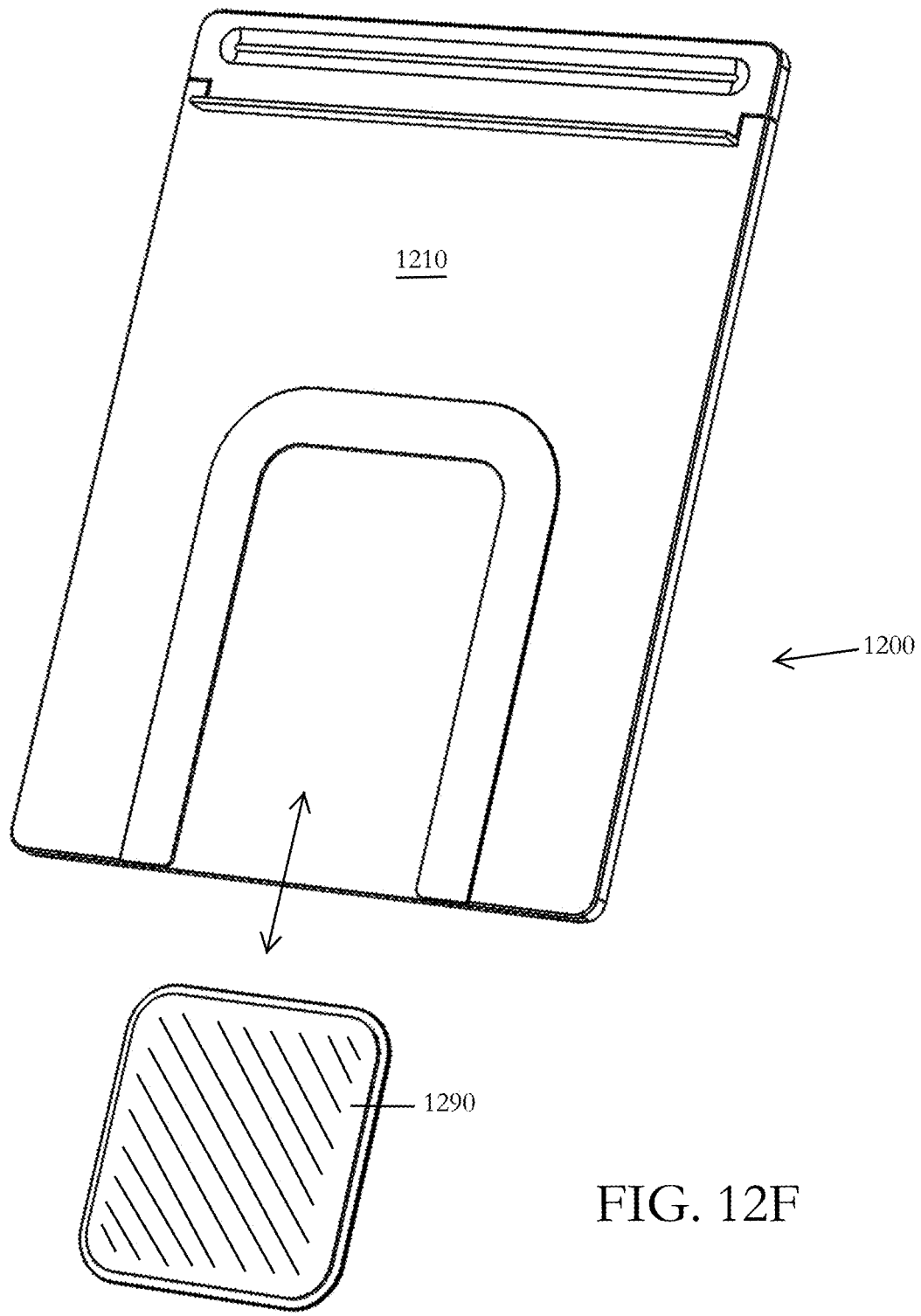
FIG. 12F shows a perspective view of the mobile device shade of FIG. 12E.

FIG. 12F is a partially unassembled view of the mobile device shade 1200, from the side that would couple to the mobile device, similar to FIG. 12E. In FIG. 12F, an embodiment of adhesive coupler 1290 of the base used to attach the base to the mobile device is shown. The coupler 1290 can be a glue, tape, Velcro®, magnet, suction cup, or other adhesive known to one skilled in the art. The coupling between the mobile device shade 1200 and the mobile device 1300 is preferably strong enough to maintain the coupling in view of the weight of the mobile device shade.

FIGS. 13A-13M provide various additional views of the twelfth embodiment of the mobile device shade 1200, in accordance with aspects of the present inventive concept. In several of these views, the mobile device shade 1200 is coupled to a mobile device 1300.

Figure 13A:
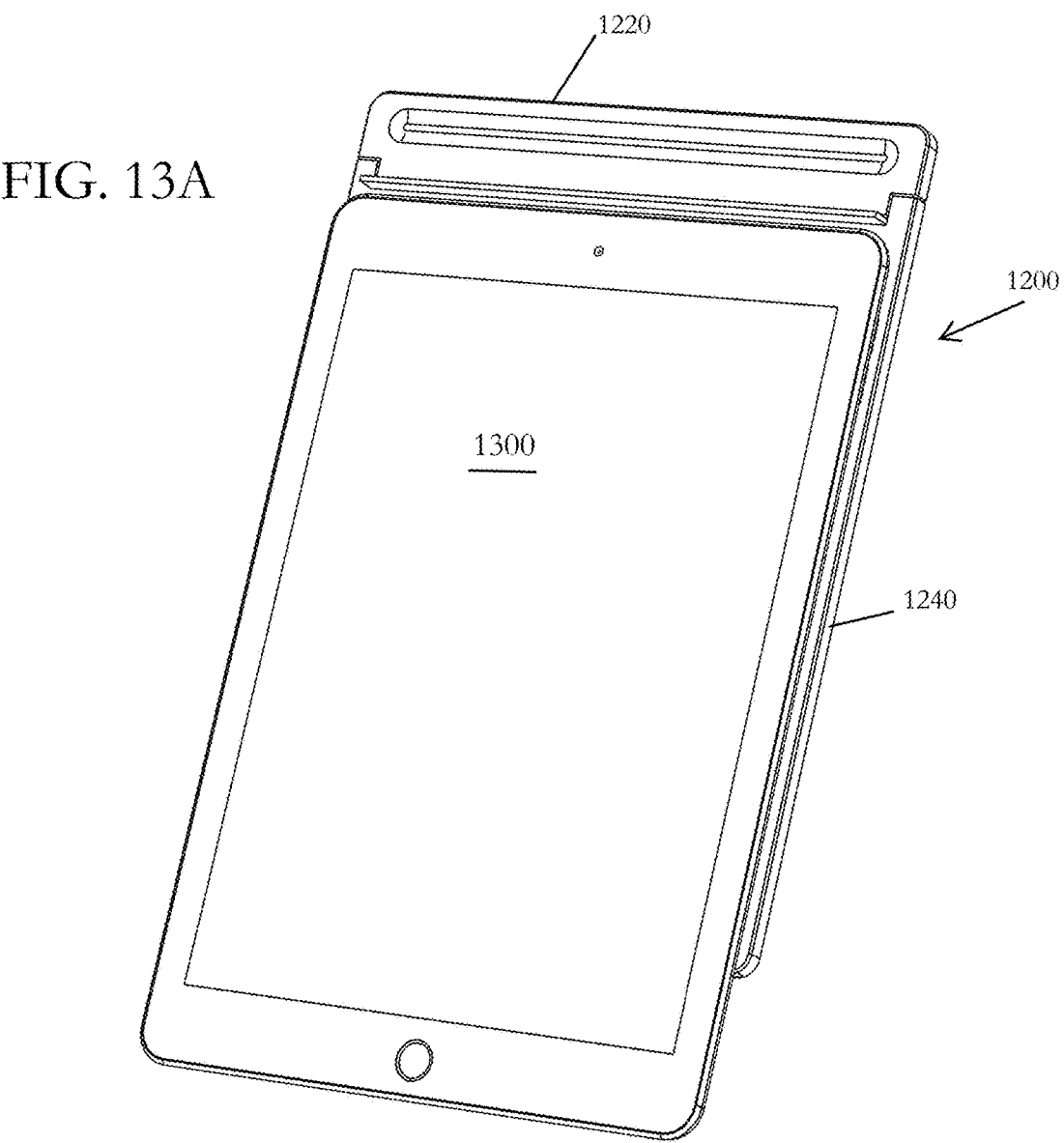
FIG. 13A provides a perspective view of the twelfth embodiment of a mobile device shade coupled to a tablet, with the panel in a stowed state, in accordance with aspects of the present inventive concepts.

FIG. 13A is a perspective front view of the mobile device shade 1200, consistent with the embodiment of FIGS. 12A-12F, coupled to a mobile device 1300—in this case a tablet. The panel 1210 is shown in its stowed position, within the case 1240. Here, the grip 1220 is shown abutting the detachable case, at a top edge of the case. The grip 1220 and the top edge of the case 1240 may optionally have a magnetic or other coupling relationship, so that that the grip 1220 is maintained against the top edge of the case with some resistance to deployment of the panel 1210. In the stowed position, the panel 1210 is protected within the case 1240.

Figure 13B:
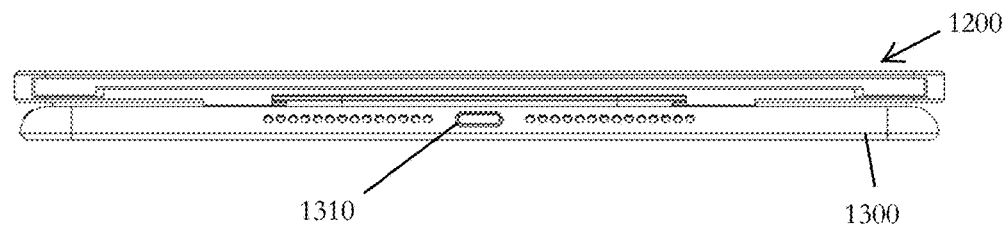
FIG. 13B provides a bottom view of the mobile device shade and tablet of FIG. 13A.

FIG. 13B is a bottom view of the mobile device shade 1200 coupled to the tablet 1310. In this embodiment, the mobile device shade does not obstruct a charging port 1310 at a bottom edge of the mobile device. Thus, the mobile device can be charged while attached to the mobile device shade.

Figure 13C:
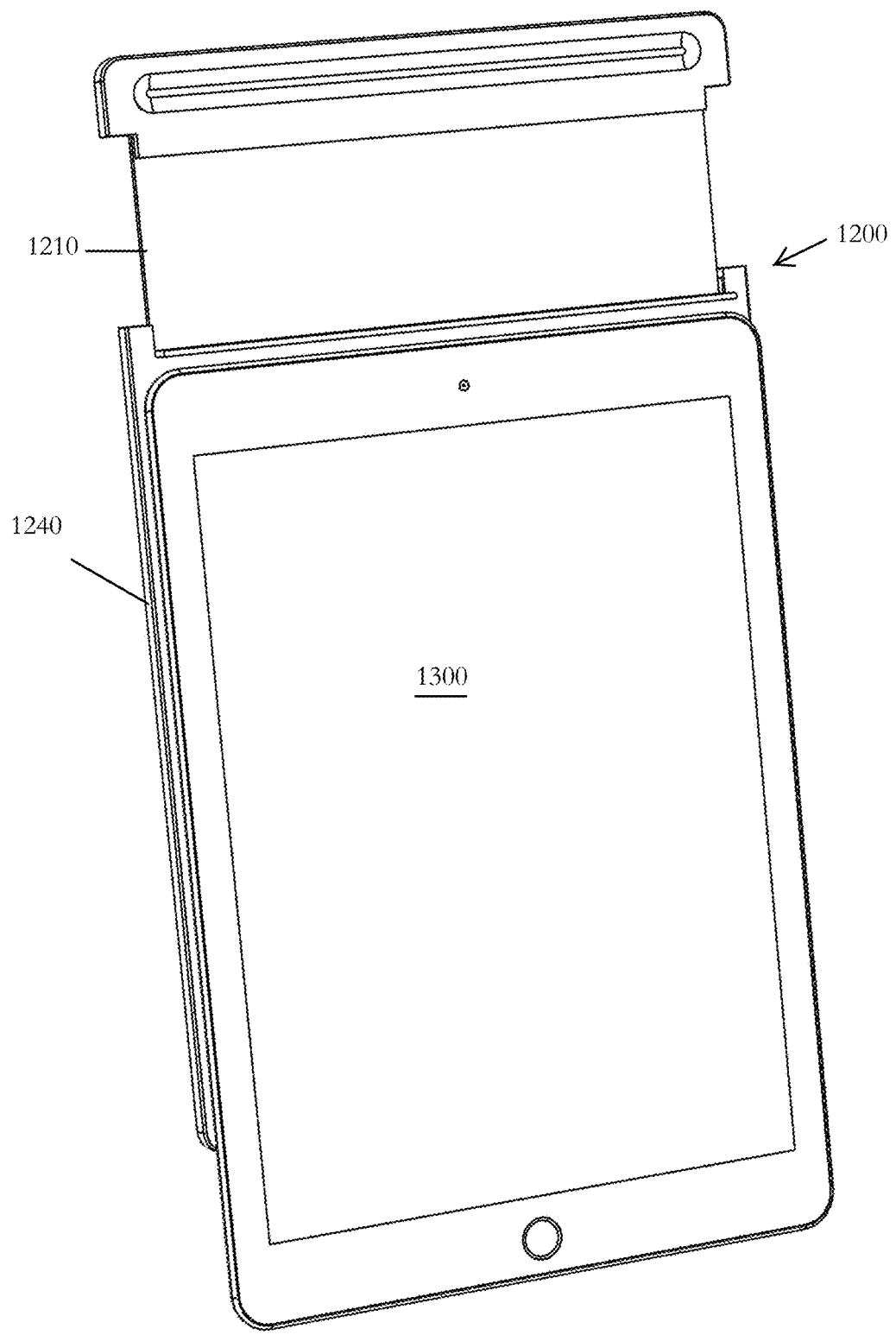
FIG. 13C provides a front perspective view of the mobile shade device and tablet of FIG. 13A with the shade partially deployed.

FIG. 13C is a front perspective view of the mobile device shade 1200 coupled to the mobile device 1300, similar to FIG. 13A. However, in this figure, the panel 1210 is shown in a partially deployed and partially stowed position. In some embodiments, there may be a friction relationship between the panel 1210 and the case 1240, such that the panel can maintain a position with respect to the case, such as a fully stowed position, fully deployed position, and/or a partially deployed position. The panel 1210 in this embodiment can be rigid or semi-rigid, e.g., made from plastic, resin, metal, or the like.

Figure 13D:
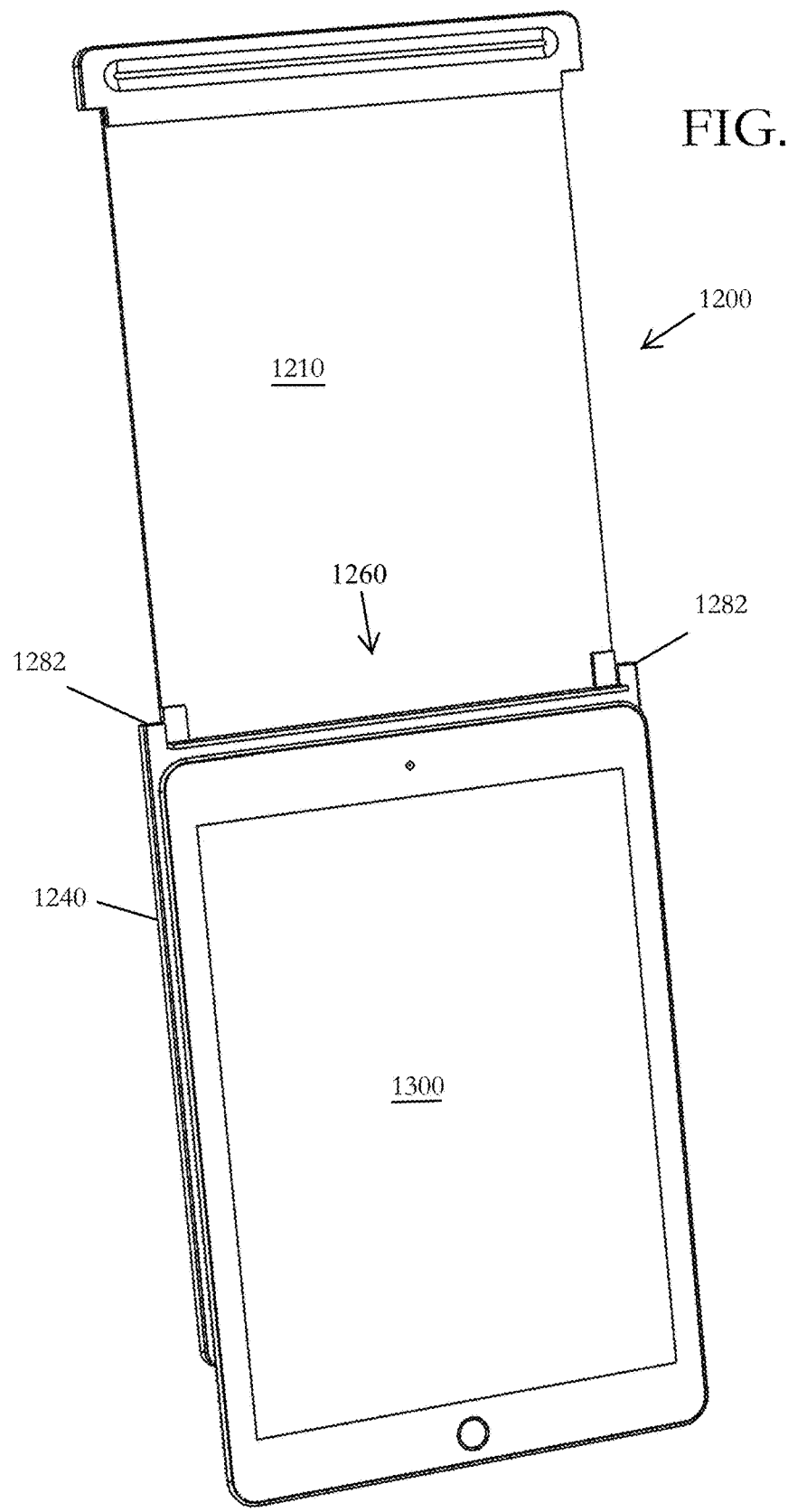
FIG. 13D provides a front perspective view of the mobile shade device and tablet of FIG. 13A with the shade deployed.

FIG. 13D is a front perspective view of a mobile device shade 1200 coupled to the mobile device 1300, similar to FIGS. 13A and 13C. However, in this figure, the panel 1210 is shown in its fully extended and deployed position. As described above, the panel 1210 may have pivot pins 1230 at its bottom edge that travel with respect to the case to transition the panel 1210 back and forth between the stowed and deployed states. The case can include one or more stops that prevent the panel 1210 from coming out of the case 1240 when the panel 1210 is fully extended and deployed. For example, the pivot pins 1230 can travel within channels formed in or by the case 1240 that terminate at or near the top edge of the case, e.g., at one or more corresponding stops 1282.

Figure 13E:
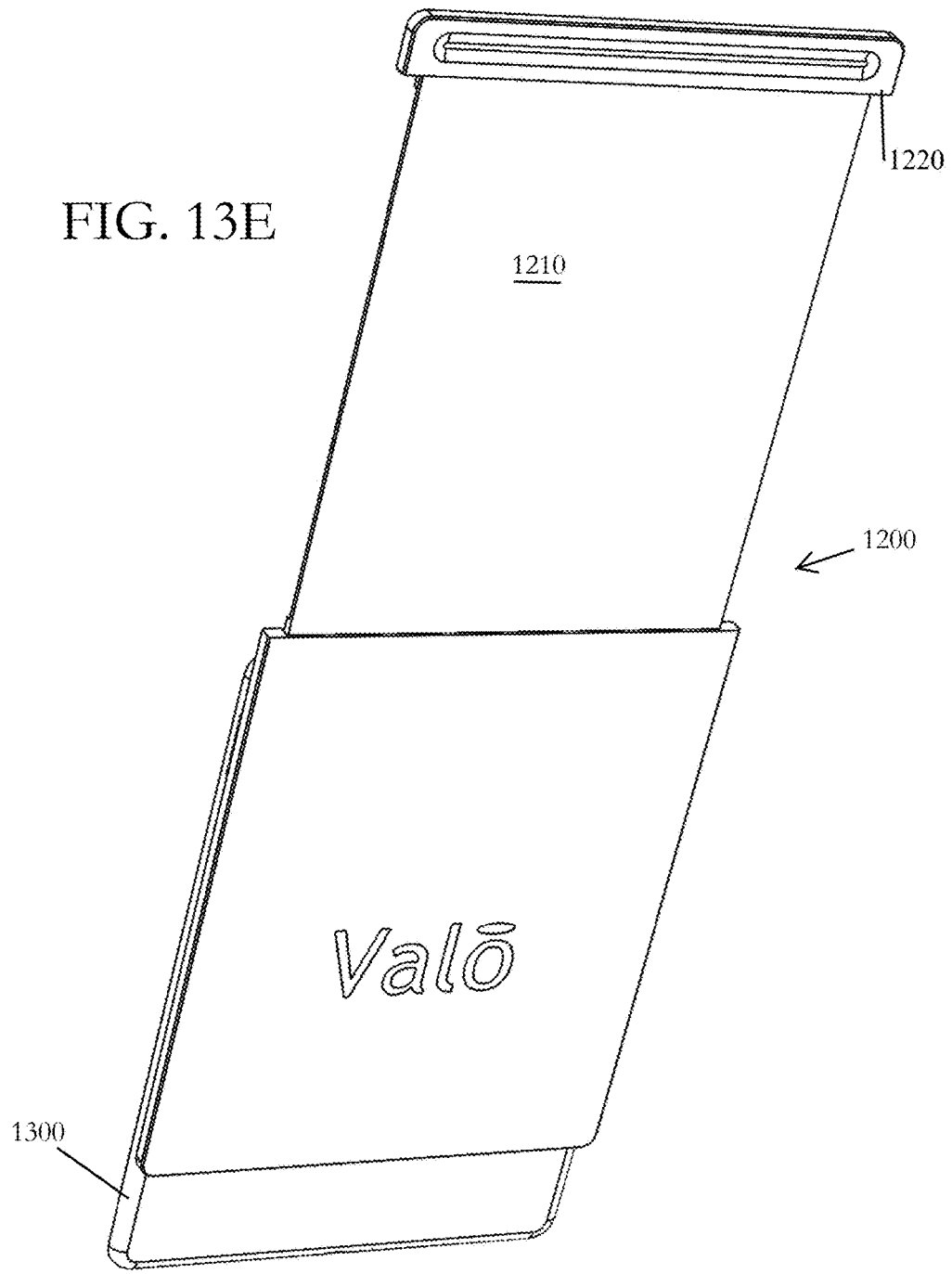
FIG. 13E provides a rear perspective view of the mobile shade device and tablet of FIG. 13A with the shade deployed.

FIG. 13E is a rear perspective view of the mobile device shade 1200 coupled to the mobile device 1300, consistent with FIG. 13D. FIG. 13E shows the panel 1210 in a fully deployed state, as in FIG. 13D.

Figure 13F:
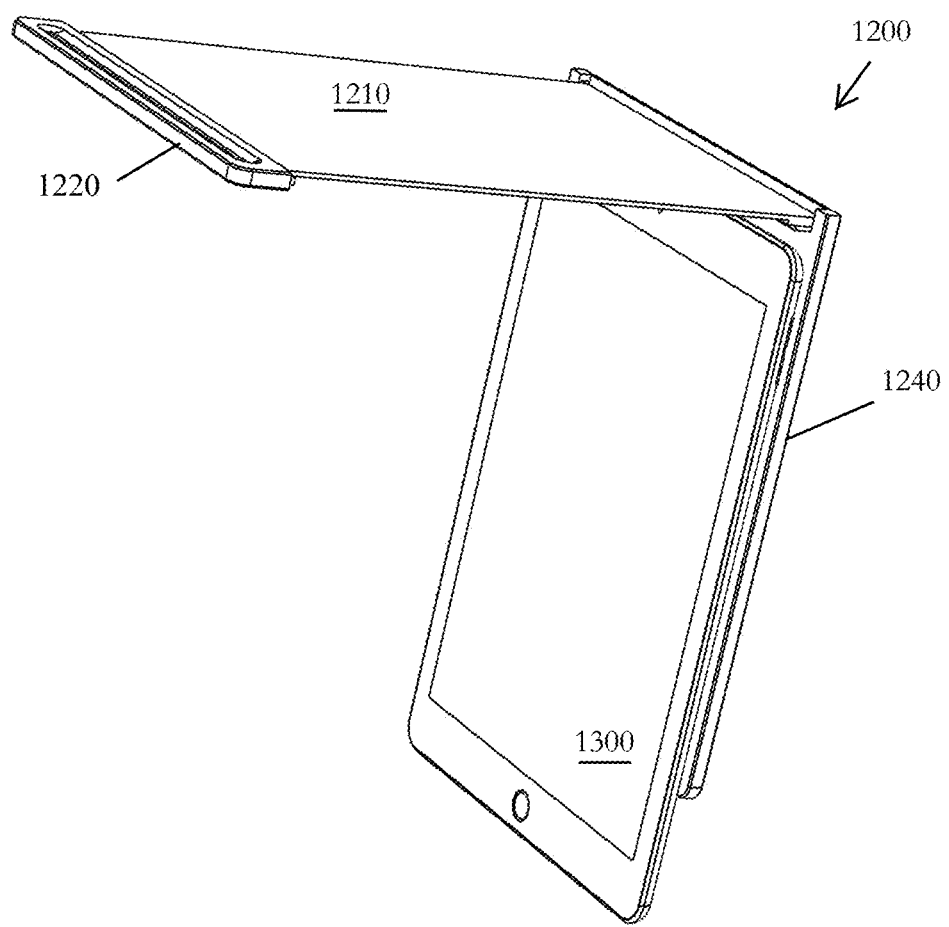
FIG. 13F provides a perspective view of the mobile shade device and tablet of FIG. 13A with the shade deployed and rotated.

FIG. 13F is a perspective front view of the mobile device shade 1200 coupled to the mobile device 1300. In this view, the panel 1210 is in its fully deployed state and rotated with respect to the case 1240, and therefore the display of the mobile device 1300. As example, the panel 1210 is rotated 90 degrees, or about 90 degrees, with respect to the case 1240 and, therefore, the display of the mobile device 1300. In this embodiment, the panel 1210 rotates about its pivot pins 1230, which are maintained within the case 1240.

Figure 13G:
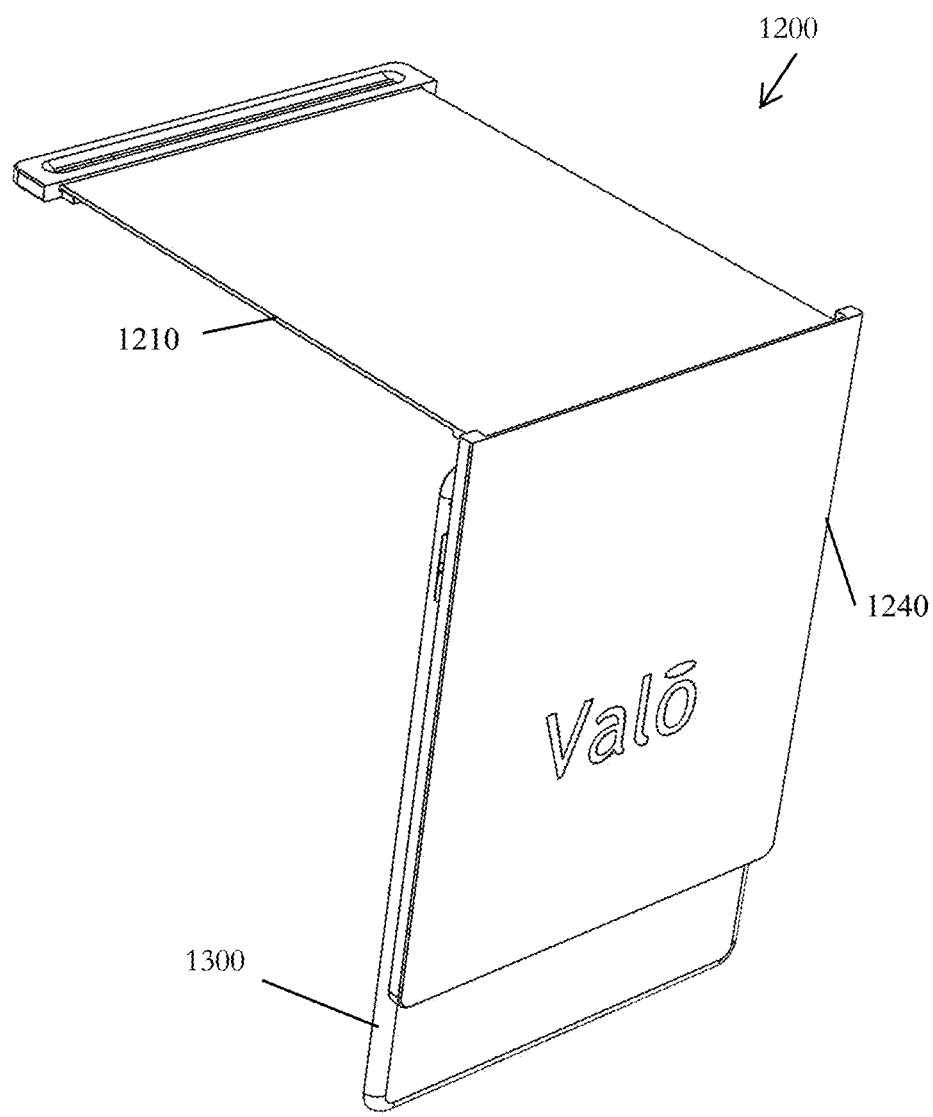
FIG. 13G provides another perspective view of the mobile shade device and tablet of FIG. 13A with the shade deployed and rotated.

FIG. 13G is a rear perspective view of the mobile device shade 1200 coupled to the mobile device 1300, wherein the panel is at approximately a right angle with respect to the detachable case and the display of the mobile device.

Figure 13H:
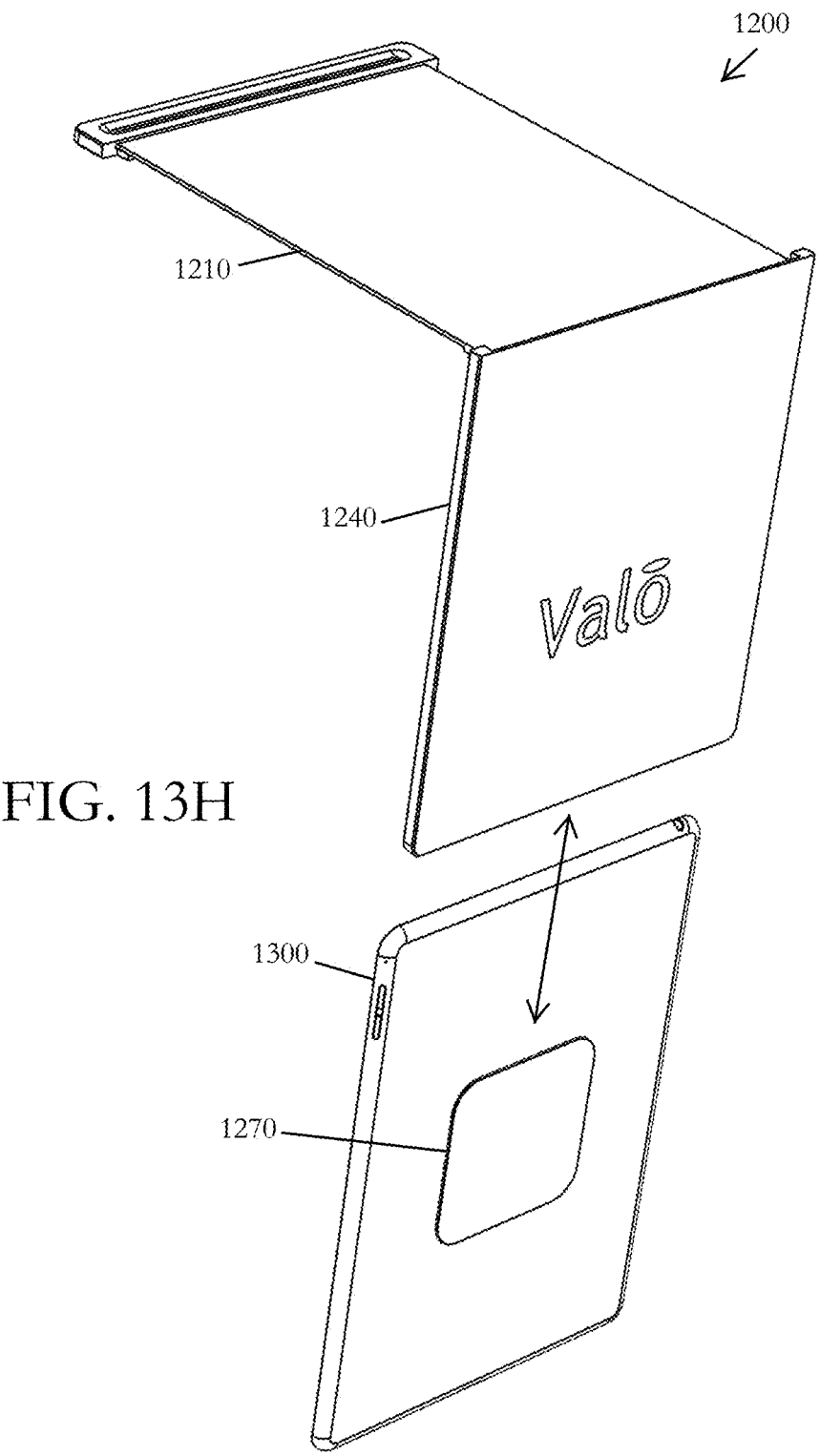
FIG. 13H provides a rear perspective view of the mobile shade device and tablet of FIG. 13G with the case detached from the tablet.

FIG. 13H is a rear perspective view of the mobile device shade 1200 uncoupled from the mobile device 1300. The base 1270 is, however, coupled to the back side of the mobile device to enable coupling and uncoupling of the case 1240 to the mobile device 1270. The detachable case 1240 and the panel are positioned approximately at a right angle. In this embodiment, the base 1270 in a generally square shape (with rounded optionally corners) and attached to the non-display side of the mobile device 1300.

Figure 13I:
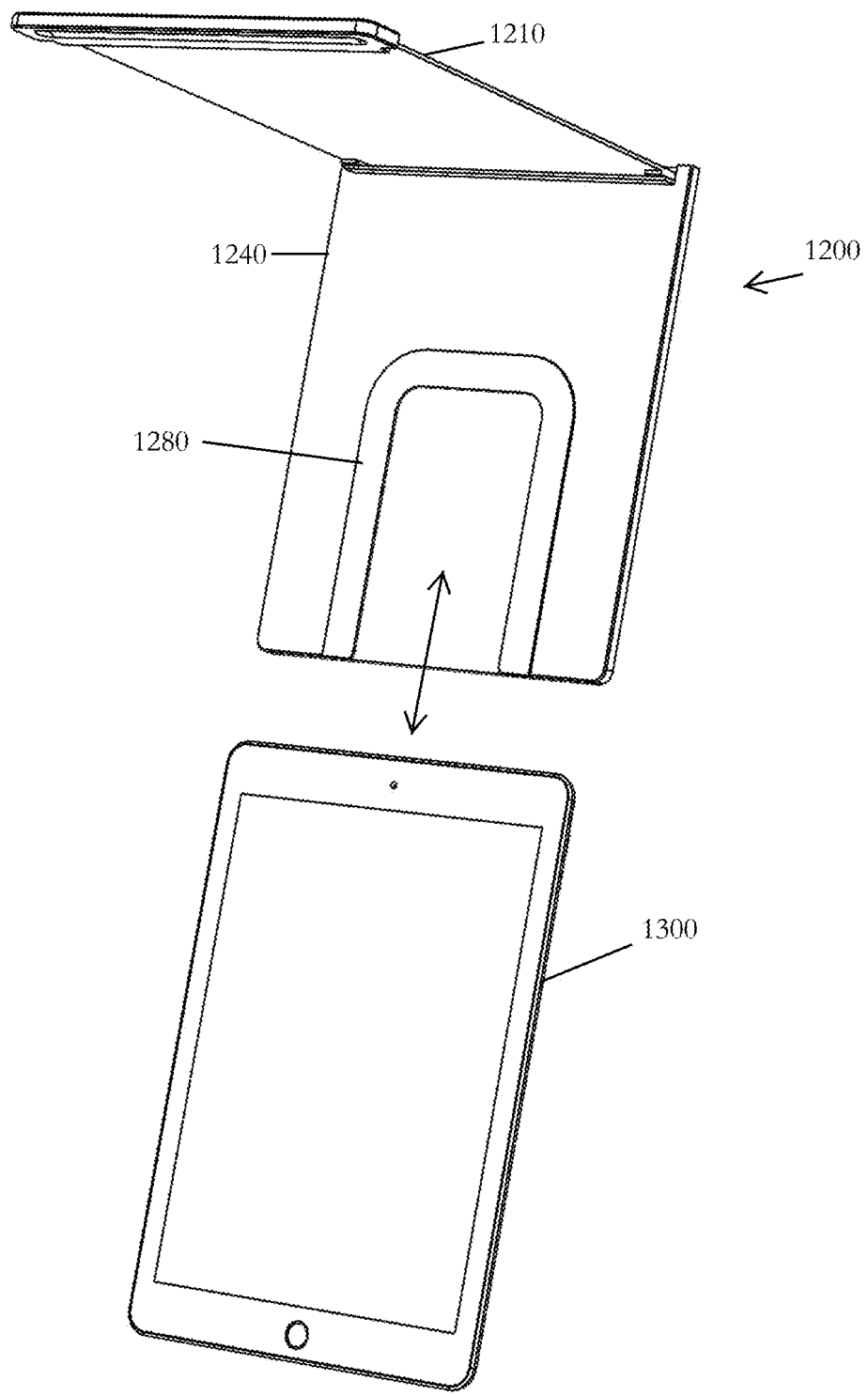
FIG. 13I provides a front perspective view of the mobile shade device and tablet of FIG. 13G with the case detached from the tablet.

FIG. 13I is a front perspective view of the mobile device shade 1200 uncoupled from the mobile device 1300, as in FIG. 13H. From this view, the base receiver 1280 of the case can be seen. Also, this figure shows that the case (and panel) 1240, 1210 can be coupled to, and uncoupled from, the mobile device 1300 when the panel is in a deployed state, as well as when the panel 1210 is in a fully or partially stowed state.

Figure 13J:
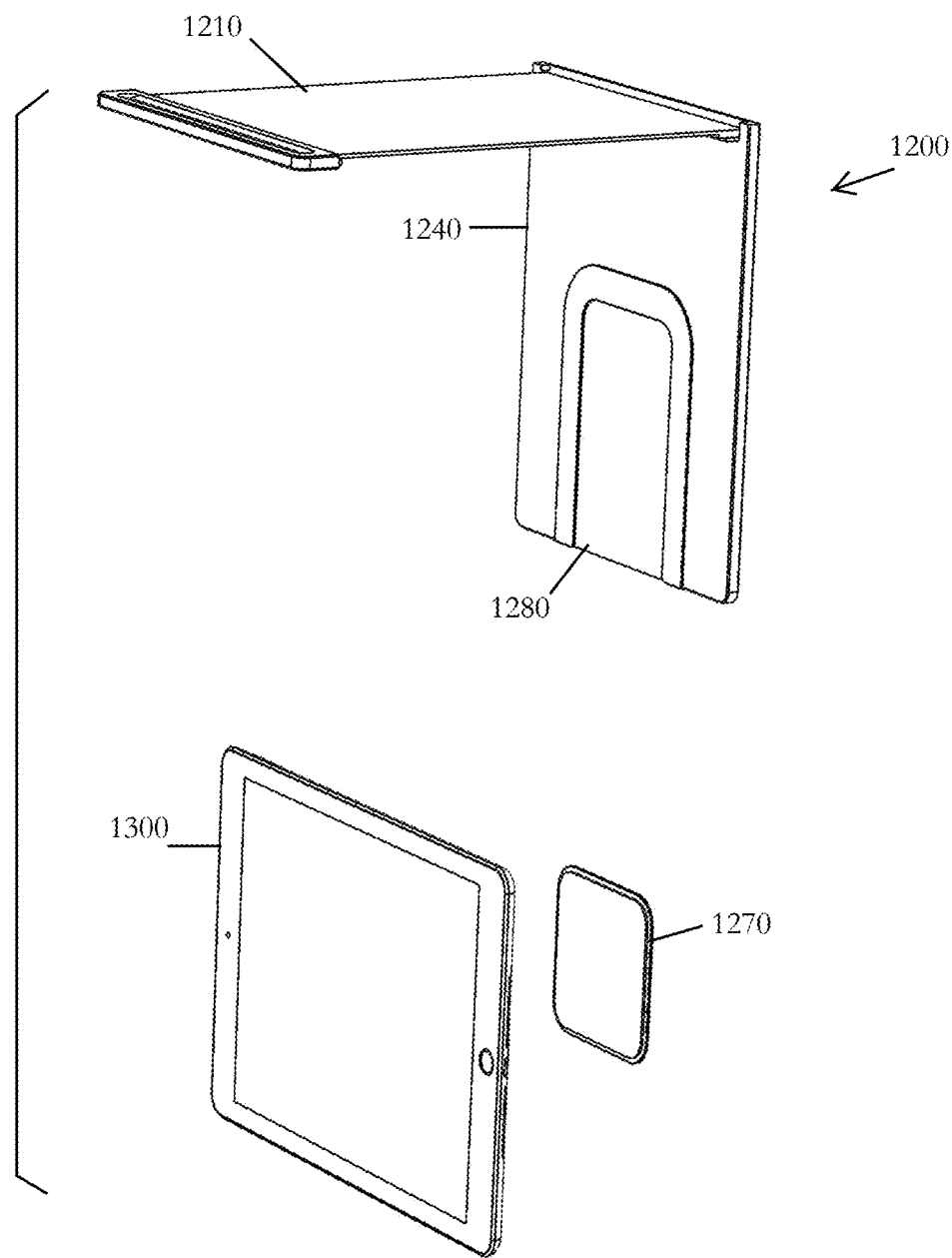
FIG. 13J provides another front perspective view of the mobile shade device and tablet of FIG. 13G with the case detached from the tablet.

FIG. 13J is front perspective view of the mobile device shade 1200, including the base 1270, uncoupled from the mobile device 1300. Unlike the views of FIGS. 13A-13K, the mobile device 1300 is shown in a crosswise, perpendicular orientation with respect to the longer orientation of the rectangular mobile device 1300. Due to the shape of the base 1270 and the base receiver 1280, the case can be coupled to the back side of the mobile device 1300 with this crosswise, perpendicular orientation, in addition to the lengthwise orientation shown in FIGS. 13A-13K above.

Figure 13K:
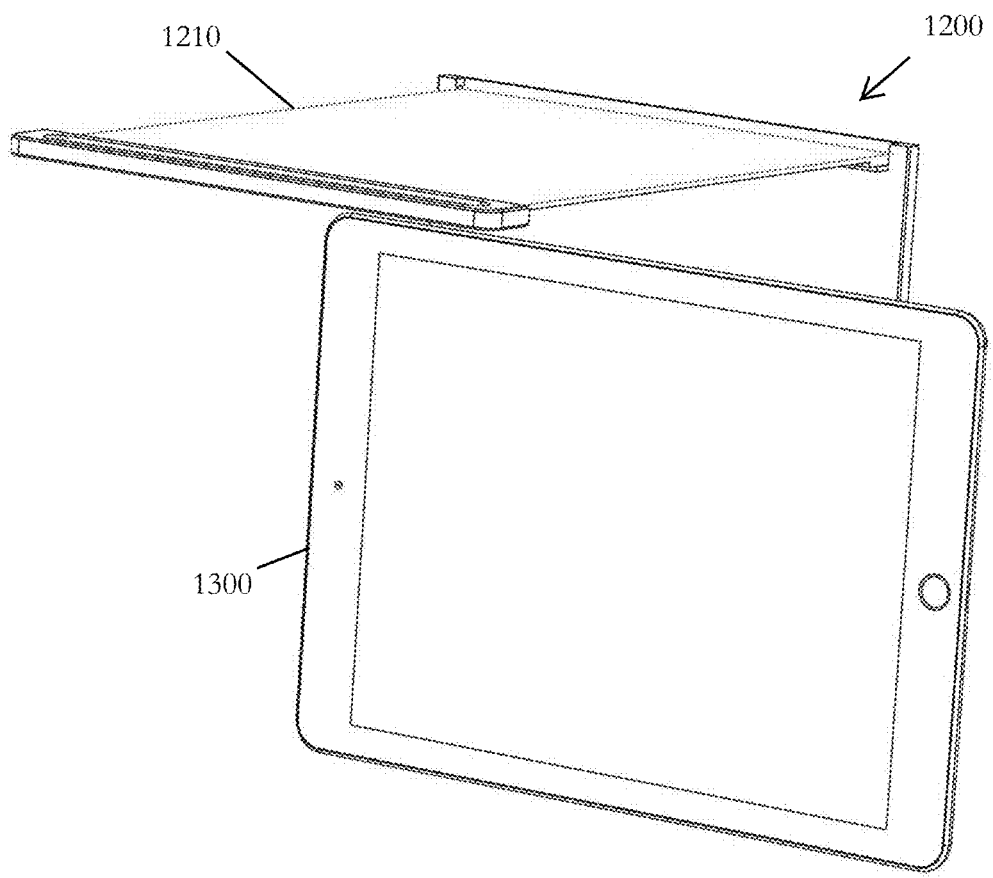
FIG. 13K provides front perspective view of the mobile shade device coupled tablet and rotated with respect to the tablet.

FIG. 13K is a front perspective view of the mobile device shade 1200 coupled to the mobile device 1300 in the crosswise orientation. The panel is shown in its deployed position, as discussed above. The deployment of the panel 1210 is substantially perpendicular to the detachable case 1240 and the display of the mobile device.

Figure 13L:
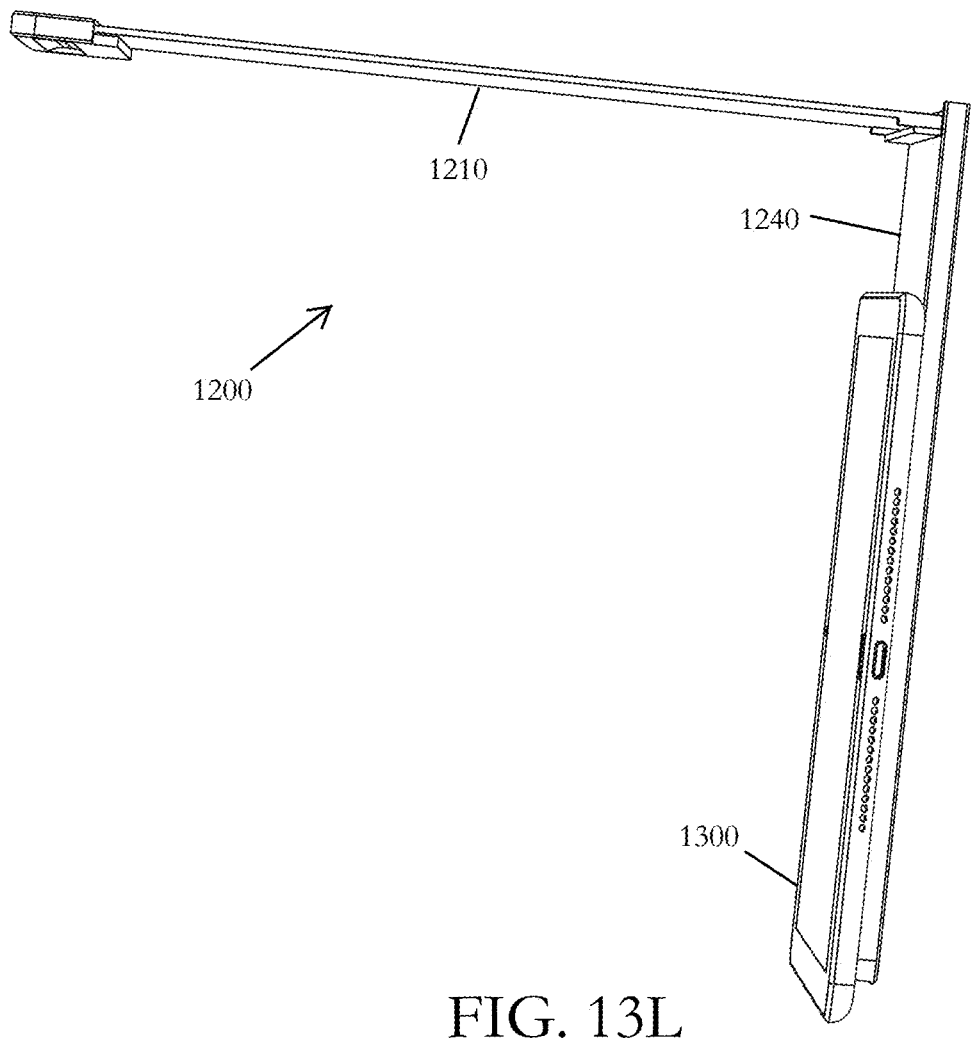
FIG. 13L provides a side view of the mobile shade device and tablet of FIG. 13K.

FIG. 13L is a side view of the mobile device shade 1200 coupled to the mobile device 1300, as in FIG. 13K. The panel 1210 is in a deployed state and at approximately a right angle with the detachable case 1240 and the display of the mobile device 1300.

Figure 13M:
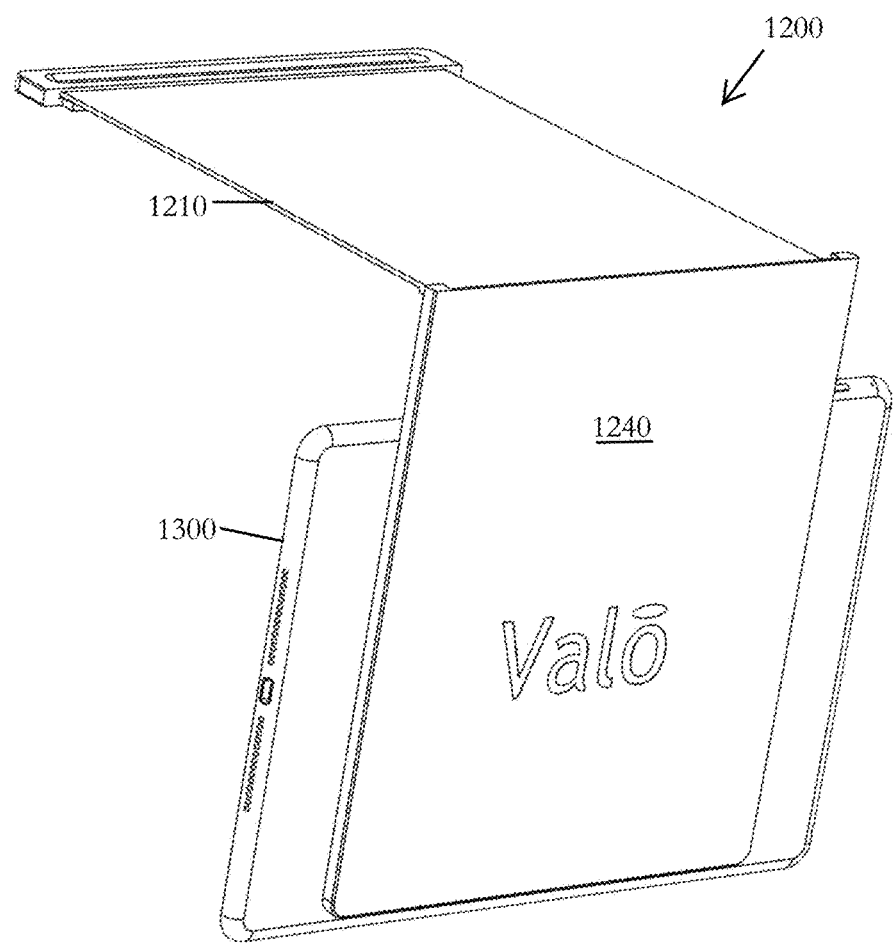
FIG. 13M provides a rear perspective view of the mobile shade device and tablet of FIG. 13K.

FIG. 13M is a rear perspective view of the mobile device shade 1200 coupled to the mobile device 1300, as in FIGS. 13K-13L. The panel 1210 is at approximately a right angle with respect to the detachable case 1240 and the mobile device 1300. That is, the detachable case 1240 here is oriented crosswise, or perpendicular, with respect to the longer edge of the mobile device 1300. In this embodiment, the mobile device 1300 has two portions exposed from the parameters of the detachable case 1240. The detachable case 1240 may, in some embodiments, include extenders to protect the exposed portions of the mobile device.

Figure 14A:
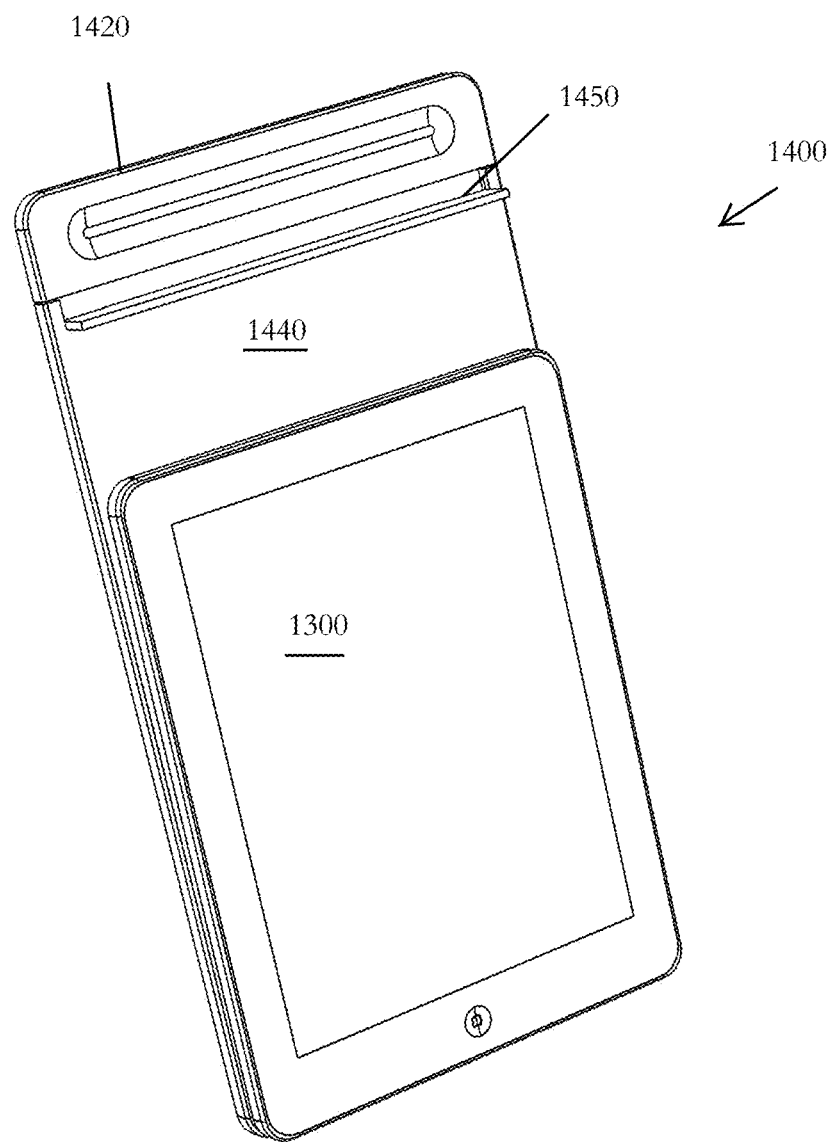
FIG. 14A provides a front perspective view of a thirteenth embodiment of a mobile device shade coupled to a tablet with a panel in a stowed state, in accordance with aspects of the present inventive concepts.

FIG. 14A is a perspective view of another embodiment of a mobile device shade 1400, which is shown coupled to a mobile device 1300. The mobile device shade 1400 can couple to the mobile device 1300 in any of a number of manners, including those described with respect to FIGS. 12 and 13 above. Here, the case is longer than the mobile device.

The panel 1410 is in a fully stowed state, with a grip disposed above a top edge of a case 1440. In this embodiment, the case also includes a panel guide 1460 similar to that described above with respect to FIGS. 12A-12F. Here, the panel guide 1460 includes an opening or recess 1495 formed at a top edge of the case, with a lip 1450 formed along a bottom length of the recess 1495. When the panel 1410 is deployed, the recess of the panel guide 1460 is configured to enable panel rotation, while the lip 1450 can serve as a stop for the panel rotation.

Figure 14B:
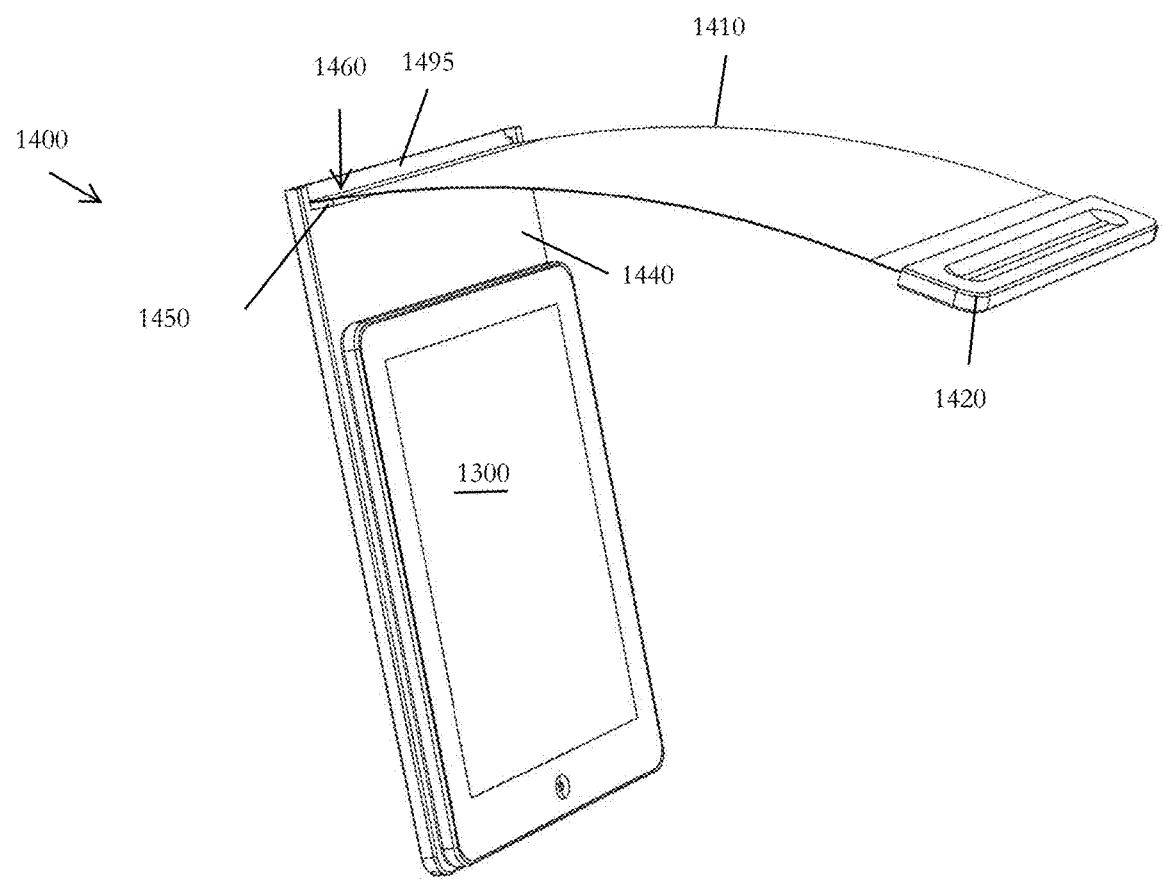
FIG. 14B shows a side perspective of the mobile device shade and table of FIG. 14A with the panel in a deployed state.

FIG. 14B is a perspective view of a mobile device shade 1400 with the panel 1410 in a deployed state, having a bottom edge coupled to the case 1440. In this embodiment, the panel takes a curved shape in the deployed state. The panel is not rigid, but rather is configured to bend or curve.

In some embodiments, the panel 1410 can be biased in a curved shape, but retained as a generally straight panel 1410 when in the stowed state within the case. Therefore, as deployed and unconstrained, the panel 1410 takes the curved shape shown in FIG. 14B. In other embodiments, the panel 1410 can be malleable or bendable where it can be selectively formed into different shapes, such as that shown in FIG. 14B.

Figure 14C:
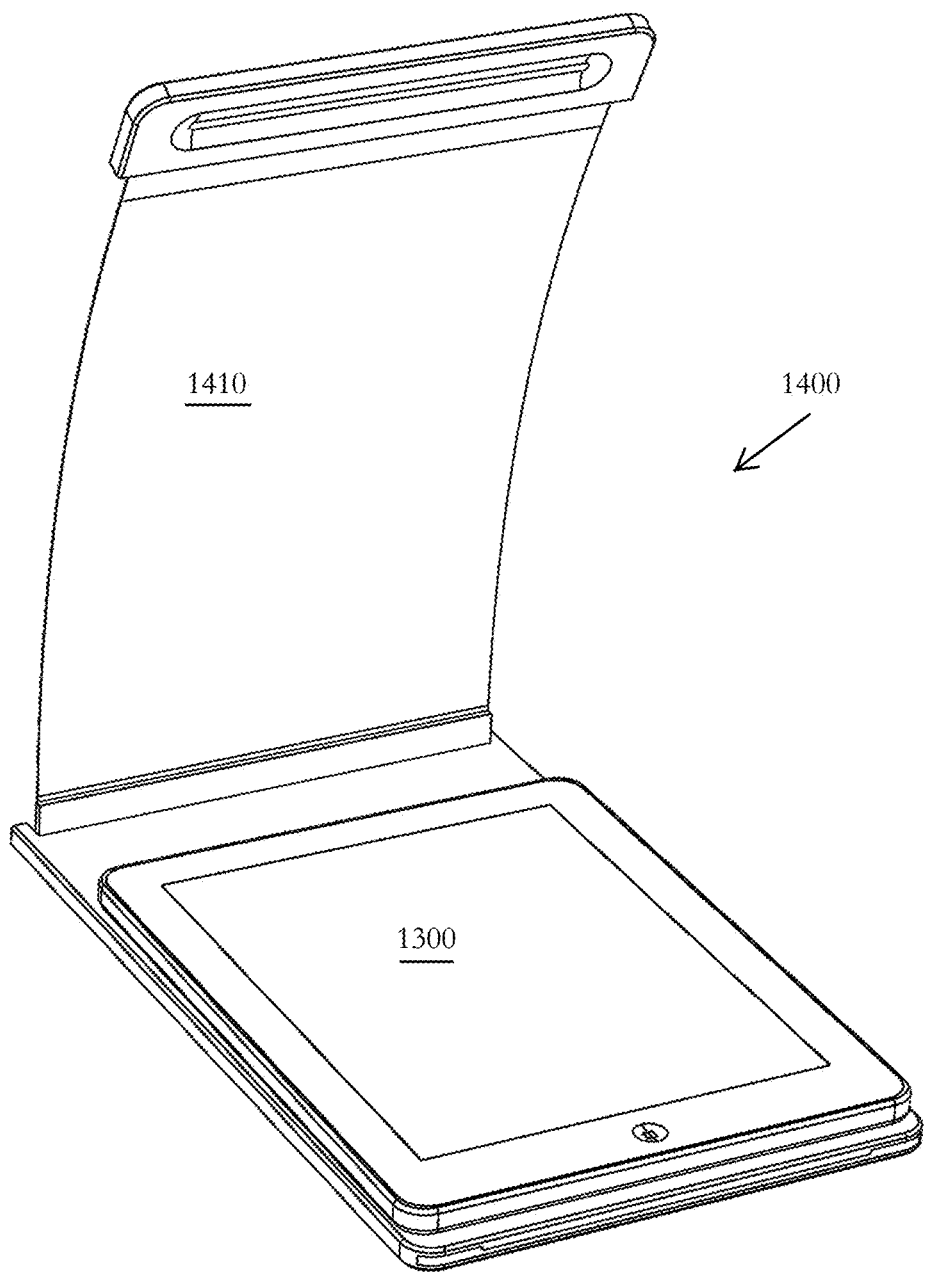
FIG. 14C shows a front perspective of the mobile device shade and table of FIG. 14A with the panel in a deployed state.

FIG. 14C is a perspective view of the mobile device shade 1400 coupled to a mobile device, e.g., tablet 1300, with the panel 1410 in the deployed state. The tablet 1300 is laid flat with the curved panel extending partially over the display of the mobile device.

Figure 15:
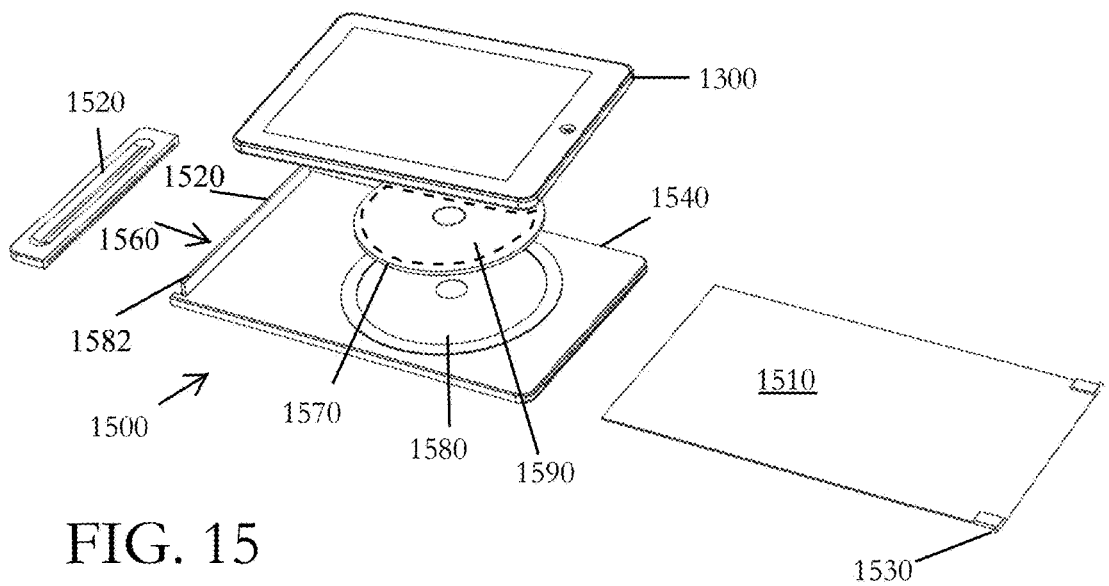
FIG. 15 provides various views of a fourteenth embodiment of a mobile device shade in accordance with aspects of the present inventive concepts.

FIG. 15 is an exploded view of another embodiment of a mobile device shade 1500 suitable for use with a mobile device 1300. Shown is a panel 1510, a case 1540, and a round base 1570.

The panel 1510 includes a grip 1520 and stops 1530, similar to panel 1210 discussed above. The grip 1520 remains at least partially accessible from the case 1540 when the panel 1510 is in its stowed state. The case 1540 forms a panel guide 1560 at its top edge, as part of an opening to a pocket that slideably receives the panel 1510 in the stowed state. The pocket is a void formed between two parallel front and back sides of the case 1540, which are at least partially closed on two or more sides to hold the front and back sides together to receive the panel 1510 therebetween. In the embodiment of FIG. 15, the front and back sides are closed on left, right, and bottom sides or edges, while a top side or edge includes an opening that includes the panel guide 1560.

The mobile device shade 1500 includes a coupling mechanism to couple the mobile device shade 1500 to a mobile device 1300. In this embodiment, the case 1540 has a round base receiver 1580 configured to receive the round base 1570. The round base 1570 can include a coupler 1590 that couples to the mobile device 1300, e.g., in the same or a similar manner that the base 1270 coupled to mobile device 1300. That is, the coupling mechanism or coupler can include a magnet, a suction cup, Velcro, a snap, an adhesive and so on. Here, the round base 1570 can be coupled to the mobile device 1300 and then the base receiver 1580 can receive the round base 1570. When coupled together, the round base 1570 and the round base receiver 1580 allow the mobile device 1300 to rotate with respect to the case 1540, so that the panel 1510 can be oriented at any angle with respect to the display of the mobile device 1300.

In this embodiment, the panel 1510 is substantially the same as panel 1210 discussed above. As in the embodiments of FIGS. 12, 13, and 14, the panel can be removably stowed in the case 1540. The panel 1510 can include pivot pins 1530 at its bottom edge and the grip 1520 at its top edge, and function as described above. That is, beyond the shapes of the base 1570 and base receiver 1580, the description with respect to FIGS. 12 and 13 can equally apply to this embodiment.

The round base 1570 may adhere or couple to the back side of the mobile device 1300 in any manner described herein or any other manner known to one skilled in the art, e.g., a suction cup, magnet, Velcro, and/or adhesive. The coupling mechanism can include the round base 1570, the round base receiver 1580, and the coupler 1590, in various embodiments.

FIGS. 16A-16J provide various views of a fifteenth embodiment of a mobile device shade 1600 in accordance with aspects of the present inventive concepts. This embodiment includes aspects and features similar to some of those shown in FIGS. 10, 11, 12, and 13 of this application. In this embodiment, mobile device shade 1600 is coupled to a mobile device (e.g., mobile phone or tablet) 10 disposed within a case 12. The mobile device shade 1600 is coupled to the case 12, but could be directly coupled to the mobile device 10 in other embodiments. That is, case 12 can be optional in different embodiments. In some embodiments, the mobile device shade 1600 can be integrated with the device 10. In other embodiments, the mobile device shade 1600 can be part of the case 12 at least partially surrounding the device 10. In yet some other embodiments, the shade assembly 1600 is couplable directly to the device 10 and/or case 12.

Figure 16A:
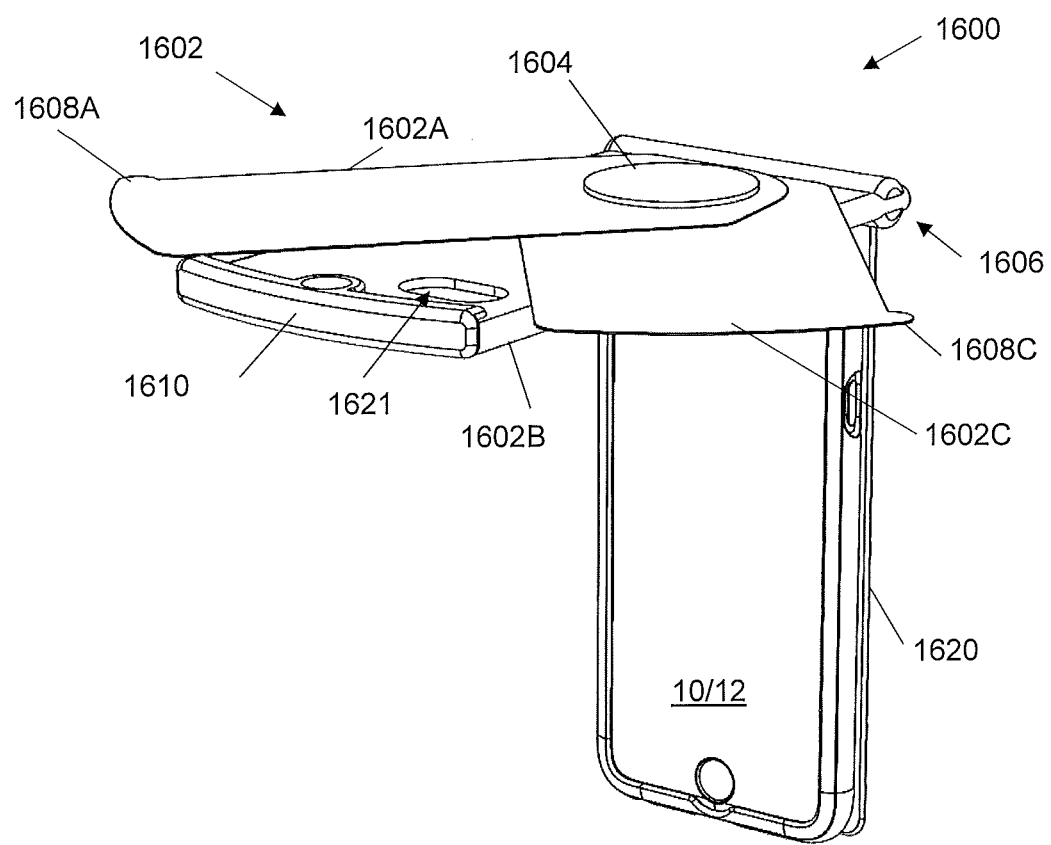
FIG. 16A provides a perspective view of a fifteenth embodiment of a mobile device shade coupled to a mobile device with a shade in a deployed state, in accordance with aspects of the present inventive concepts.
Figure 16B:
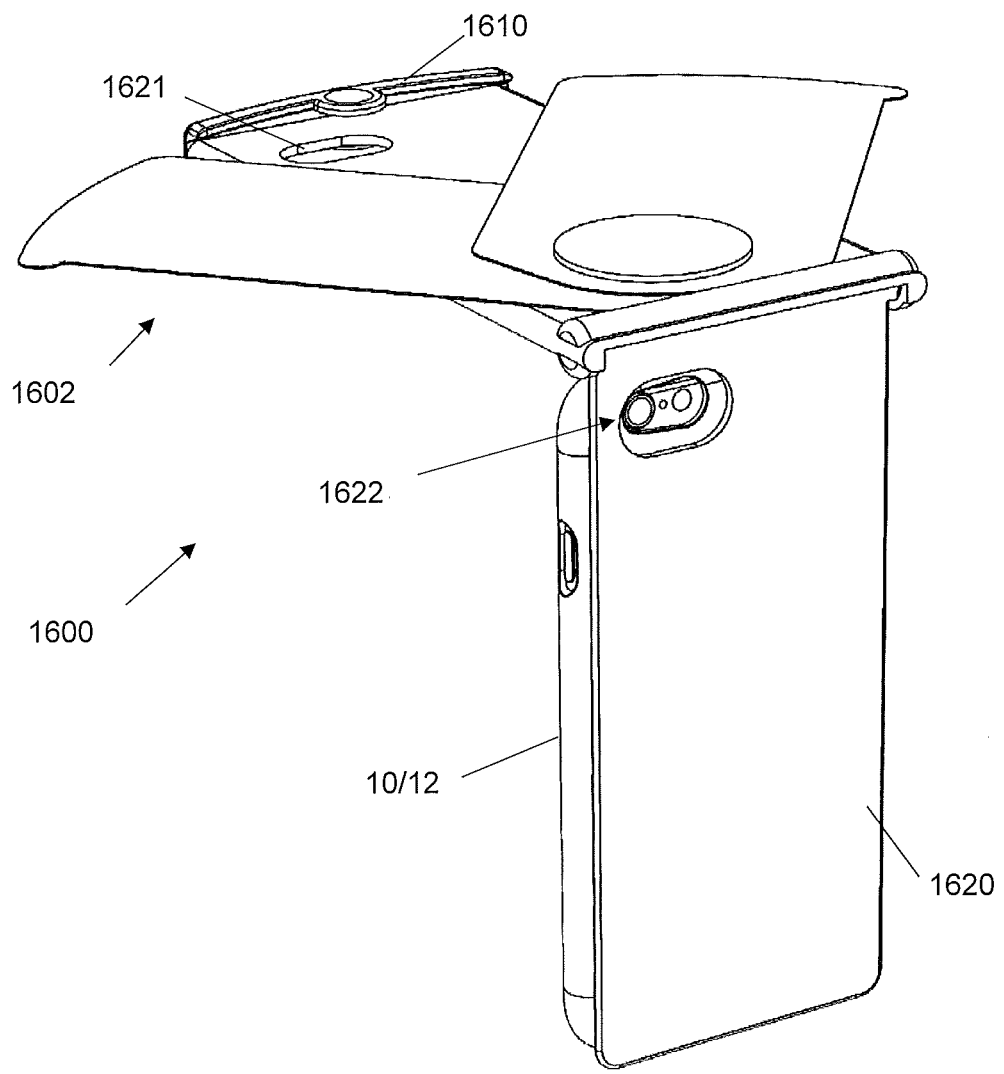
FIG. 16B shows a rear perspective view of the mobile device shade and mobile device of FIG. 16A.
Figure 16C:
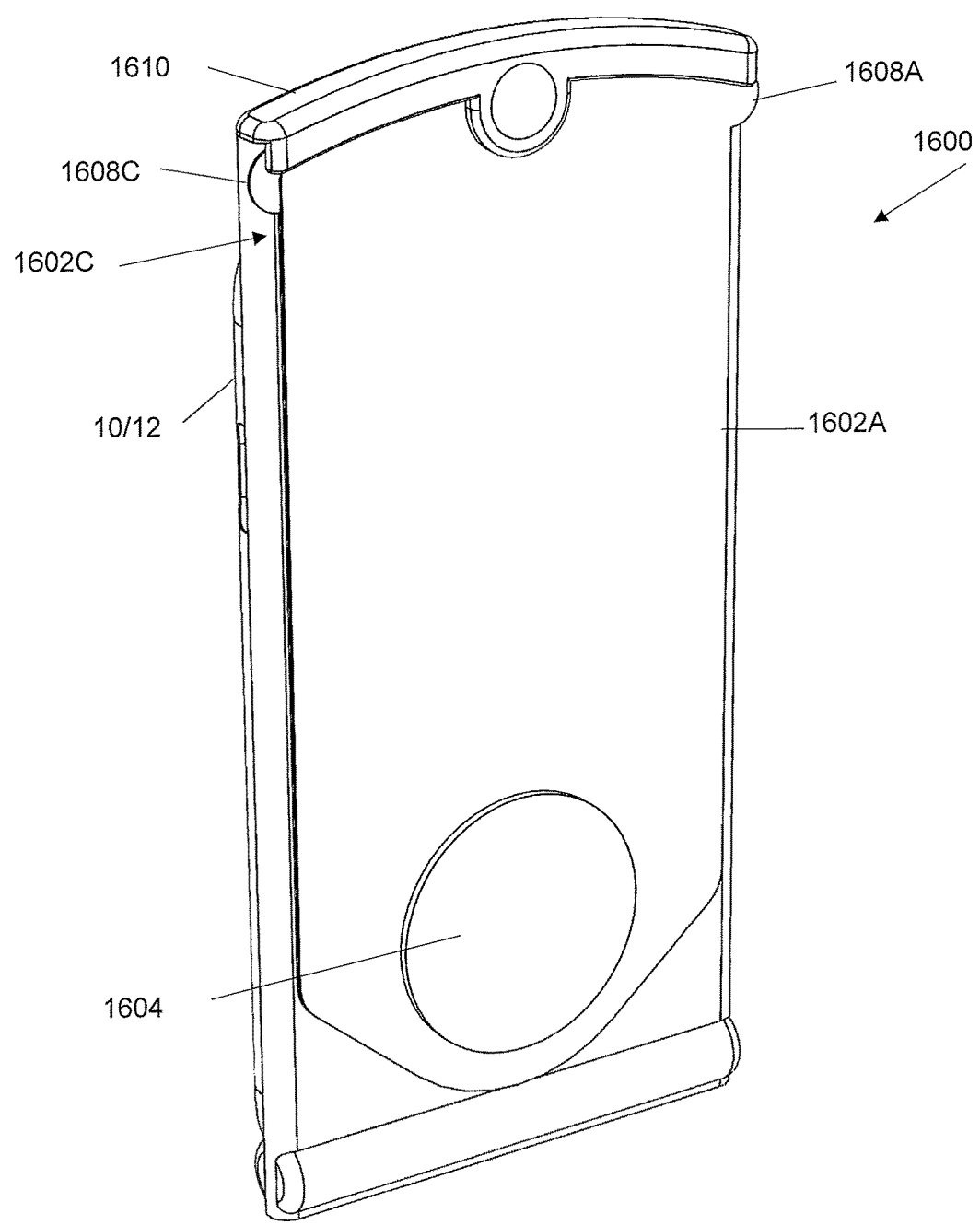
FIG. 16C is a rear perspective view of the mobile device shade and mobile device with the shade in a stowed state.
Figure 16D:
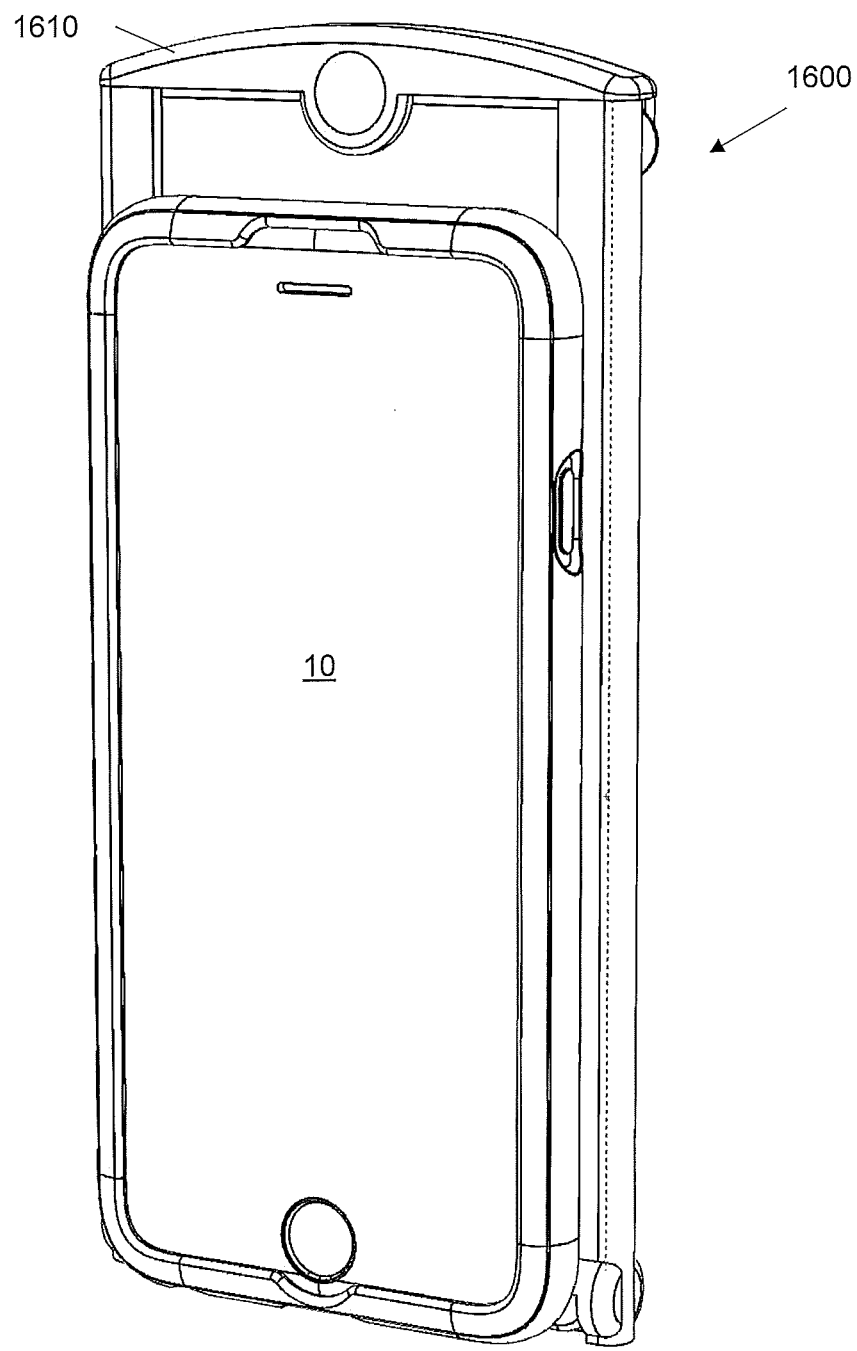
FIG. 16D is a front perspective view of the mobile device shade and mobile device with the shade in a stowed state.
Figure 16E:
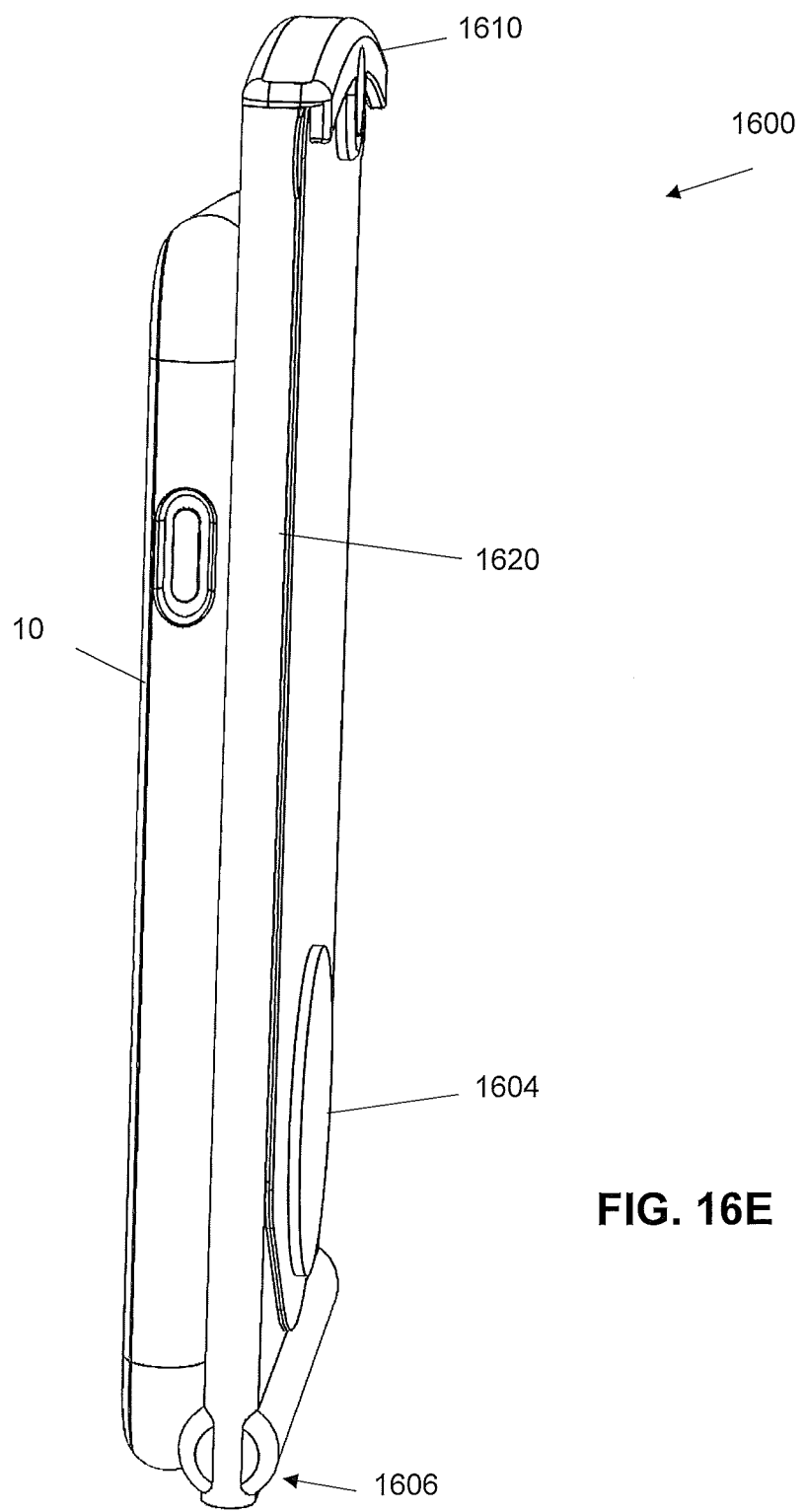
FIG. 16E is a side view of the mobile device shade and mobile device with the shade in a stowed state.
Figure 16F:
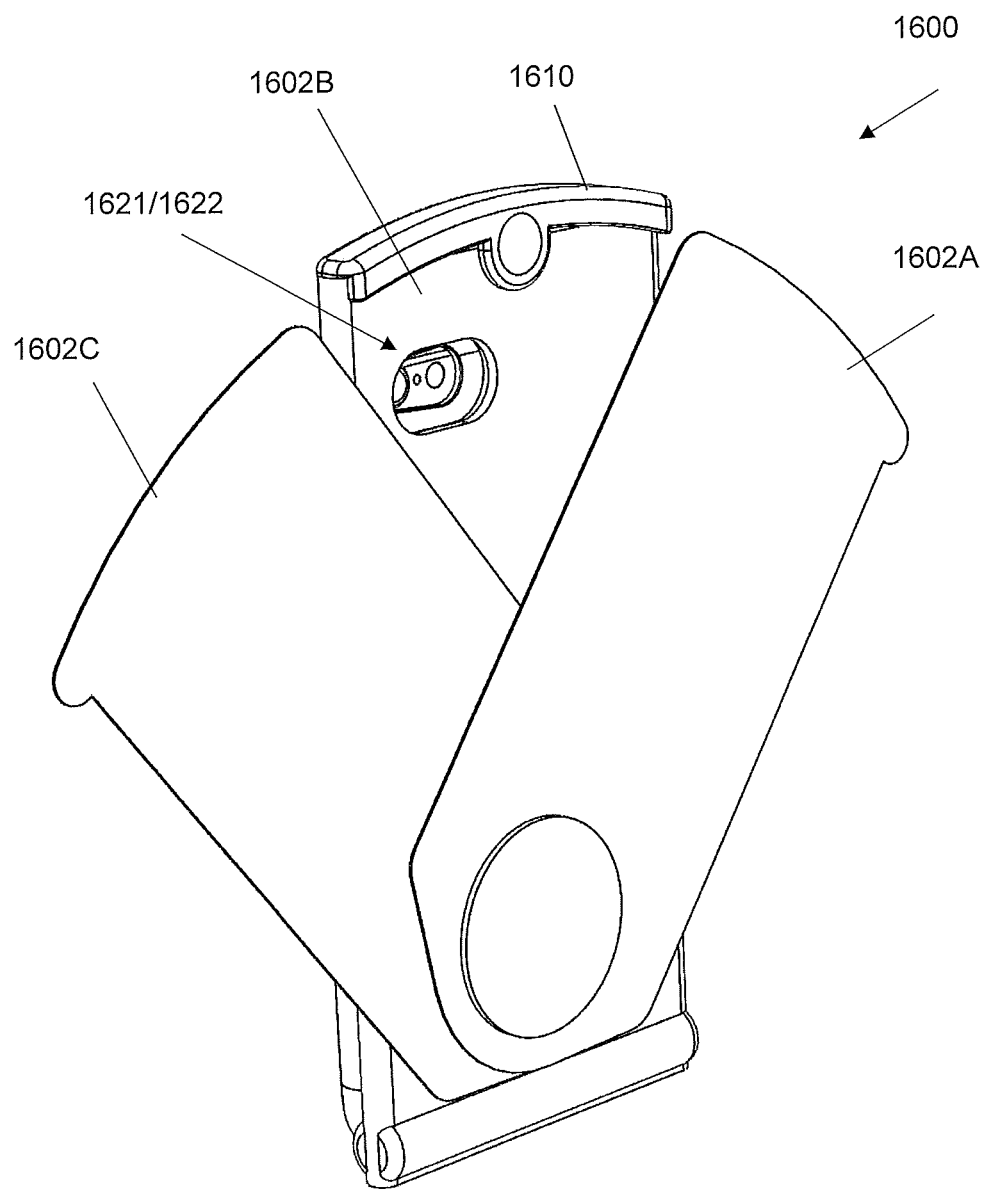
FIG. 16F is a rear perspective view of the mobile device shade and mobile device with the shade in a partially deployed state.
Figure 16G:
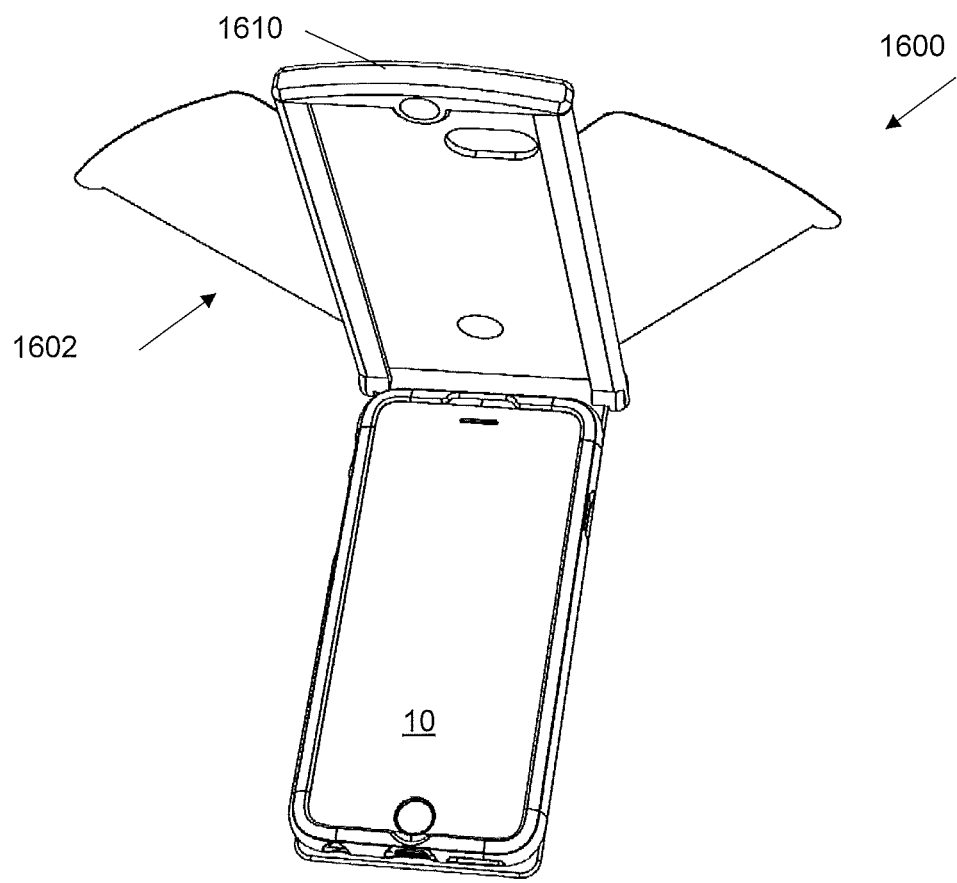
FIG. 16G is a front perspective view of the mobile device shade and mobile device with the shade in a deployed state.
Figure 16H:
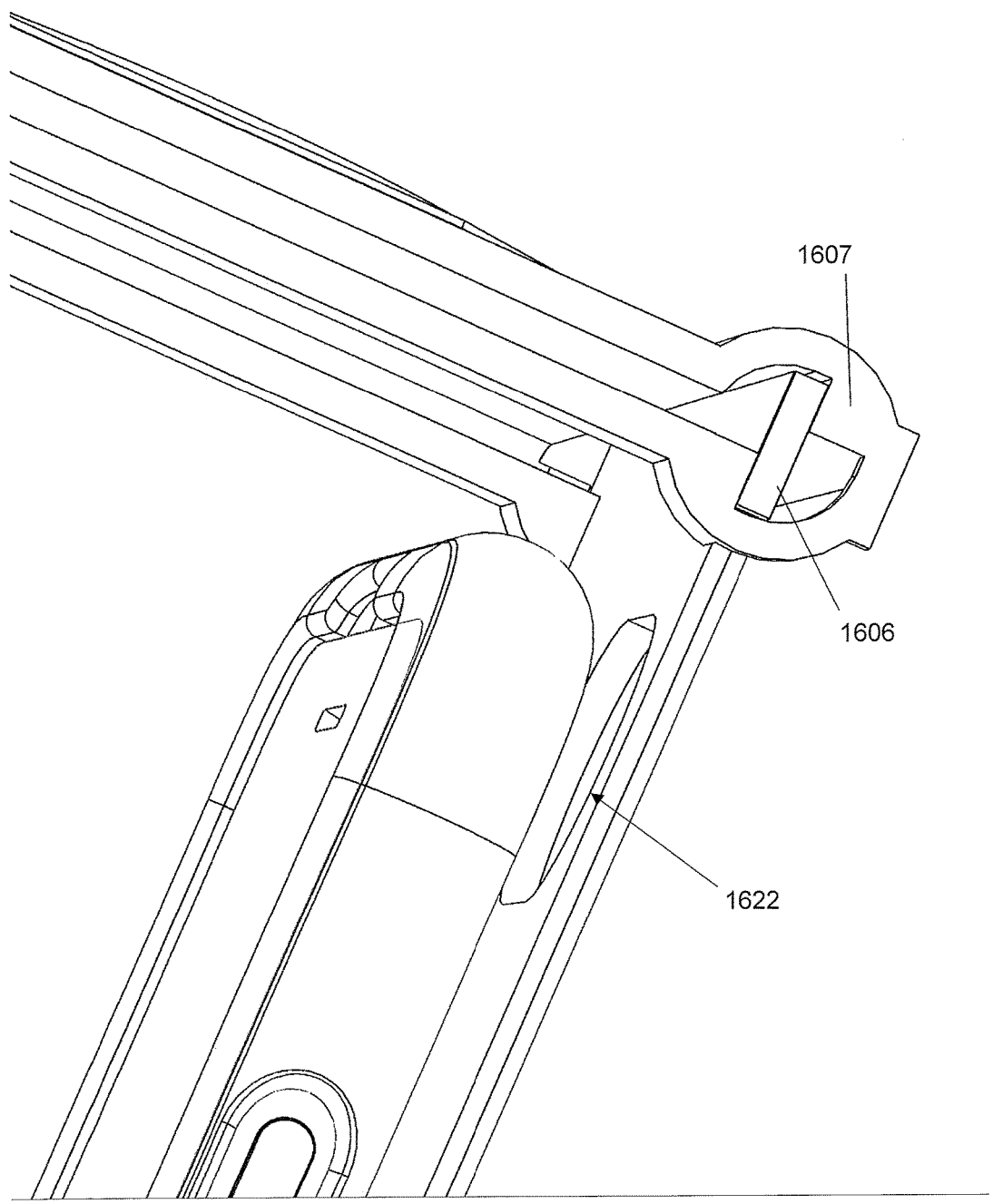
FIG. 16H is an enlarged side perspective view of a portion of the mobile device shade and mobile device of FIG. 16A.
Figure 16I:
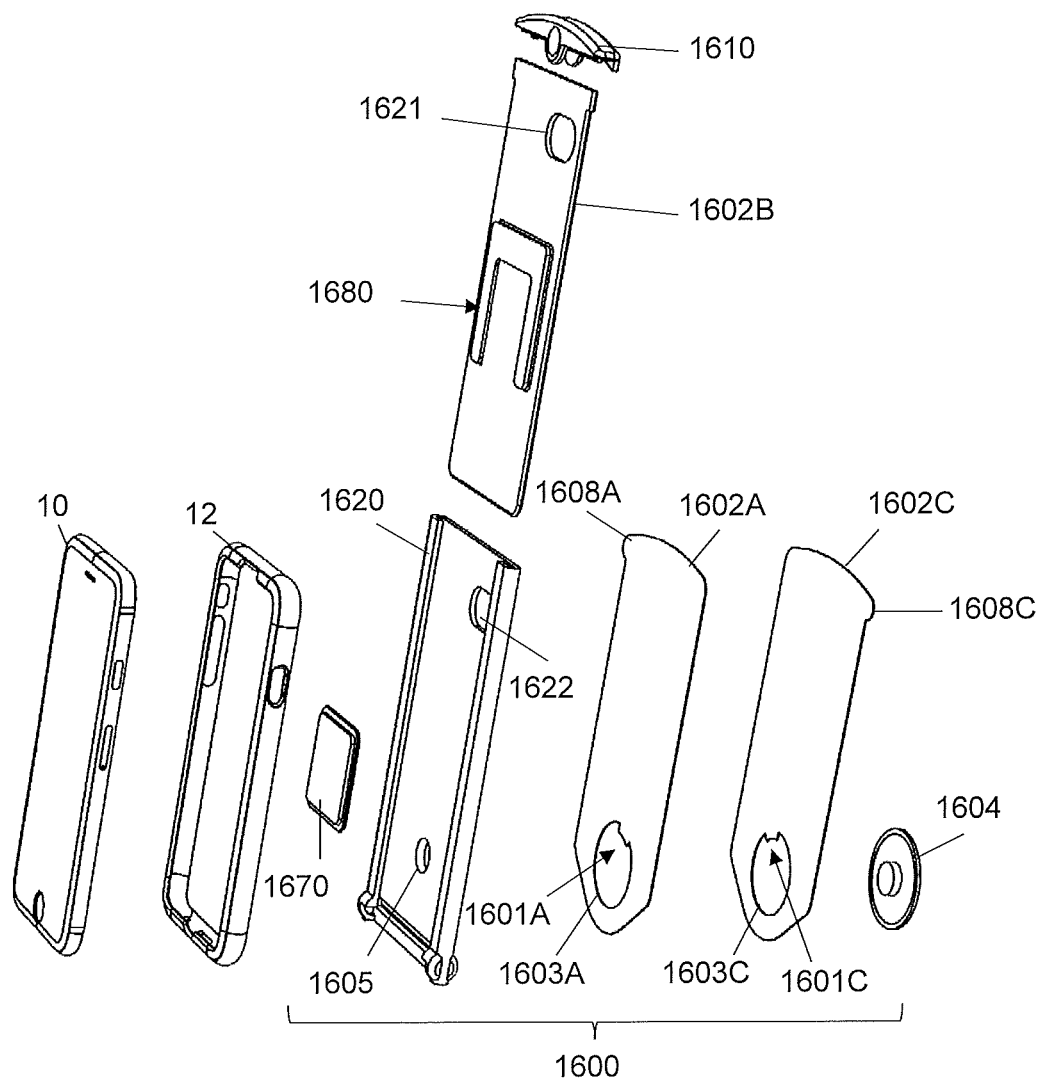
FIG. 16I is a front perspective exploded view of the mobile device shade and mobile device of FIG. 16A.
Figure 16J:
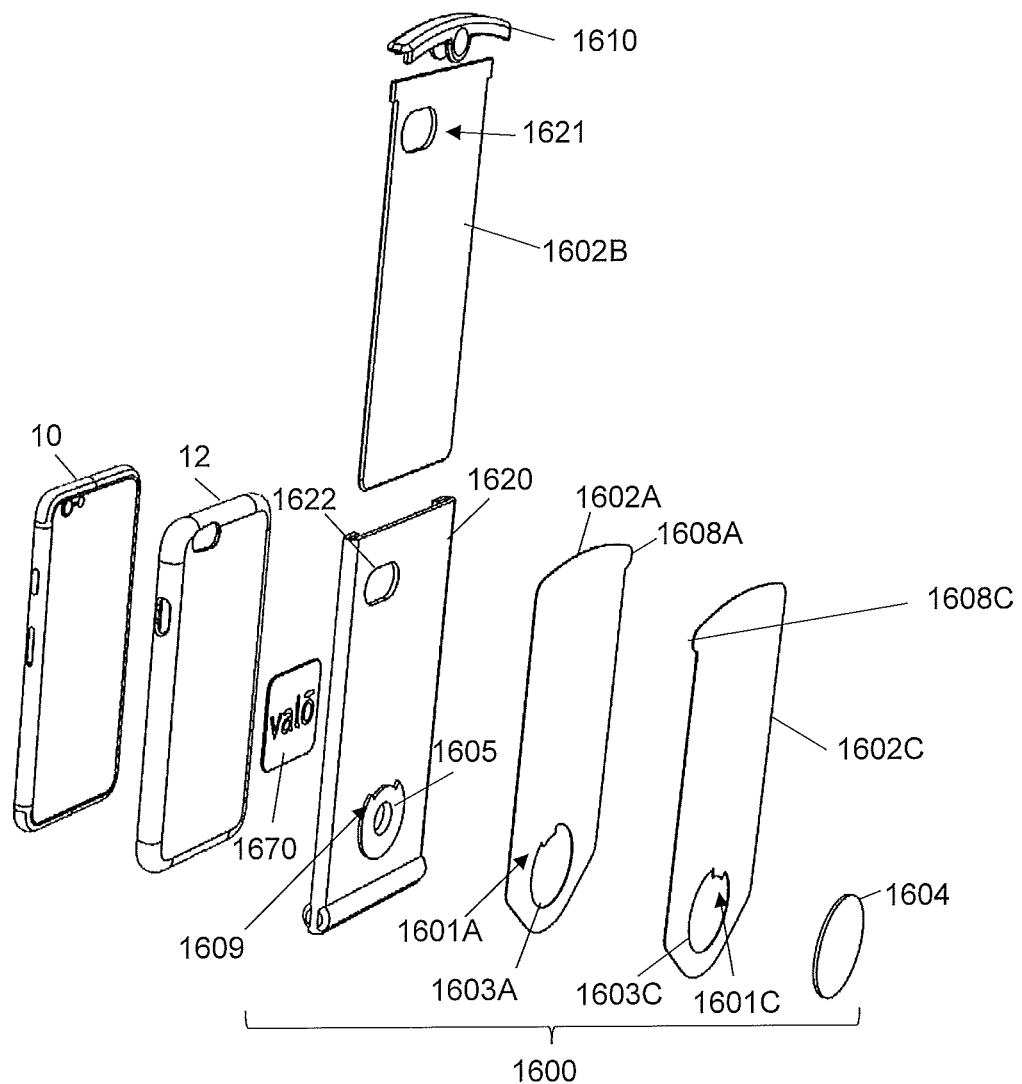
FIG. 16J is a rear perspective exploded view of the mobile device shade and mobile device of FIG. 16A.

FIGS. 16A, B and G show the shade panels 1602 in a deployed state, with the panels in fully fanned out and extending from a top of the case 1620. FIGS. 16C-E show the shade in a stowed state, with the panels 1602 fully overlapped within the case 1620. FIG. 16F shows the panels 1602 fanned out, while the panels are in a stowed state, i.e., not extended from a top of the case 1620. FIG. 16H is a magnified view showing details of the hinge formed between the panels 1602 and the case 1620. FIGS. 16I, J are exploded or unassembled views of the mobile shade device 1600.

In this embodiment, the mobile device shade 1600 includes three panels 1602A, B, C (collectively, 1602) that extend from a top portion of a case 1620 in a deployed state. The panels 1602 are configured to be deployed in a fully fanned out state, in a partially fanned out state, and/or in a fully overlapped state. In this embodiment, the panels 1602 includes a first side panel 1602A, a center panel 1602B, and a second side panel 1602C. The side panels 1602A, C can be rotated with respect to the center panel 1602B about a post 1604, to achieve a partially or fully fanned out configuration. The panels 1602 can be rotated with respect to the case 1620 to transition to a deployed state via a hinge or pivot pin 1606. In this embodiment, to facilitate fanning out the side panels 1602A, C, each side panel includes a grip or tab 1608A and 1608C, respectively.

In a stowed state, the panels 1602 overlap and, in combination with case 1620, take a substantially rectangular form. This form can approximate the size of the front of the mobile electronic device 10, also referred to as a mobile device, e.g., mobile phone. Although, as will be seen in the figures, in some embodiments a distal edge of each panel 1602, away from a proximal edge of a pivot pin 1606, can be curved to create a shade with a curved top edge (or distal end) when opened and deployed. In various embodiments, the distal edges can take other forms, including other straight or non-straight forms.

Unlike the embodiments of FIGS. 10, 11, 12 and 13, as examples, the mobile device shade 1600 includes a panel protector 1610. The panel protector 1610 is disposed at a top portion of the panels 1602, distal from the pivot pin 1606. The panel protector 1610 include a hollow configured to receive the top edges of each panel 1602 in the overlapped state. The panel protector 1610 protects the top edges of the panels in the stowed state.

The panel protector also forms a grip, and may be referred to as grip 1610. Pulling the grip 1610 can deploy the panels 1602, wherein the panels 1602 may slide in and out of the case 1620 through user push/pull action on the grip 1610. The case, therefore, may include guides within which the panels 1602 travel. In various embodiments, the panels 1602 may be hinged to rotate with respect to the case 1620, such as when transitioning to the deployed state. In various embodiments, the panels 1602 can rotate over and onto a display of the mobile device 10 as a cover.

In this embodiment, a center panel 1602B includes a camera opening 1621. The camera opening aligns with the camera of the mobile device 10 which the mobile device shade 1600 is coupled thereto. In this embodiment, side panels 1602A and 1602C do not have camera openings formed therein. Therefore, in the stowed state, side panels 1602A, C may cover and protect the camera of the mobile device 10. FIG. 16F shows how the side panels 1602A, C can be fanned out to expose the camera for use, even with the panels are generally in the stowed state. In other embodiments, all three of panels 1602 could have camera openings formed therein. In some embodiments, as an example, the camera openings of the three panels in the stowed state can overlap or align and align with the camera with the mobile device 10. As such, the camera remains unobstructed even when the mobile device shade assembly is in the stowed state.

FIG. 16H shows details regarding the rotation of the camera panels 1602 with respect to the case 1620. FIG. 16H also shows a camera opening 1622 formed in case 1620. Camera opening 1622 in case 1620 aligns with camera opening 1621 of center panel 1602B with panel 1602B is in the stowed state. When the panels 1602 are in the deployed state, camera opening 1622 in case 1620 exposes the camera of the mobile phone 1620 for use.

Pivot pin 1606 is formed along a top edge of case 1620. Center panel 1602B includes side structures extending from a bottom of the center panel 1602B to a top of the center panel 1602B. The side structures form channels within with the pivot pins 1606, one being formed in each side of the top edge of the case 1620, travel as the panels transition between the stowed and deployed states. At the bottom channels, as the bottom of the center panel 1602B, the side structures form pivot pin rotational guides 1607 that allow the panels to be rotated with respect to the case 1620 when in the deployed state. The rotation guides 1607 include semicircular portions allowing rotation and protruding stops that limit rotation. In this embodiment, two opposing semicircular portions are formed to allow about 90 degrees of rotation of the panels 1602 with respect to the case 1620. In other embodiments, other ranges of motion could be accommodated with different rotations guides 1607.

FIGS. 16I and J are unassembled views, showing various components of the mobile device shade assembly 1600. In each side panel 1602A, C is formed a generally circular post opening 1603A and 1603C, respectively. Each of the post openings 1603A, C includes a protruding stop 1601A and 1601C, respectively. Case 1620 includes a post receiver 1605, configured to receive and secure post 1604 though the side panels 1602A, C. The post receiver includes a flange defining a rotation travel path limit 1609 of the protruding stops 1601A, C of the post openings 1603A, C of the side panels 1602A, C when assembled.

Similar to the embodiments of FIGS. 12 and 13, the mobile device shade 1600 includes a base 1670 and a base receiver 1680. The base 1670 is configured to be coupled to the mobile device 10 (or its case 12). The based receiver 1680 is formed on or as part of case 1620 and is configured to slidably receive the base in one or more orientations, as discussed above with respect to the embodiments of FIGS. 12 and 13.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A mobile device shade apparatus, comprising:
   a case defining a pocket;
   at least one panel configured to travel in and out of the pocket to transition between a stowed state and a deployed state, wherein in the deployed state the at least one panel extends from and is rotatable with respect to an edge of the case; and
   a coupling mechanism configured to couple the case to a mobile device,
   wherein the case includes a top edge comprising a panel guide configured to enable rotation of the at least one panel with respect to the case.

2. The apparatus of claim 1, wherein the coupling mechanism includes:
   a base; and
   a base receiver forming part of or attached to the case and configured to receive the base.

3. The apparatus of claim 2, wherein the case is configured to couple to the base in a plurality of different orientations.

4. The apparatus of claim 3, wherein the case is configured to couple to the base in two different orientations that are 180 degrees apart.

5. The apparatus of claim 3, or any other claim, wherein the case is configured to couple to the base in two or more different orientations that are 90 degrees apart.

6. The apparatus of claim 2, wherein the base is shaped as a polygon.

7. The apparatus of claim 2, wherein the base is shaped as a square.

8. The apparatus of claim 1, wherein the base is circular.

9. The apparatus of claim 1, wherein the case is configured to contain at least a majority of the at least one panel in the stowed state.

10. The apparatus of claim 1, wherein the at least one panel includes a grip that abuts a top edge of the case and remains exposed when the at least one panel is in the stowed state.

11. The apparatus of claim 1, wherein the panel guide defines a recess along at least a portion of the top edge of the case, the recess configured to receive the panel when the panel is rotated.

12. The apparatus of claim 11, wherein the recess is partially framed by a lip configured to limit rotation of the at least one panel with respect to the case.

13. The apparatus of claim 12, wherein the lip is configured to limit rotation of the at least one panel with respect to the case to not more than about 90 degrees.

14. The apparatus of claim 1, wherein the at least one panel is a single panel.

15. The apparatus of claim 1, wherein the mobile device is a mobile phone or a tablet.

16. The apparatus of claim 1, wherein the case is configured to couple to a first case configured to receive the mobile device.

17. The apparatus of claim 1, wherein the coupling mechanism comprises:
   a magnet, tape, a suction cup, Velcro, a snap, and/or an adhesive.

18. A mobile device shade apparatus, comprising:
   a case defining a pocket;
   at least one panel configured to travel in and out of the pocket to transition between a stowed state and a deployed state, wherein in the deployed state the at least one panel extends from and is rotatable with respect to an edge of the case; and a coupling mechanism configured to couple the case to a mobile device, wherein the at least one panel includes a bottom edge having a pair of outwardly and laterally extending pivot pins and the case defines a pair of corresponding channels within which the pivot pins travel.

19. The apparatus of claim 18, wherein the case comprises one or more stops defining terminal ends of the pair of channels at a top edge of the case.

20. The apparatus of claim 18, wherein the case is configured to contain at least a majority of the at least one panel in the stowed state.

21. The apparatus of claim 18, wherein the case is configured to couple to a first case configured to receive the mobile device.

22. The apparatus of claim 18, wherein the coupling mechanism comprises:

a magnet, tape, a suction cup, Velcro, a snap, and/or an adhesive.

23. A mobile device shade apparatus, comprising:

a panel including a top edge having a grip and a bottom edge having a pair of outwardly and laterally extending pivot pins;

a case defining a pocket to receive the panel, the case having a pair of internal channels within which the pivot pins of the panel travel to transition the panel from a stowed state within the case to a deployed state at least partially extending from the case; and a coupling mechanism configured to couple the case to a mobile device in a plurality of different orientations, the coupler comprising:

a base; and a base receiver forming part of or attached to the case and configured to receive the base.

24. The apparatus of claim 23, wherein the mobile device is a mobile phone or a tablet.

\* \* \* \* \*